US012775071B2

(12) United States Patent
Oiwa et al.

(10) Patent No.: US 12,775,071 B2
(45) **Date of Patent: *Oct. 27, 2026**

(54) OPTICAL MODULE AND DISTANCE MEASURING DEVICE

(71) Applicant: SONY SEMICONDUCTOR SOLUTIONS CORPORATION, Kanagawa (JP)

(72) Inventors: Tatsuya Oiwa, Kanagawa (JP); Takashi Kobayashi, Kanagawa (JP); Motoi Kimura, Kanagawa (JP); Jialun Xu, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 544 days.

This patent is subject to a terminal disclaimer.

(21) Appl. No.: 18/281,622

(22) PCT Filed: Feb. 15, 2022

(86) PCT No.: PCT/JP2022/005856

§ 371 (c)(1),
(2) Date: Sep. 12, 2023

(87) PCT Pub. No.: WO2022/209369

PCT Pub. Date: Oct. 6, 2022

(65) Prior Publication Data

US 2024/0151821 A1 May 9, 2024

(30) Foreign Application Priority Data

Mar. 31, 2021 (JP) ................................ 2021-062058

(51) Int. Cl.
*G01C 3/08* (2006.01)
*G01S 7/481* (2006.01)
*G01S 17/894* (2020.01)

(52) U.S. Cl.
CPC .......... *G01S 7/4815* (2013.01); *G01S 17/894* (2020.01)

(58) Field of Classification Search
CPC ............................ G01S 7/4815; G01S 17/894
See application file for complete search history.

(56) References Cited

U.S. PATENT DOCUMENTS

2013/0148102 A1* 6/2013 Oggier .................. G01S 17/894 356/5.01
2018/0364334 A1* 12/2018 Xiang ..................... G01S 17/42
2022/0146250 A1* 5/2022 Bonsignore ........ G01B 11/2513

FOREIGN PATENT DOCUMENTS

JP 2020129588 A * 8/2020 ............ G01S 7/481
WO WO 2019/136854 A1 7/2019

(Continued)

OTHER PUBLICATIONS

International Search Report issued in International Patent Application No. PCT/JP2022/005856 on Mar. 22, 2022 and English translation of same. 5 pages.

(Continued)

*Primary Examiner* — Mark Hellner
(74) *Attorney, Agent, or Firm* — K&L Gates LLP

(57) ABSTRACT

Resolution is improved while suppressing the number of light emitting elements disposed in an optical module. In the optical module, the light emission unit has a multi-array structure based on a structure in which the light emitting elements are respectively disposed at vertexes forming a quadrangle of which sides facing each other are parallel to each other, a distance between the light emitting elements on a side in a first direction is set to a and a distance between the light emitting elements on a side in a second direction orthogonal to the side in the first direction is set to b, the diffraction element generates diffracted light in an n direction (n is a natural number) and an angle θx formed between (Continued)

one diffraction direction and the side in the first direction satisfies $\theta x=\tan^{-1}(b/na)$, and when angle differences of two light beams generated by inter-light emission distances a and b are set to $\varphi a$ and $\varphi b$, respectively, and m is set to a natural number excluding an integral multiple of (2n+1), a diffraction angle $\varphi x$ of the diffracted light satisfies $\varphi x=m\times sqrt\{(n\varphi a)^2+\varphi b^2\}/(2n+1)$.

8 Claims, 57 Drawing Sheets

(56) References Cited

FOREIGN PATENT DOCUMENTS

| | | | |
|---|---|---|---|
| WO | WO 2020/030916 | A1 | 2/2020 |
| WO | WO 2020/169727 | A1 | 8/2020 |

OTHER PUBLICATIONS

Written Opinion issued in International Patent Application No. PCT/JP2022/005856 on Mar. 22, 2022. 3 pages.

* cited by examiner

A

B

A

B

OPTICAL MODULE AND DISTANCE MEASURING DEVICE

TECHNICAL FIELD

The present technology relates to an optical module and a distance measuring device.

BACKGROUND ART

An optical module that irradiates a target with a light beam is used for measuring a distance by time of flight (ToF) of light, shape recognition of an object, and the like. When spot-shaped light is radiated by such an optical module, resolution thereof depends on the number of spots. On the other hand, a technology of multipath correction for correcting an influence of reflected light from an object other than the target is known. For example, a camera system that performs multipath correction by switching between uniform irradiation and spot irradiation is suggested (refer to, for example, Patent Document 1).

CITATION LIST

Patent Document

Patent Document 1: Specification of US 2013/0148102 A

SUMMARY OF THE INVENTION

Problems to be Solved by the Invention

As described above, when the number of light emitting elements is increased in order to improve the resolution, a contribution ratio of a laser oscillation threshold current increases, and electro-optical conversion efficiency decreases. Furthermore, there is a limit to dispose the light emitting elements with narrow intervals, and an area for a light emission unit increases. Furthermore, when the number of spots increases, it becomes difficult to perform the above-described multipath correction.

An object of the present technology is to improve resolution while suppressing the number of light emitting elements disposed in an optical module.

Solutions to Problems

According to the present technology, there is provided an optical module including:

a light emission unit including light emitting elements arrayed two-dimensionally; and a diffraction element that diffracts a light beam radiated from each of the light emitting elements and separates the light beam into a plurality of light beams, in which the light emission unit has a multi-array structure based on a structure in which the light emitting elements are respectively disposed at vertexes forming a quadrangle of which sides facing each other are parallel to each other, a distance between the light emitting elements on a side in a first direction is set to a and a distance between the light emitting elements on a side in a second direction orthogonal to the side in the first direction is set to b, the diffraction element generates diffracted light in an n direction (n is a natural number) and an angle θx formed between one diffraction direction and the side in the first direction satisfies $$\theta x=\tan^{-1}(b/na),\text{ and}$$

when angle differences of two light beams generated by inter-light emission distances a and b are set to φa and φb, respectively, and m is set to a natural number excluding an integral multiple of (2n+1), a diffraction angle φx of the diffracted light satisfies $$\varphi x=m\times\mathrm{sqrt}\{(n\varphi a)^2+\varphi b^2\}/(2n+1).$$

Furthermore, according to the present technology, there is provided an optical module including:

a light emission unit including light emitting elements arrayed two-dimensionally; and a diffraction element that diffracts a light beam radiated from each of the light emitting elements and separates the light beam into a plurality of light beams, in which the light emission unit has a multi-array structure based on a structure in which the light emitting elements are respectively disposed at vertexes forming a quadrangle of which sides facing each other are parallel to each other, a distance between the light emitting elements on a side in a first direction is set to a and a distance between the light emitting elements on a side in a second direction orthogonal to the side in the first direction is set to b, the diffraction element generates diffracted light in an n direction (n is a natural number) and an angle θx formed between one diffraction direction and the side in the first direction satisfies $$\theta x=\tan^{-1}\{b/(n+1)a\},\text{ and}$$

when angle differences of two light beams generated by inter-light emission distances a and b are set to φa and φb, respectively, and m is set to a natural number excluding an integral multiple of (2n+1), a diffraction angle φx of the diffracted light satisfies $$\varphi x=m\times\mathrm{sqrt}[\{(n+1)\varphi a\}^{2+\varphi}b^2]/(2n+1).$$

Furthermore, according to the present technology, there is provided an optical module including:

a light emission unit including light emitting elements arrayed two-dimensionally; and a diffraction element that diffracts a light beam radiated from each of the light emitting elements and separates the light beam into a plurality of light beams, in which the light emission unit has a multi-array structure based on a structure in which the light emitting elements are respectively disposed at vertexes forming a quadrangle of which sides facing each other are parallel to each other, a distance between the light emitting elements on a side in a first direction is set to a and a distance between the light emitting elements on a side in a second direction orthogonal to the side in the first direction is set to b, the diffraction element generates diffracted light in an n direction (n is a natural number) and an angle θx formed between one diffraction direction and the side in the first direction satisfies $$\theta x=\tan^{-1}(b/a),\text{ and}$$

when angle differences of two light beams generated by inter-light emission distances a and b are set to φa and φb, respectively, and m is set to an integral multiple of (2n+1) excluding 2(2n+1), a diffraction angle φx of the diffracted light satisfies $$\varphi x=m\times\mathrm{sqrt}(\varphi a^2+\varphi b^2)/2.$$

MODE FOR CARRYING OUT THE INVENTION

Hereinafter, an embodiment and the like of the present disclosure will be described with reference to the drawings. Note that the description will be made in the following order.

<1. First Embodiment>
<2. Second Embodiment>
<3. Third Embodiment>
<4. Fourth Embodiment>
<5. Fifth Embodiment>
<6. Sixth Embodiment>
<7. Seventh Embodiment>
<8. Eighth Embodiment>
<9. Ninth Embodiment>
<10. Tenth Embodiment>
<11. Modification Example>

1. First Embodiment

[Configuration of Distance Measuring Device]

Figure 1:
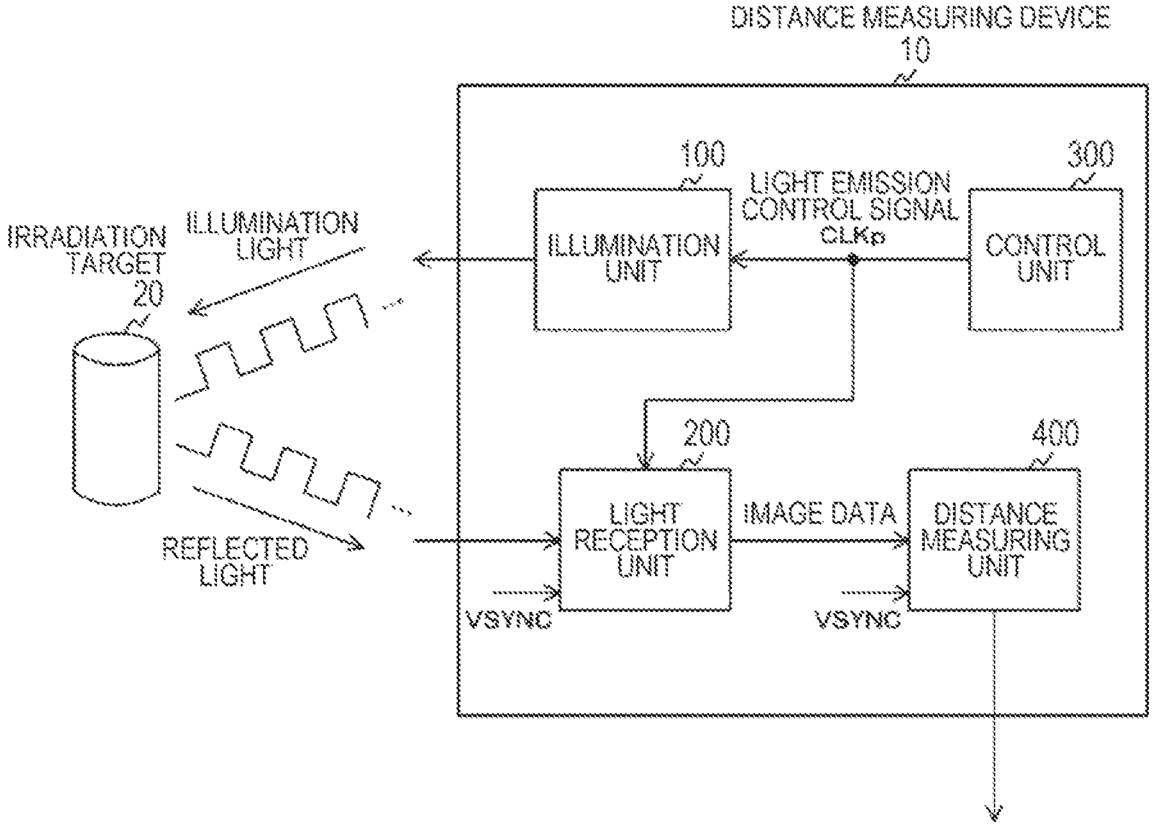
FIG. 1 is a block diagram illustrating an example of an overall configuration of a distance measuring device according to an embodiment of the present technology.

FIG. 1 is a block diagram illustrating an example of an overall configuration of a distance measuring device 10 according to the embodiment of the present technology.

The distance measuring device 10 is a device that measures a distance to an irradiation target 20 by irradiating the irradiation target 20 with illumination light and receiving the reflected light. The distance measuring device 10 includes an illumination unit 100, a light reception unit 200, a control unit 300, and a distance measuring unit 400. For example, an optical module is configured by the illumination unit 100 and the light reception unit 200.

The illumination unit 100 generates irradiation light in synchronization with a light emission control signal CLKp of a rectangular wave from the control unit 300. The light emission control signal CLKp is only required to be a periodic signal, and the light emission control signal CLKp is not limited to the rectangular wave. For example, the light emission control signal CLKp may be a sine wave.

The light reception unit 200 receives the light reflected from the irradiation target 20 and detects, each time a period of a vertical synchronization signal VSYNC elapses, an amount of the received light within the period. In the light reception unit 200, a plurality of pixel circuits is disposed in a two-dimensional lattice pattern. The light reception unit 200 supplies image data (frame) corresponding to the amount of the light received by these pixel circuits to the distance measuring unit 400. Note that the light reception unit 200 is an example of a light detection unit recited in claims. Note that the light detection unit has a function of correcting a distance measurement error caused by a multipath.

The control unit 300 controls the illumination unit 100 and the light reception unit 200. The control unit 300 generates a light emission control signal CLKp and supplies the light emission control signal CLKp to the illumination unit 100 and the light reception unit 200.

The distance measuring unit 400 measures a distance to the irradiation target 20 by a ToF method on the basis of the image data. The distance measuring unit 400 measures the distance for each pixel circuit and generates a depth map indicating a distance to an object as a gradation value for each pixel. This depth map is used for, for example, image processing of performing blurring processing with a degree corresponding to a distance, autofocus (AF) processing of obtaining a focal point of a focus lens according to a distance, and the like.

[Configuration of Illumination Unit]

Figure 2:
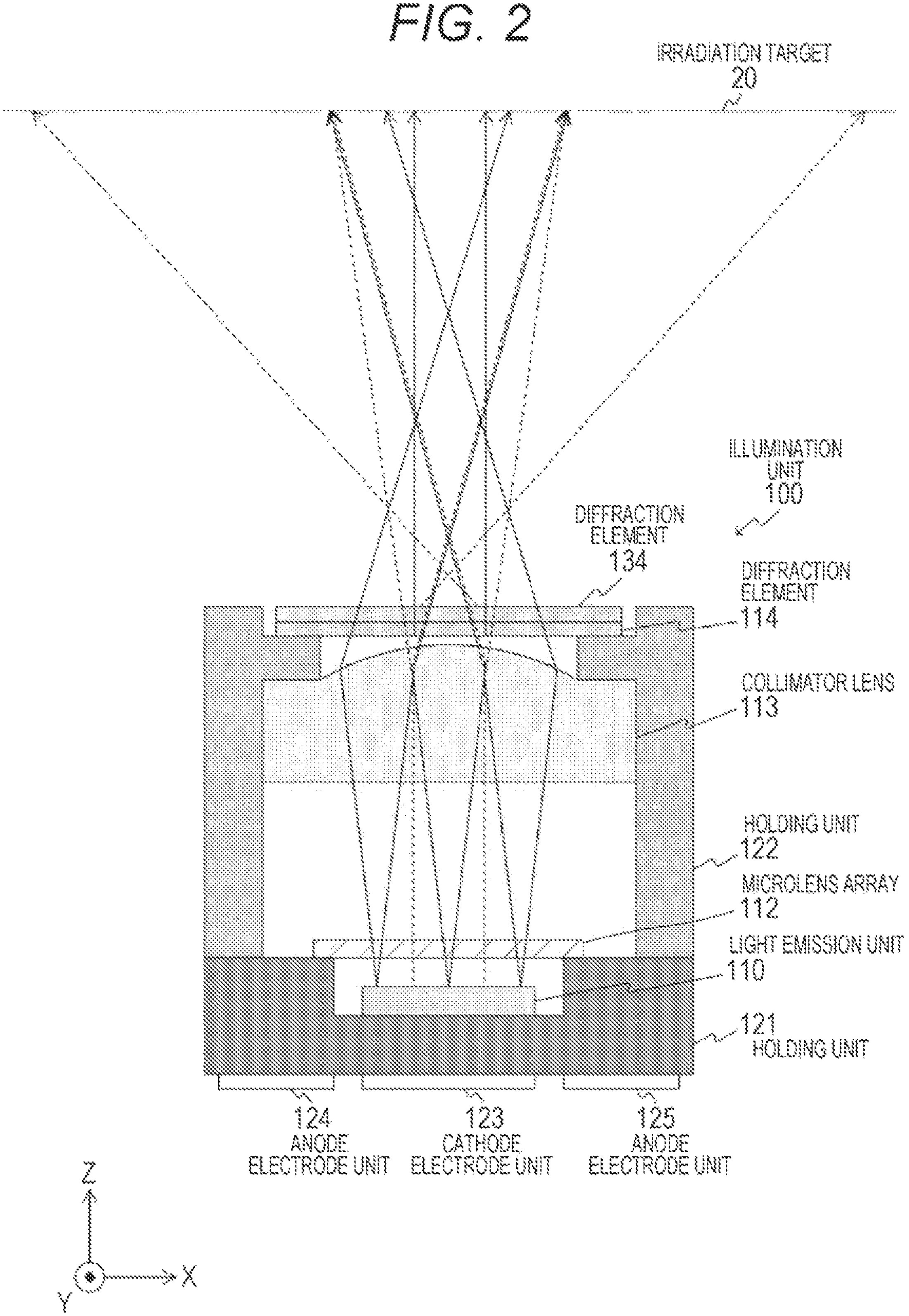
FIG. 2 is a cross-sectional view illustrating an example of a configuration of an illumination unit according to the embodiment of the present technology.

FIG. 2 is a cross-sectional view illustrating an example of a configuration of the illumination unit 100 according to the embodiment of the present technology.

The illumination unit 100 includes a light emission unit 110, a microlens array 112, a collimator lens 113, and diffraction elements 114 and 134. The microlens array 112, the collimator lens 113, and the diffraction elements 114 and 134 are disposed in this order on an optical path of light emitted from the light emission unit 110.

Figure 3:
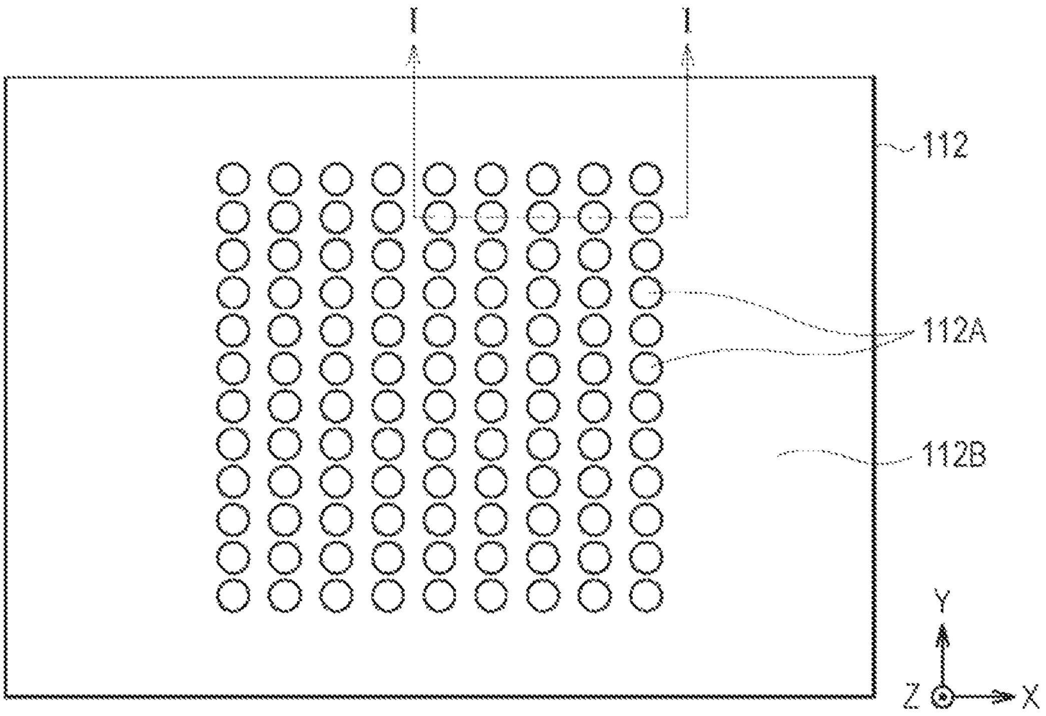
FIG. 3A is a schematic plan view illustrating an example of a configuration of a microlens array in FIG. 1.
FIG. 3B is a schematic view illustrating an example of a cross-sectional configuration of the microlens array in FIG. 1.
Figure 3:
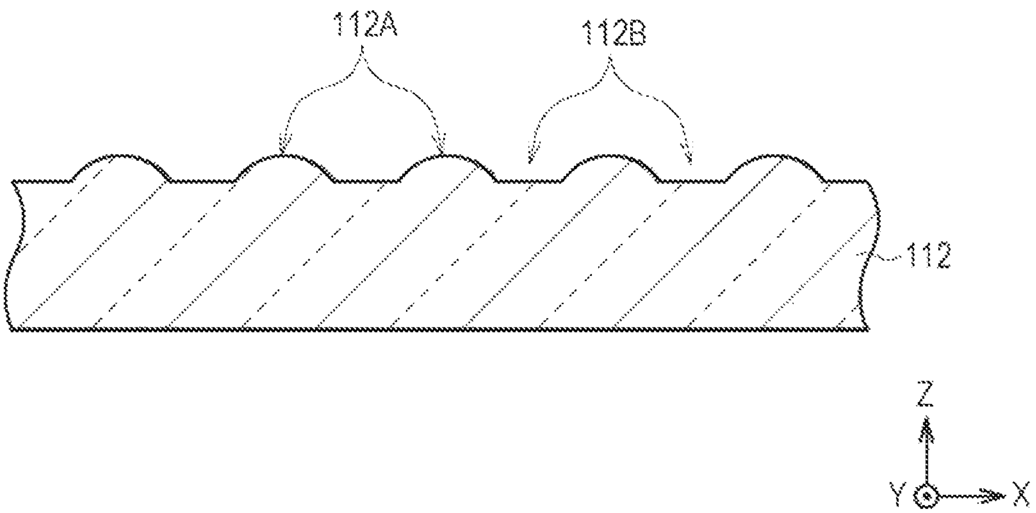

The light emission unit 110 includes a plurality of light emission units 11 for spot irradiation and a plurality of light emission units 12 for uniform irradiation. For example, the microlens array 112 forms a shape of at least one beam of light (laser beam L11, a laser beam L12) emitted from a plurality of the light emission units 11 for spot irradiation and a plurality of the light emission units 12 for uniform irradiation and emits the beam. FIG. 3A schematically illustrates an example of a planar configuration of microlens array 112, and FIG. 3B schematically illustrates a cross-sectional configuration of the microlens array 112 taken along line I-I illustrated in FIG. 3A. In the microlens array 112, a plurality of microlenses is disposed in an array, and the microlens array 112 includes a plurality of lens portions 112A and a parallel plate portion 112B.

Figure 4:
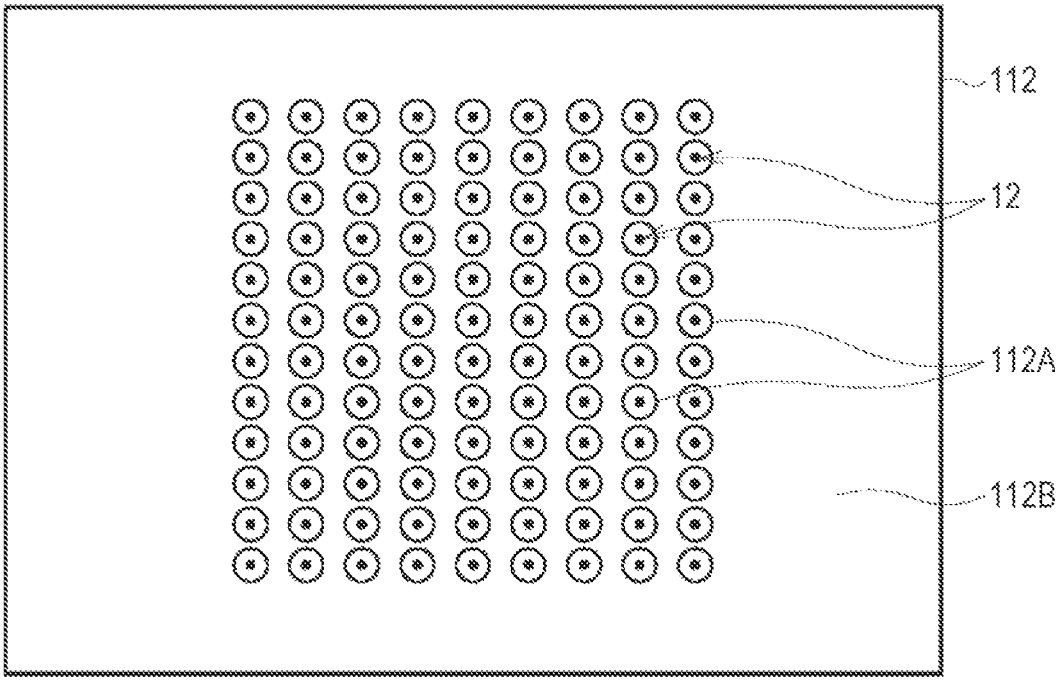
FIG. 4A is a schematic view illustrating a position of a light emission unit for uniform irradiation with respect to the microlens array illustrated in FIG. 3A.
FIG. 4B is a schematic view illustrating a position of a light emission unit for spot irradiation with respect to the microlens array illustrated in FIG. 3A.
Figure 4:
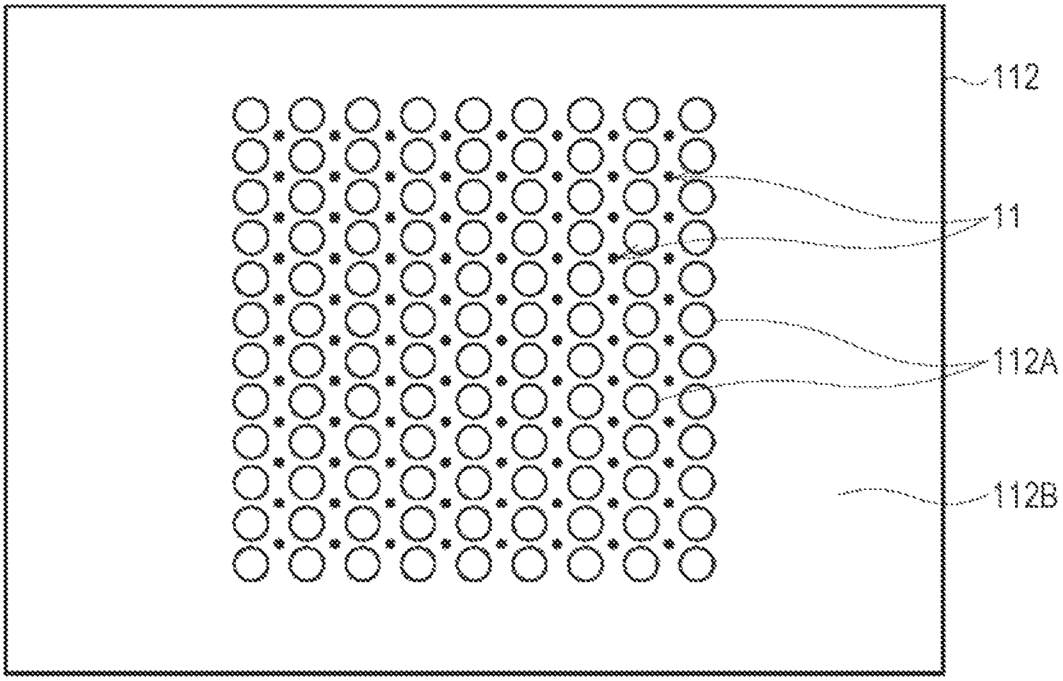
Figure 5:
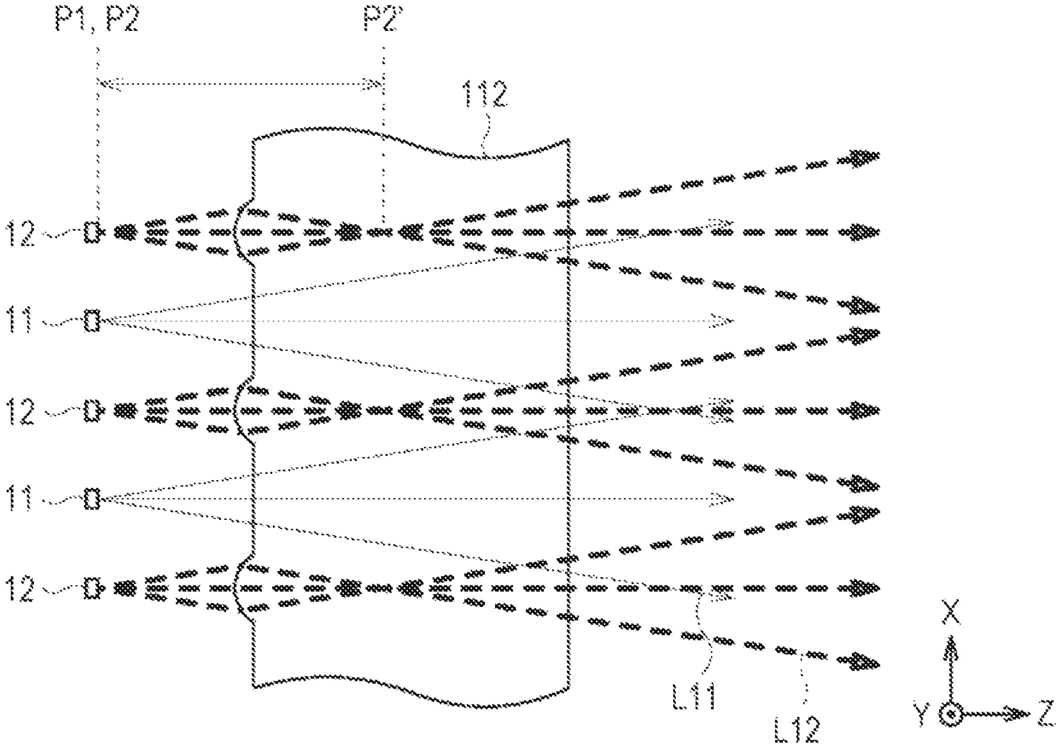
FIG. 5 is a diagram for explaining a beam forming function according to the embodiment of the present technology.

In the embodiment, as illustrated in FIG. 4A, the microlens array 112 is disposed such that the lens portions 112A respectively face a plurality of light emission units 12 for uniform irradiation, and as illustrated in FIG. 4B, the parallel plate portion 112B faces a plurality of light emission units 11 for spot irradiation. Therefore, as illustrated in FIG. 5, each of the laser beams L12 emitted from a plurality of the light emission units 12 is refracted by a lens surface of each of the lens portions 112A, and for example, forms a virtual light emission point P2' in the microlens array 112. That is, a light emission point P2 of each of a plurality of the light emission units 12 at the same height as a light emission point P1 of each of a plurality of the light emission units 11 is shifted in an optical axis direction (for example, in a Z-axis direction) of the light beams (the laser beams L11 and the laser beams L12) emitted from a plurality of the light emission units 11 and a plurality of the light emission units 12.

Figure 6:
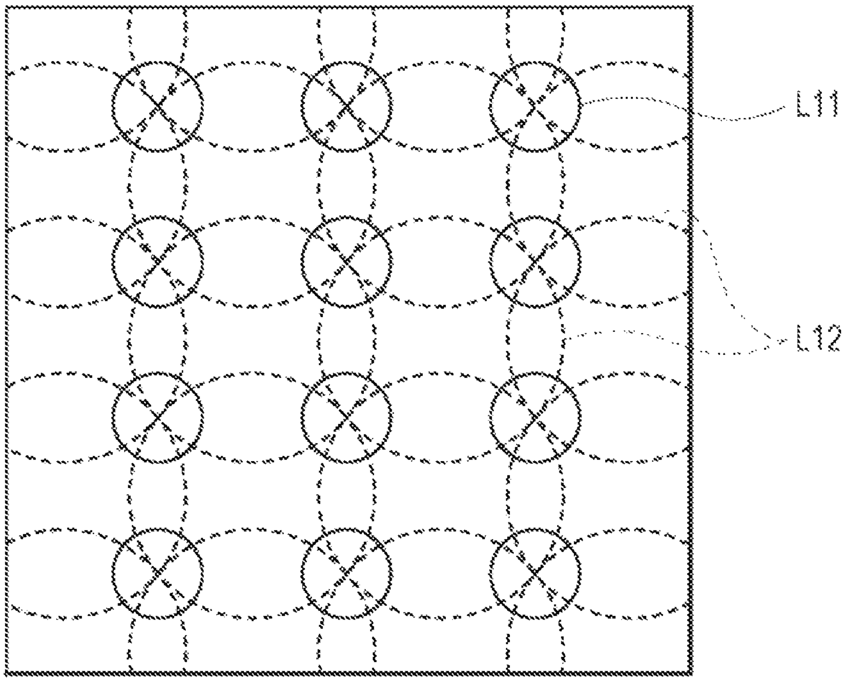
FIG. 6 is a diagram illustrating an example of a radiation pattern with respect to a target according to the embodiment of the present technology.

Therefore, by switching the light emission of a plurality of the light emission units 11 and the light emission of a plurality of the light emission units 12, the laser beams L11 emitted from a plurality of the light emission units 11 pass through the microlens array 112, and for example, form a spot-shaped irradiation pattern as illustrated in FIG. 6. Furthermore, the laser beams L12 emitted from a plurality of the light emission units 12 are refracted by the microlens array 112, and for example, as illustrated in FIG. 6, partially overlap with the laser beams L12 emitted from the adjacent light emission units 12, and thus form an irradiation pattern of irradiating a predetermined range with substantially uniform light intensity. In an illumination device 1, by switching between the light emission of a plurality of the light emission units 11 and the light emission of a plurality of the light emission units 12, it is possible to switch between spot irradiation and uniform irradiation.

Note that FIG. 5 illustrates an example in which the microlens array 112 functions as a relay lens, but the present technology is not limited thereto. For example, the virtual light emission point P2' of a plurality of the light emission units 12 may be formed between the light emission unit 12 and the microlens array 112.

The collimator lens 113 is an optical element that collimates a light beam radiated from the light emission unit 110 into a substantially parallel light beam or a light beam having a predetermined angular width. The collimator lens 113 is not limited to a general optical lens as long as this is an element having a collimating function. For example, it is also possible to dispose a Fresnel lens. Furthermore, in a case where light emitted from the light emission unit 110 is substantially parallel light, an optical component for collimating may be omitted.

The diffraction elements 114 and 134 are elements that diffract the light beam to separate the light beam into a plurality of light beams. The diffraction element 114 performs tiling in 3×3 as will be described later. The diffraction element 134 generates diffracted light of a predetermined order as will be described later. Note that in this example, it is assumed that the diffraction elements 114 and 134 are integrated on front and back sides, but the diffraction elements 114 and 134 may also be separate components. Furthermore, functions of the diffraction elements 114 and 134 may be formed on the same plane.

The light emission unit 110 is held by a holding unit 121, and the collimator lens 113, the diffraction element 114, and the diffraction element 134 are held by a holding unit 122. The holding unit 121 includes, for example, one cathode electrode unit 123 and two anode electrode units 124 and 125 on a surface opposite to a surface on which the light emission unit 110 is held.

The light emission unit 110 is, for example, a surface emitting semiconductor laser including a plurality of light emitting elements 111. A plurality of the light emitting elements 111 is disposed in an array on a substrate. In this example, optical paths of light emitted from three light emitting elements 111 are schematically illustrated as representatives, but actually, as illustrated in FIG. 7, light beams from a large number of the light emitting elements 111 are radiated toward the irradiation target 20.

[Configuration of Light Emission Unit]

Figure 7:
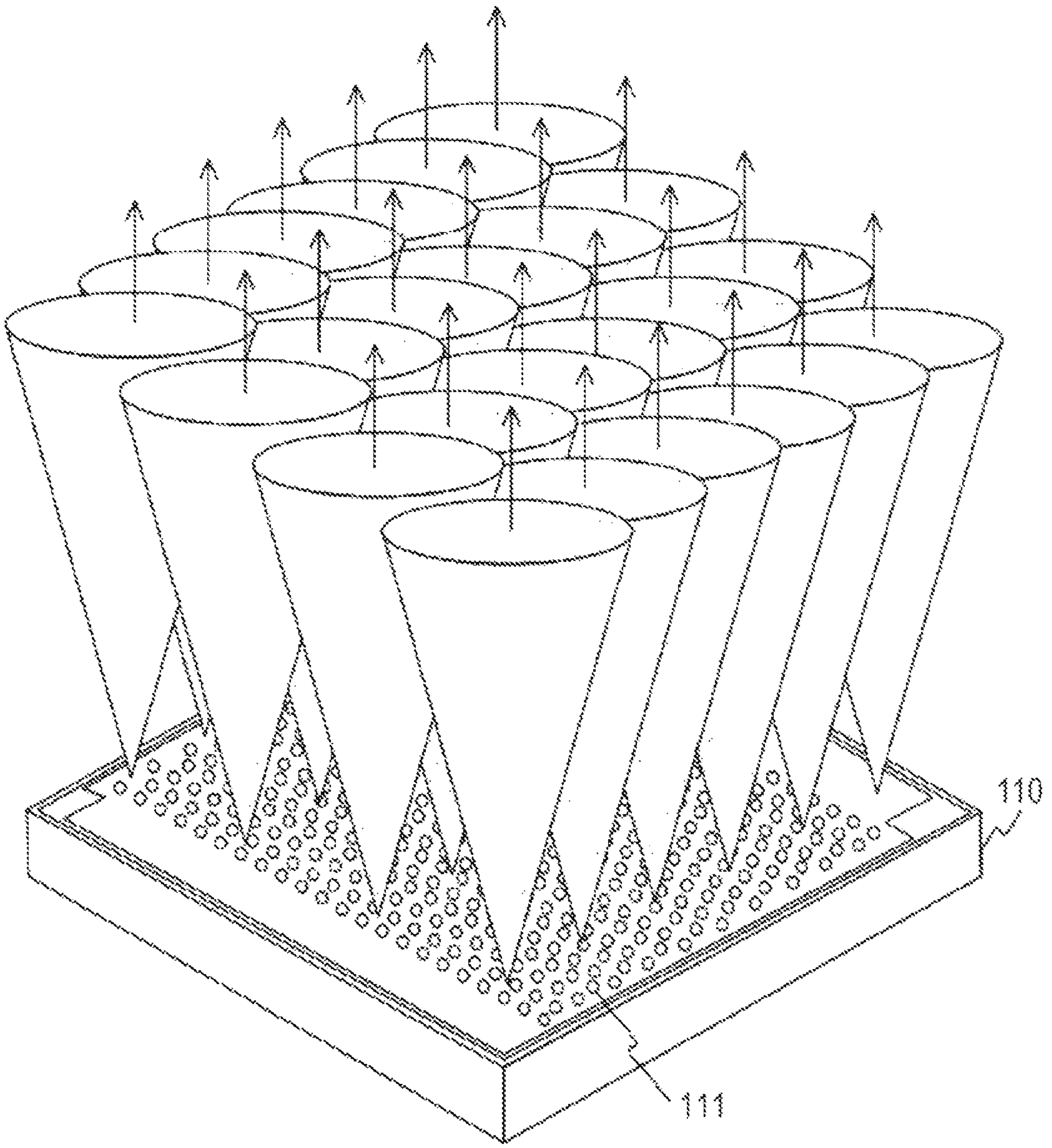
FIG. 7 is a view illustrating an example of light emitted from a light emission unit according to the embodiment of the present technology.

FIG. 7 is a view illustrating an example of light emitted from the light emission unit 110 according to the embodiment of the present technology.

The light emission unit 110 has a size of, for example, about 1 cm square. In the light emission unit 110, for example, about 300 to 600 light emitting elements 111 are disposed. The light emission unit 110 has, for example, a light output of 1 W to 5 W. A wavelength is assumed to be, for example, 940 nm, but may also be 850 nm or 1500 nm as another example.

Figure 8:
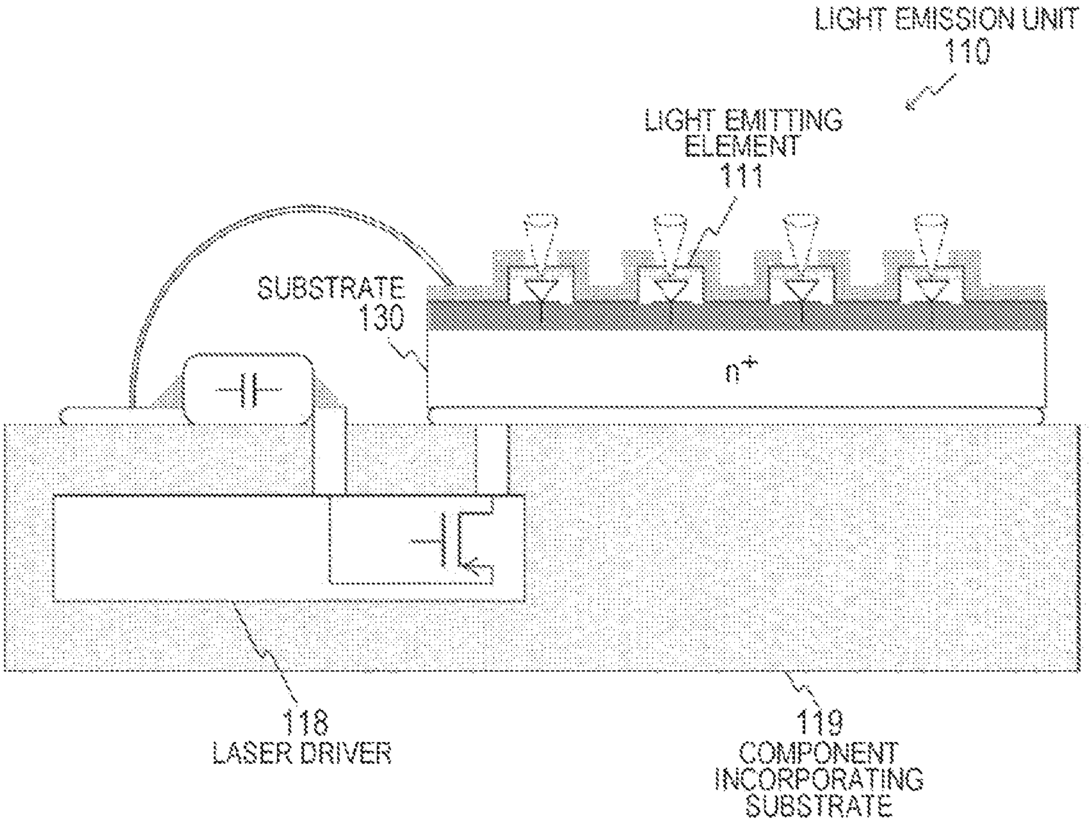
FIG. 8 is a cross-sectional view illustrating an example of a configuration of a light emission unit according to the embodiment of the present technology.

FIG. 8 is a cross-sectional view illustrating an example of a configuration of the light emission unit 110 according to the embodiment of the present technology.

The light emission unit 110 is, for example, a vertical cavity surface emitting laser (VCSEL) of a front surface emitting type including a plurality of the light emitting elements 111. Each of a plurality of the light emitting elements 111 is formed on an n-type substrate 130. The substrate 130 is mounted on a component incorporating substrate 119. The component incorporating substrate 119 may incorporate a laser driver 118 for driving the light emission unit 110. Note that the substrate 130 is not limited to the n-type, and may be a p-type or a high-resistance substrate.

Note that although an example of the front surface emitting type VCSEL is provided herein, a back surface emitting type VCSEL may also be used. Furthermore, the present technology is not limited to the VCSEL, and it is also possible to apply to a configuration in which a plurality of end face emitting lasers is disposed.

[Structure of Light Emitting Element]

Figure 9:
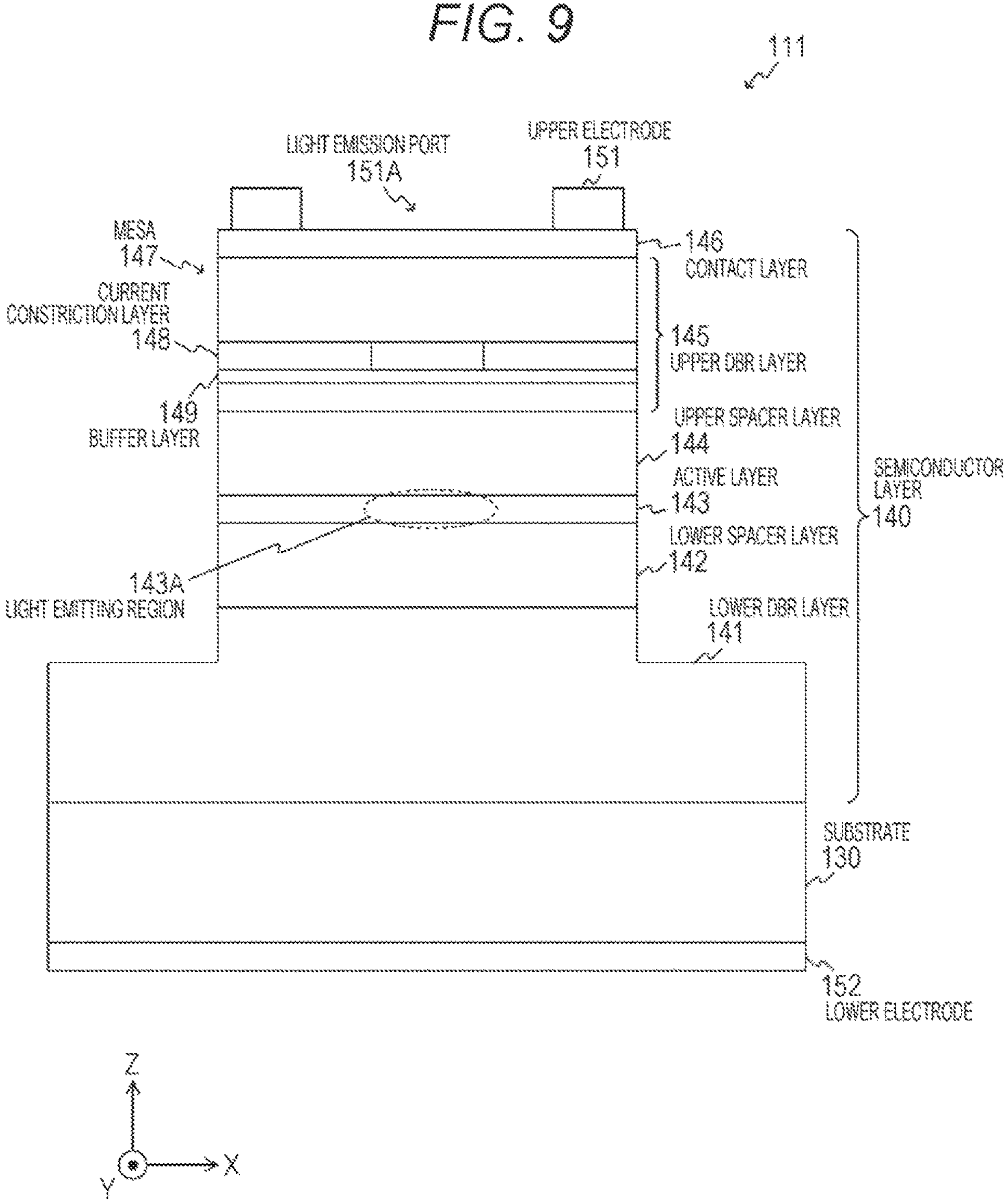
FIG. 9 is a cross-sectional view illustrating a first structural example of a light emitting element according to the embodiment of the present technology.

FIG. 9 is a cross-sectional view illustrating a first structural example of the light emitting element 111 according to the embodiment of the present technology.

A plurality of the light emitting elements 111 is disposed in an array on the substrate 130. Each of the light emitting elements 111 includes a semiconductor layer 140 including a lower distributed Bragg reflector (DBR) layer 141, a lower spacer layer 142, an active layer 143, an upper spacer layer 144, an upper DBR layer 145, and a contact layer 146 in this order on a front surface side of the substrate 130. An upper portion of the semiconductor layer 140, specifically, a part of the lower DBR layer 141, the lower spacer layer 142, the active layer 143, the upper spacer layer 144, the upper DBR layer 145, and the contact layer 146 form a columnar mesa 147. In the mesa 147, the center of the active layer 143 forms a light emitting region 143A. Furthermore, the upper DBR layer 145 is provided with a current constriction layer 148 and a buffer layer 149.

The substrate 130 is, for example, an n-type GaAs substrate. Examples of an n-type impurity include, for example, silicon (Si), selenium (Se) or the like. Each semiconductor layer 140 is configured by for example, an AlGaAs-based compound semiconductor. Here, the AlGaAs-based compound semiconductor is a compound semiconductor containing at least aluminum (Al) and gallium (Ga) among group 3B elements in a short-period periodic table and at least arsenic (As) among group 5B elements in the short-period periodic table. Note that other materials may also be used depending on the wavelength.

On an upper surface of the contact layer 146, which is an upper surface of the mesa 147, an annular upper electrode 151 including a light emission port 151A is formed. Furthermore, an insulation layer is formed on a side surface and a peripheral surface of the mesa 147. The upper electrode 151 is connected to an electrode unit provided on a front surface of the holding unit 121 by wire bonding via an electrode pad, and is electrically connected to the anode electrode units 124 and 125 provided on a back surface of the holding unit 121.

A lower electrode 152 is provided on a back surface of the substrate 130. The lower electrode 152 is electrically connected to the cathode electrode unit 123 provided on the back surface of the holding unit 121.

Note that although an example in which a cathode electrode is set as a common electrode and an anode electrode is separately provided is described in this example, depending on the structure of the light emitting element 111, the anode electrode may be set as the common electrode and the cathode electrode may be separately provided.

Figure 10:
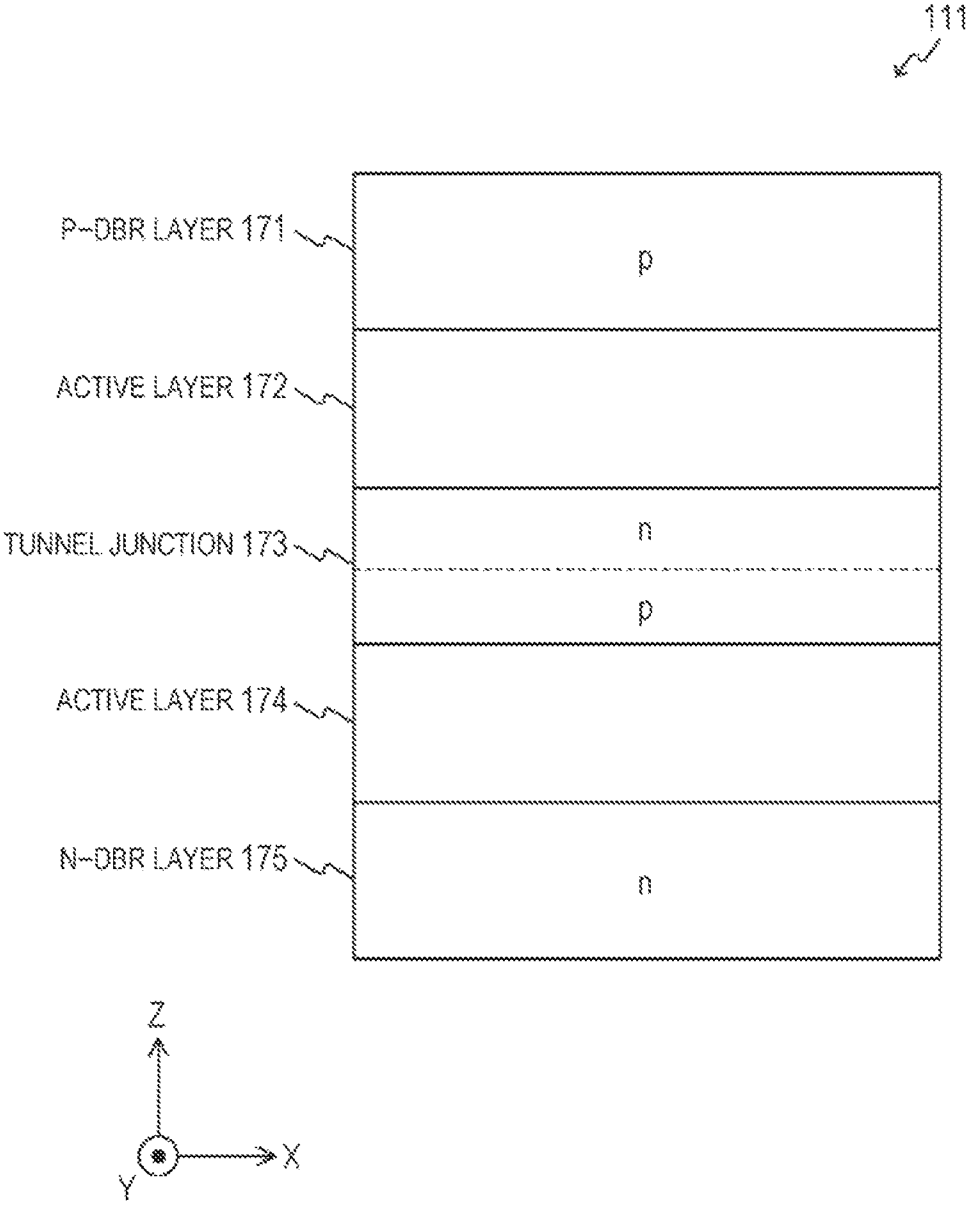
FIG. 10 is a cross-sectional view illustrating a second structural example of a light emitting element according to the embodiment of the present technology.

FIG. 10 is a cross-sectional view illustrating a second structural example of the light emitting element 111 according to the embodiment of the present technology.

The light emitting element 111 of the second configuration example is a multi-junction VCSEL, and has a structure in which a P-DBR layer 171, an active layer 172, a tunnel junction 173, an active layer 174, and an N-DBR layer 175 are stacked in this order from an emission side. That is, two pn junctions are connected, and active layers (active regions) 172 and 174 that emit a laser oscillation wavelength are stacked between the pn junctions in a vertical direction. By providing a plurality of the active layers 172 and 174 in this manner, the output of the light of each of the light emitting elements 111 may be improved (refer to "Zhu Wenjun, et. al: 'Analysis of the operating point of a novel multiple-active region tunneling-regenerated vertical-cavity surface-emitting laser', Proc. of International Conference on Solid-State and Integrated Circuit Technology, Vol. 6, pp. 1306-1309, 2001"). According to this multi-junction VCSEL, it is possible to reduce a size and a cost of the element. Note that although omitted in the second structural example, similarly to the first structural example, a spacer layer in the vicinity of the active layer, a buffer layer, a current constriction layer, a mesa, a light emission port, an upper electrode layer, and a lower electrode layer may be provided.

In the embodiment of the present technology, since spot light is divided by the diffraction element 134, it is possible to increase the number of spots while maintaining or enhancing light intensity of the spot light by combining with the multi-junction VCSEL. Then, therefore, both distance measurement accuracy and distance measurement resolution may be satisfied.

[Tiling]

Figure 11:
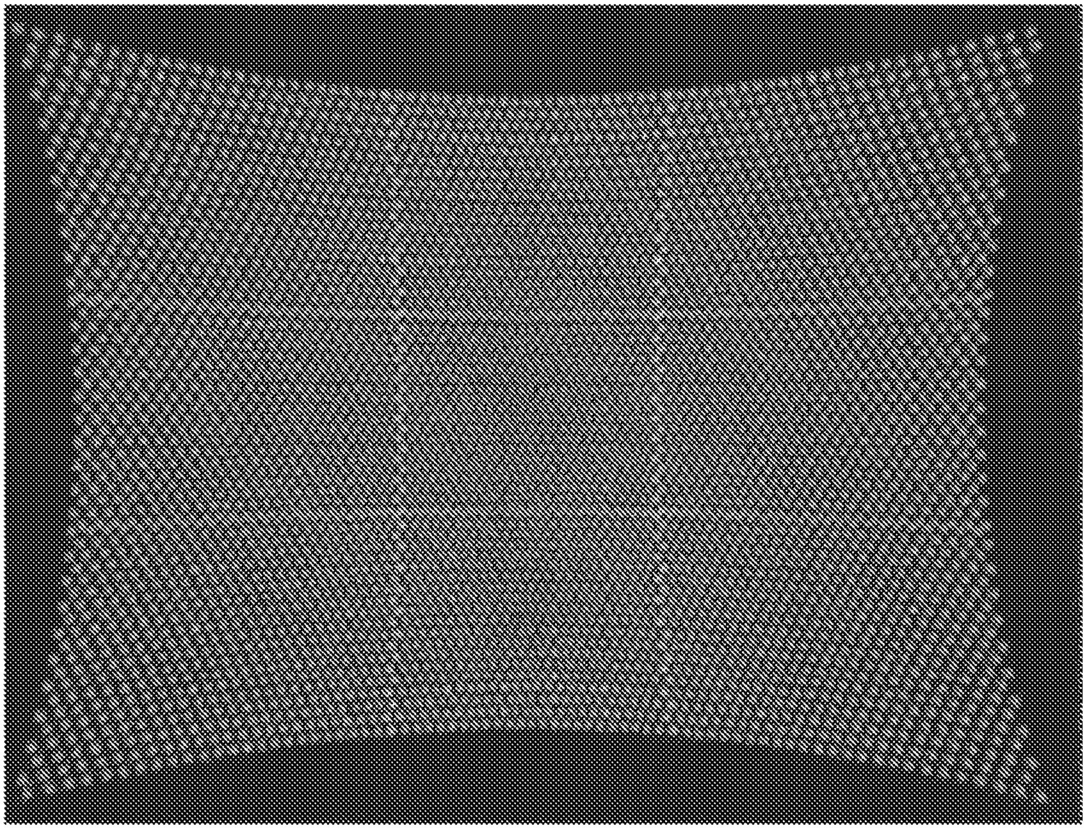
FIG. 11 is a view illustrating an example of an irradiation pattern of a diffraction element according to the embodiment of the present technology.

FIG. 11 is a view illustrating an example of an irradiation pattern of the diffraction element 114 according to the embodiment of the present technology.

The diffraction element 114 separates each of the light beams emitted from the light emission unit 110 and then collimated by the collimator lens 113 into a plurality of light beams. In this example, for each of the light beams in a central quadrangle, replicas are generated in eight directions, for example, in vertical, horizontal, and oblique directions, and tiling in 3×3 is performed.

On the other hand, the diffraction element 134 generates diffracted light of a predetermined order as will described later for each of the light beams tiled by the diffraction element 114 in this manner.

[Structure of Diffraction Element]

Figure 12:
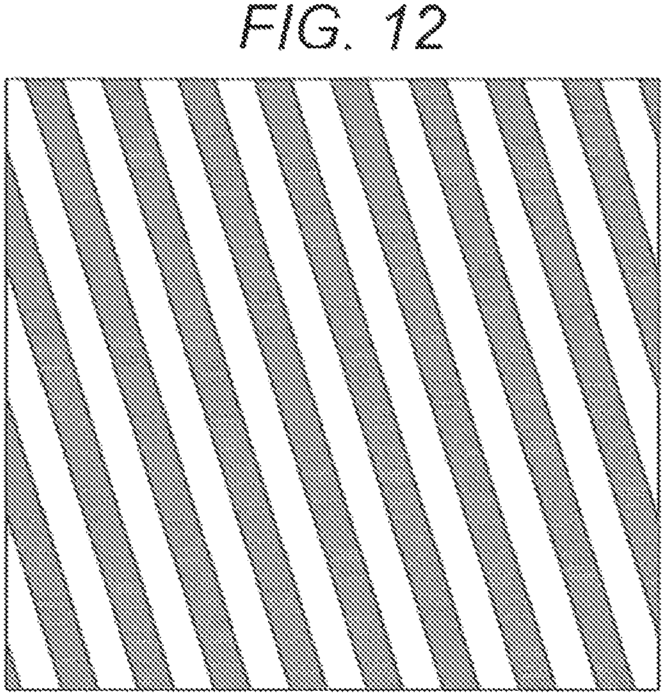
FIG. 12 is a view illustrating a structural example of a diffraction element according to a first embodiment of the present technology.

FIG. 12 is a view illustrating a structural example of the diffraction element 134 according to a first embodiment of the present technology.

In the first embodiment, it is assumed that the light is divided into three by the diffraction element 134. Accordingly, the diffraction element 134 uses a diffraction grating obtained by providing fine parallel slits on a plane of glass and the like. Therefore, the diffraction element 134 generates diffracted light in one direction for the irradiation pattern of the diffraction element 114 described above.

[Arrangement of Light Emitting Element]

Figure 13:
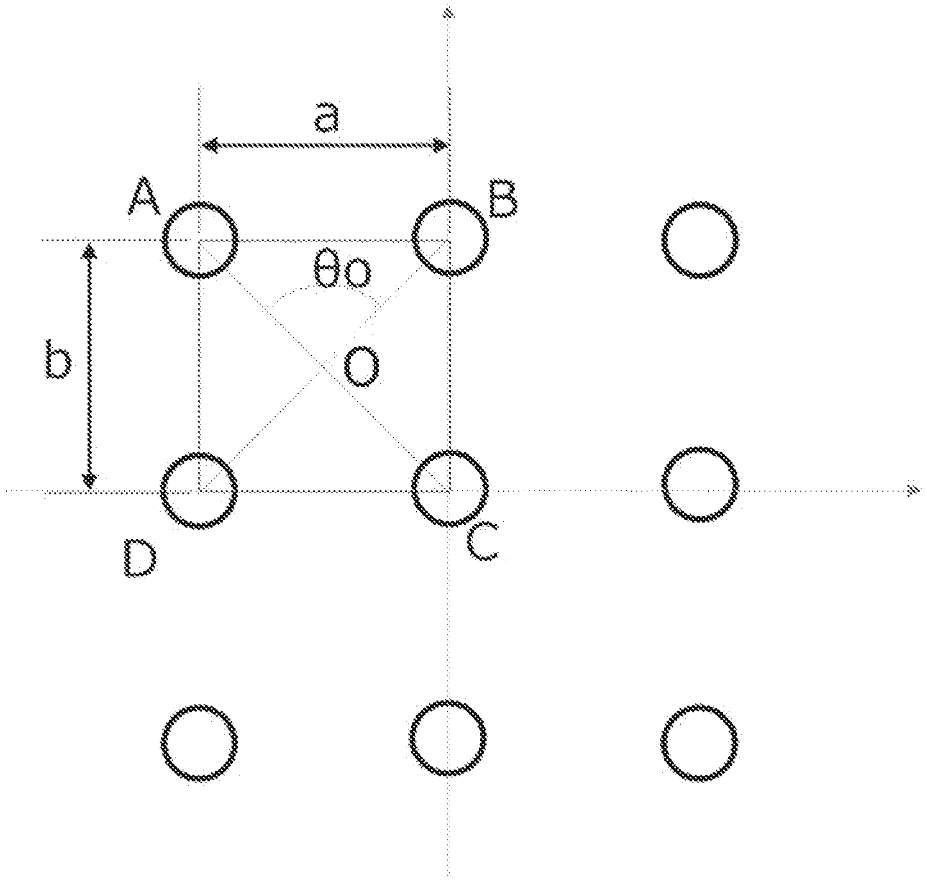
FIG. 13 is a diagram illustrating an arrangement example of a light emitting element in a light emission unit according to the embodiment of the present technology.

FIG. 13 is a diagram illustrating an arrangement example of the light emitting element 111 in the light emission unit 110 according to the embodiment of the present technology.

As described above, a plurality of the light emitting elements 111 is disposed in the light emission unit 110. The light emission unit 110 has a multi-array structure based on a structure in which the light emitting elements 111 are respectively disposed at vertexes A, B, C, and D forming a quadrangle of which sides facing each other are parallel to each other. It is assumed that a distance between the light emitting elements 111 on a side AB (DC) in one direction is set to a, a distance between the light emitting elements 111 on a side AD (BC) orthogonal to the side AB (DC) is set to b, a point at which diagonal lines formed by the vertexes A, B, C, and D intersect each other is set to a point O, and an angle AOB formed by two diagonal lines is set to θo.

[Diffracted Light]

Figure 14:
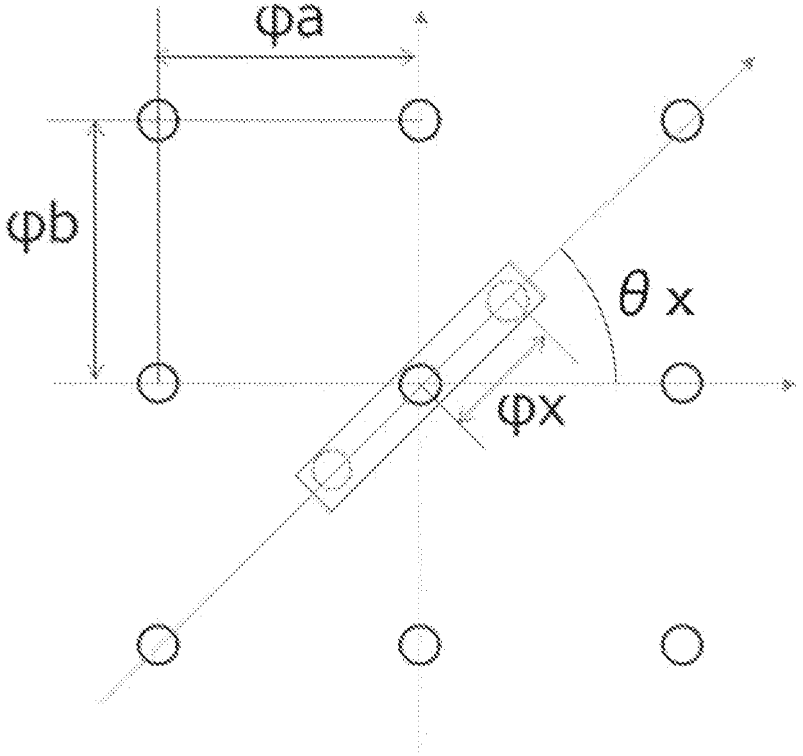
FIG. 14 is a diagram illustrating an example of diffracted light by one light emitting element according to the first embodiment of the present technology.
Figure 15:
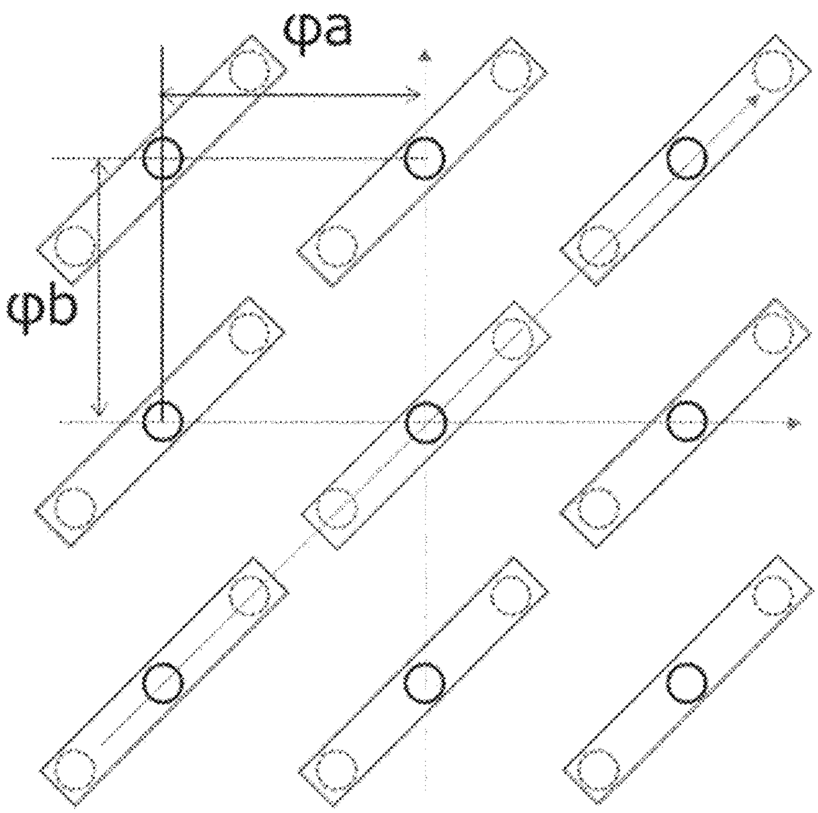
FIG. 15 is a diagram illustrating an example of diffracted lights by a plurality of light emitting elements according to the first embodiment of the present technology.

FIG. 14 is a diagram illustrating an example of the diffracted light by one light emitting element 111 according to the first embodiment of the present technology. FIG. 15 is a diagram illustrating an example of the diffracted lights by a plurality of the light emitting elements 111 according the first embodiment of the present technology.

In the first embodiment, it is assumed that n=1 (n is a natural number in the number of diffraction directions), that is, the diffracted light in one direction is generated. The diffraction element 134 generates positive first order diffracted light and negative first order diffracted light (indicated by a dotted circle in the drawing) for the light emitted from one light emitting element 111 at the point C described above. Therefore, a total of two diffracted lights are generated for one light emitting element 111.

An angle θx (refer to FIG. 14) formed between one diffraction direction and the side AB (CD) in one direction satisfies:

$$\theta x=\tan^{-1}(b/na).$$

When angle differences of two light beams generated by inter-light emission distances a and b after being collimated by the collimator lens 113 are set to φa and φb, respectively, a diffraction angle φx of the diffracted light satisfies:

$$\varphi x=m\times \mathrm{sqrt}\{(n\varphi a)^2+\varphi b^2\}/(2n+1).$$

Note that a diffraction unit m is one unit that defines a diffraction angle, and is a natural number excluding an integral multiple of (2n+1). This diffraction unit m desirably is:

m<2n+1. Note that in the present technology, sqrt (A) is a square root of A, which is $A^{1/2}$.

Figure 16:
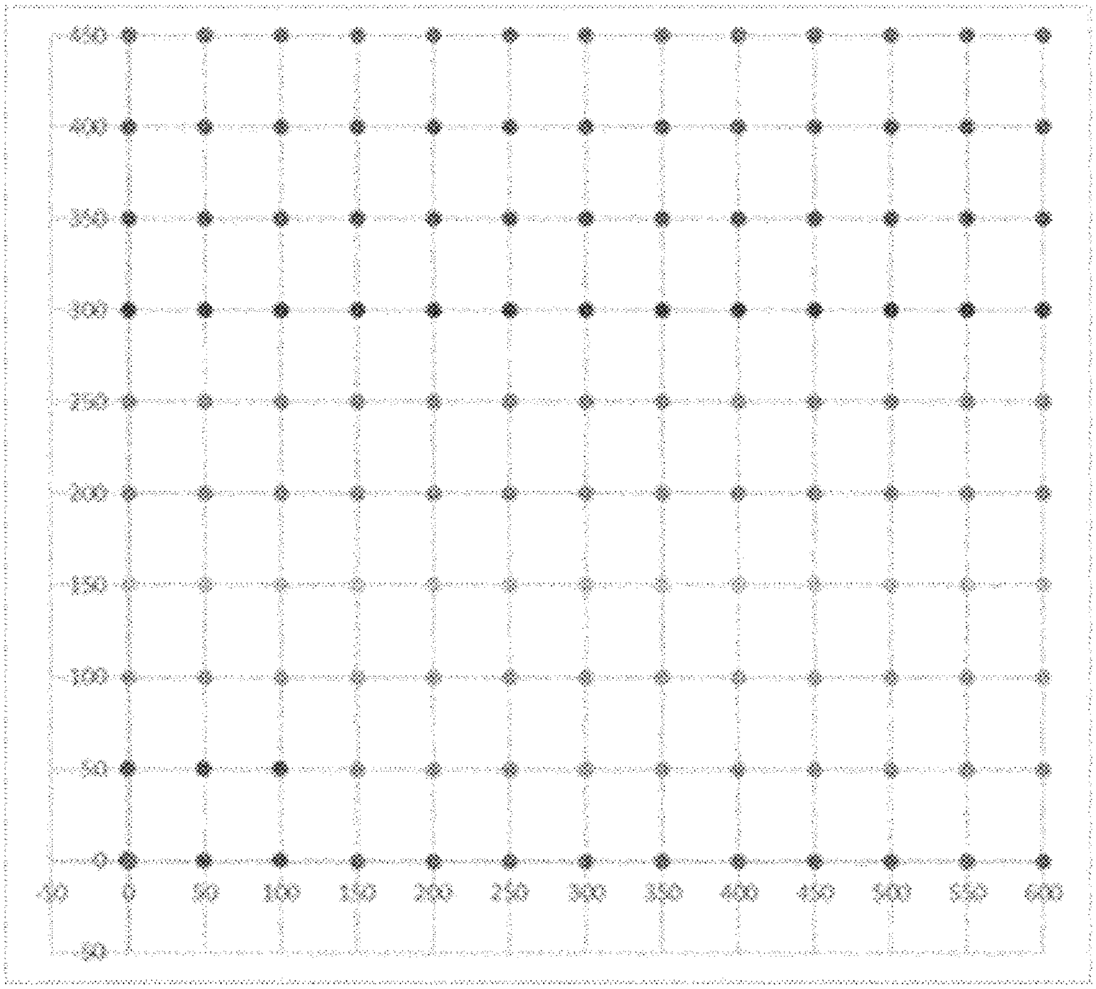
FIG. 16 is a diagram illustrating a specific example of a light irradiation spot pattern (a case where a diffraction element is not provided) according to the first embodiment of the present technology.
Figure 17:
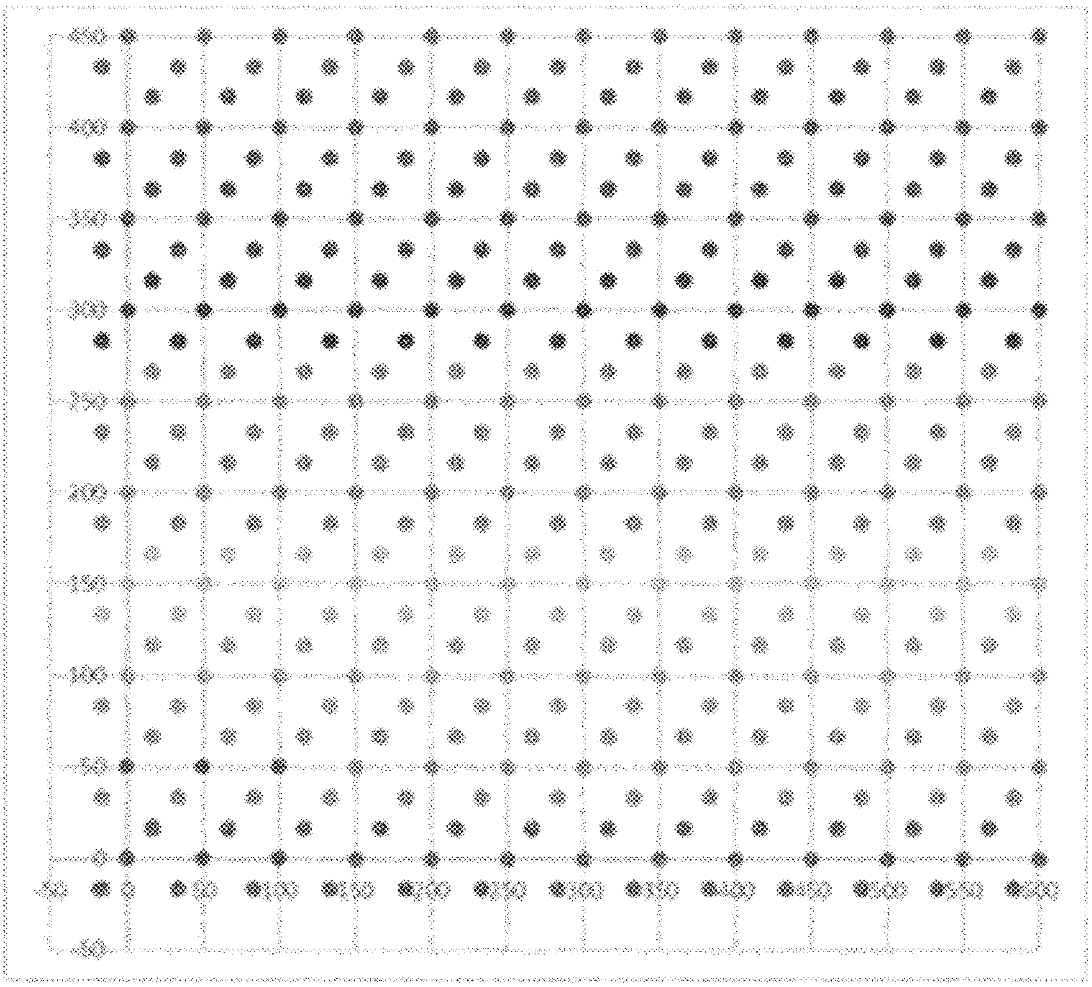
FIG. 17 is a diagram illustrating a specific example of a light irradiation spot pattern (m=2) according to the first embodiment of the present technology.
Figure 18:
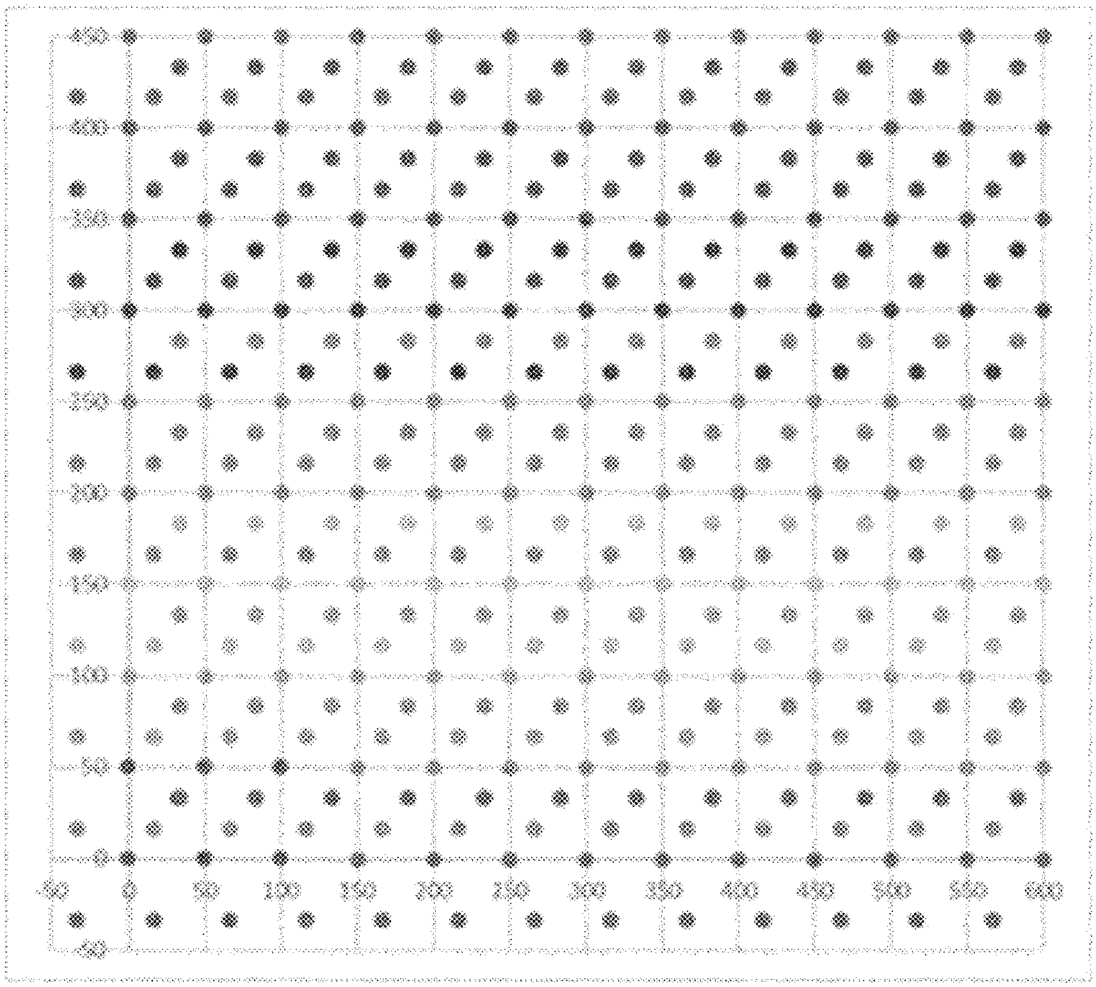
FIG. 18 is a diagram illustrating a specific example of a light irradiation spot pattern (m=4) according to the first embodiment of the present technology.

FIG. 16 to FIG. 18 are diagrams illustrating a specific example of a light irradiation spot pattern according to the first embodiment of the present technology. Here, the light emitting elements 111 are arrayed in 13×10. FIG. 16 illustrates an example of a case where the diffraction element 134 is not provided. FIG. 17 illustrates an example of a case where the diffraction element 134 is provided and the diffraction unit m is set to two. FIG. 18 illustrates an example of a case where the diffraction element 134 is provided and the diffraction unit m is set to four.

In this manner, since two diffracted lights are generated for one light emitting element 111, the number of spots increases threefold by zeroth order light from the light emitting element 111 itself, and the positive first order diffracted light and negative first order diffracted light generated by the diffraction element 134. Furthermore, the distances between the spots are kept regular. Therefore, the distance measurement resolution can be improved.

Furthermore, as a value of the diffraction unit m increases, the number of spots in a peripheral portion decreases. Therefore, the value of the diffraction unit m is desirably smaller. The diffraction unit m=2 is especially desirable. On the other hand, in a case where the diffraction angle is small and it is difficult to control the diffraction angle and efficiency of the diffraction element 134, it is also possible to design the diffraction unit m to be larger.

Note that in a case where the diffraction element 134 is provided, not a little high order diffracted light is generated. However, in the first embodiment of the present technology, since the high order diffracted light overlaps with the zeroth order light or the positive first order diffracted light and the negative first order diffracted light from another light emitting element, this effectively functions as the spot light.

Furthermore, an orientation of the diffraction element 134 may be reversed by 180 degrees. That is, the diffraction direction indicated in the present technology may be reversed by 180 degrees.

2. Second Embodiment

In the second embodiment, an example of dividing light into five by the diffraction element 134 is described. Note that the configuration other than the diffraction element 134 is similar to that of the first embodiment described above, and thus detailed description thereof will be omitted.

[Structure of Diffraction Element]

Figure 19:
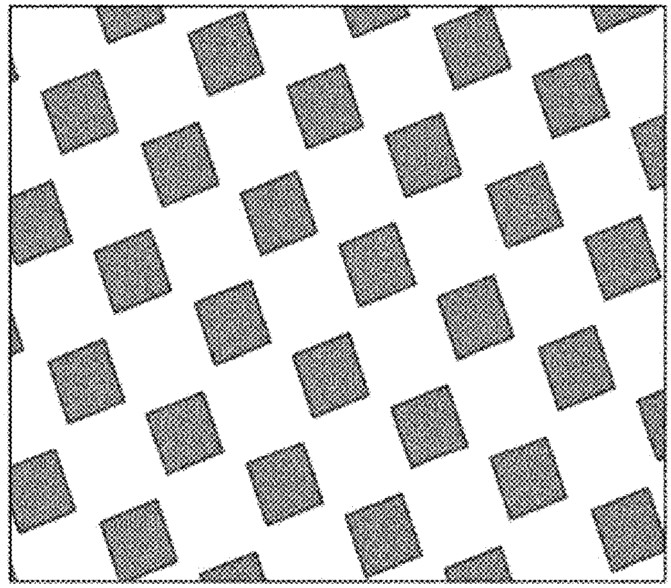
FIG. 19 is a view illustrating a structural example of a diffraction element according to a second embodiment of the present technology.

FIG. 19 is a view illustrating a structural example of the diffraction element 134 according to the second embodiment of the present technology.

In the second embodiment, it is assumed that the light is divided into five by the diffraction element 134. Accordingly, a diffractive optical element (DOE) having a fine grating shape formed on a plane of glass and the like is used as the diffraction element 134. Therefore, the diffraction element 134 generates diffracted lights in two directions with respect to the irradiation pattern of the diffraction element 114 described above.

[Diffracted Light]

Figure 20:
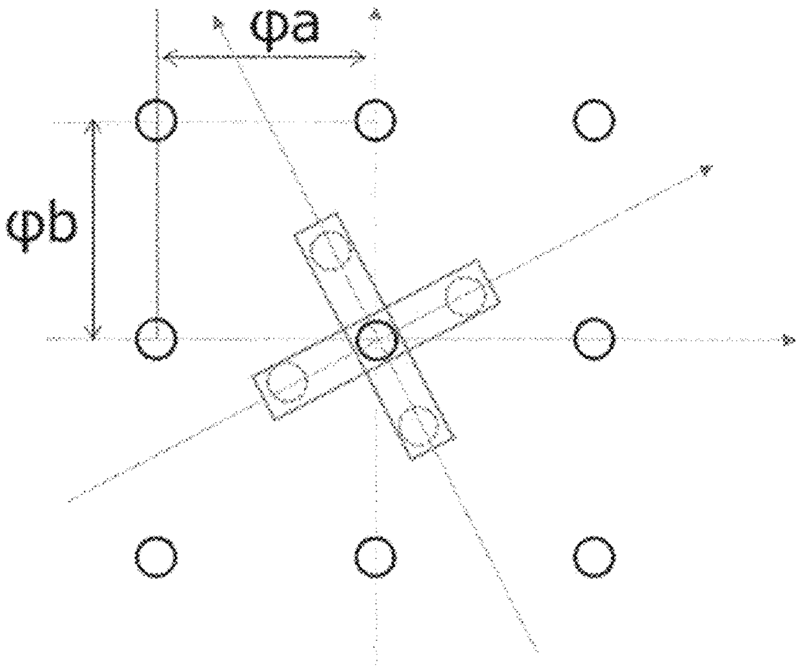
FIG. 20 is a diagram illustrating an example of diffracted light by one light emitting element according to the second embodiment of the present technology.
Figure 21:
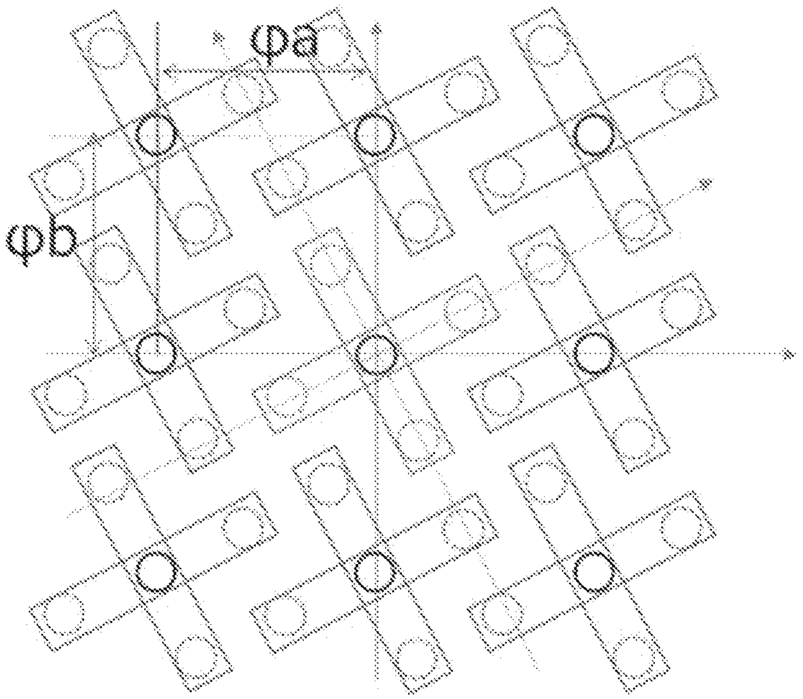
FIG. 21 is a diagram illustrating an example of diffracted lights by a plurality of light emitting elements according to the second embodiment of the present technology.

FIG. 20 is a diagram illustrating an example of the diffracted light by one light emitting element 111 according to the second embodiment of the present technology. FIG. 21 is a diagram illustrating an example of the diffracted lights by a plurality of the light emitting elements 111 according the second embodiment of the present technology.

In the second embodiment, it is assumed that n=2, that is, the diffracted lights in two directions are generated. The diffraction element 134 generates positive first order diffracted light and negative first order diffracted light (indicated by a dotted circle in the drawing) in two directions, respectively, for the light emitted from one light emitting element 111 at the point C described above. Therefore, a total of four diffracted lights are generated for one light emitting element 111.

The angle θx formed between one diffraction direction and the side AB (CD) in one direction satisfies:

$$\theta x=\tan^{-1}(b/na).$$

When angle differences of two light beams generated by inter-light emission distances a and b after being collimated by the collimator lens 113 are set to φa and φb, respectively, a diffraction angle φx of the diffracted light satisfies:

$$\varphi x=m\times \mathrm{sqrt}\{(n\varphi a)^2+\varphi b^2\}/(2n+1).$$

Note that as described above, in the second embodiment, the diffraction unit m is a natural number excluding an integral multiple of (2n+1).

Moreover, an angle θx formed between another diffraction direction and the side AB (CD) in one direction satisfies:

$$\theta x=\tan^{-1}(-nb/a).$$

When angle differences of two light beams generated by inter-light emission distances a and b after being collimated by the collimator lens 113 are set to φa and φb, respectively, a diffraction angle φx of the diffracted light satisfies:

$$\varphi x=m\times \mathrm{sqrt}\{\varphi a^2+(n\varphi b)^2\}/(2n+1).$$

Figure 22:
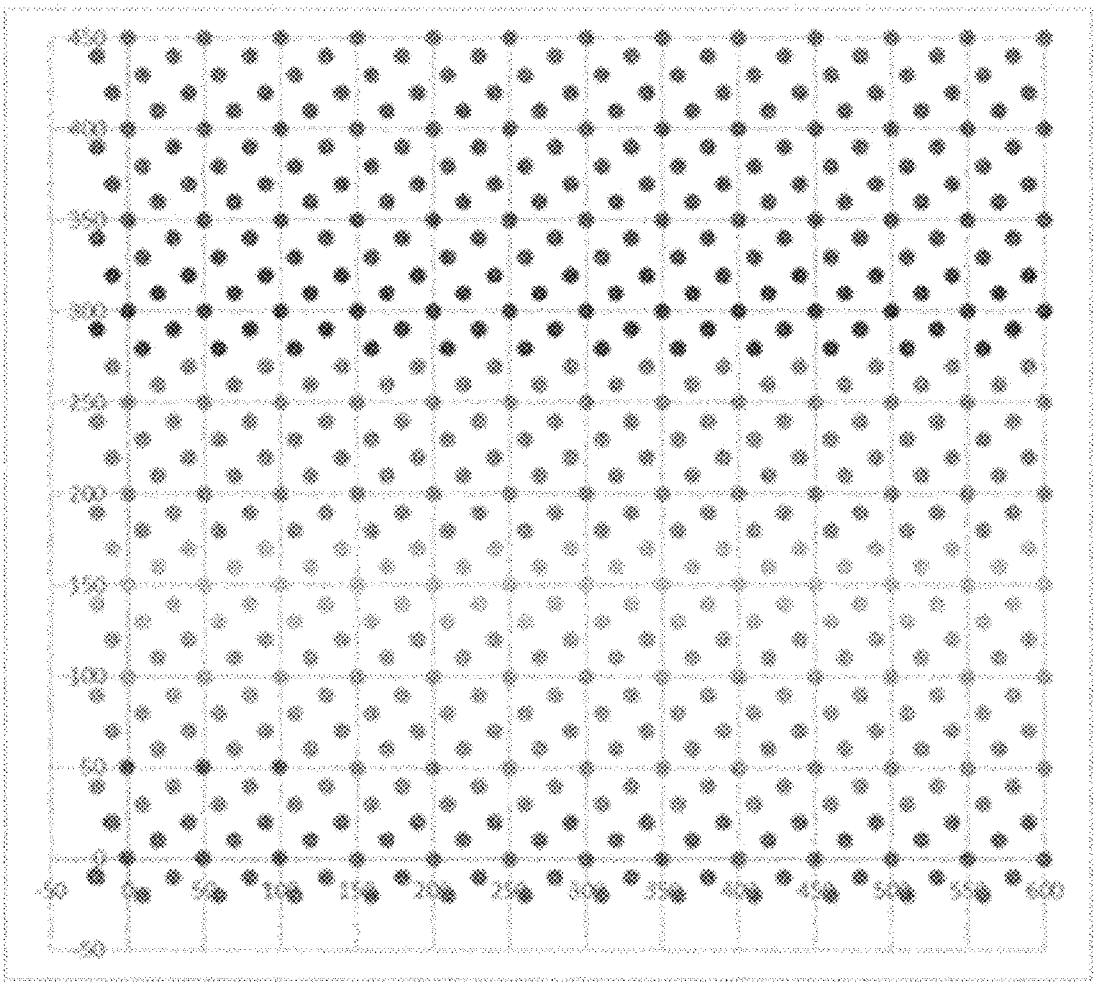
FIG. 22 is a diagram illustrating a specific example of a light irradiation spot pattern (m=2) according to the second embodiment of the present technology.
Figure 23:
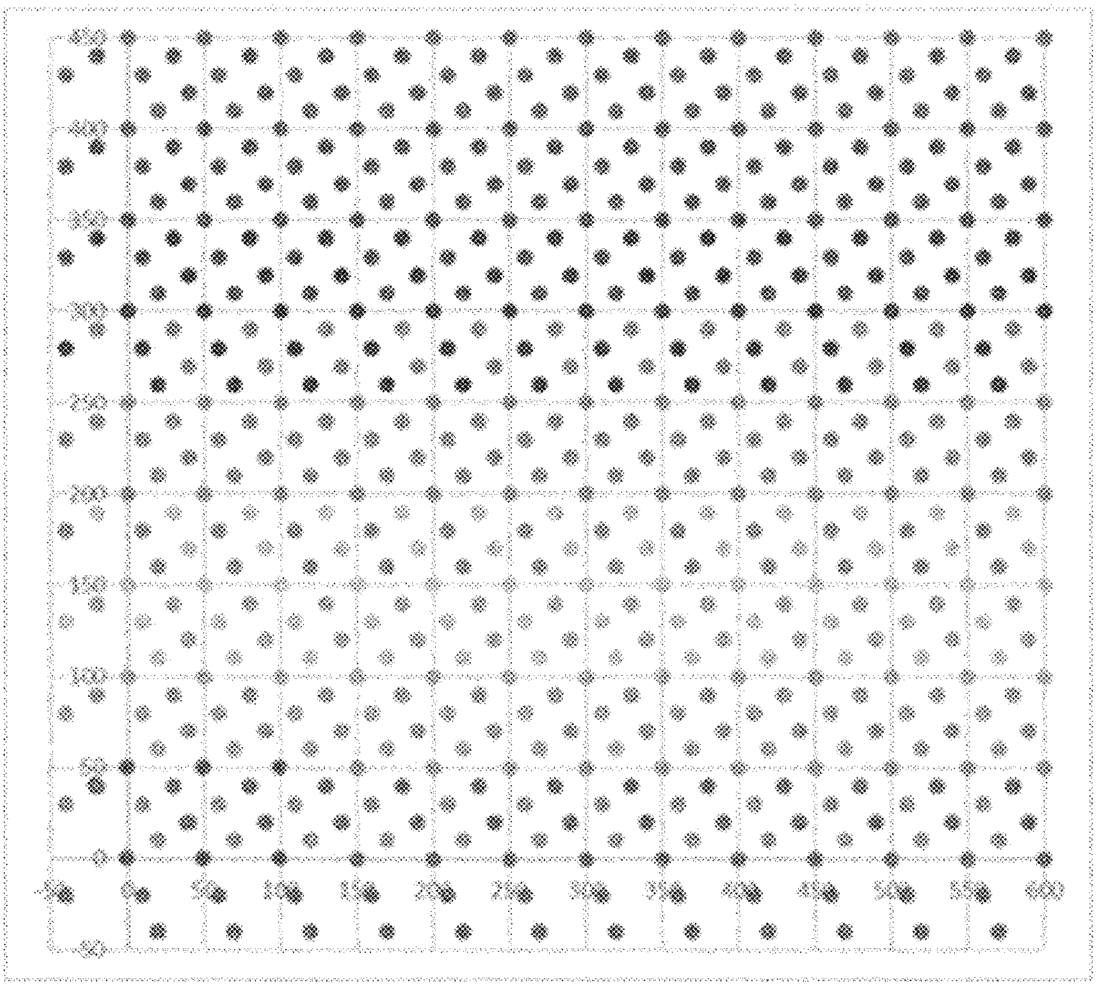
FIG. 23 is a diagram illustrating a specific example of a light irradiation spot pattern (m=4) according to the second embodiment of the present technology.
Figure 24:
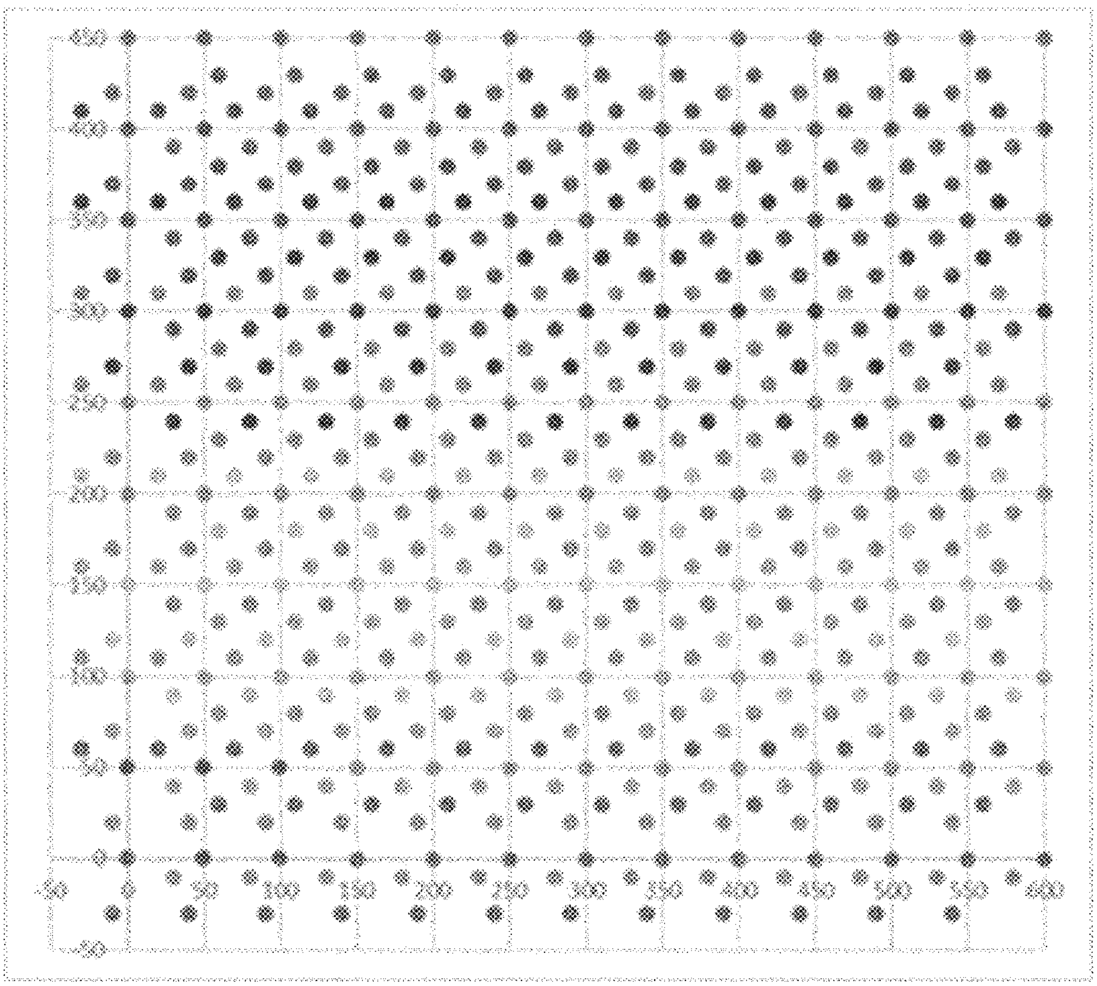
FIG. 24 is a diagram illustrating a specific example of a light irradiation spot pattern (m=6) according to the second embodiment of the present technology.
Figure 25:
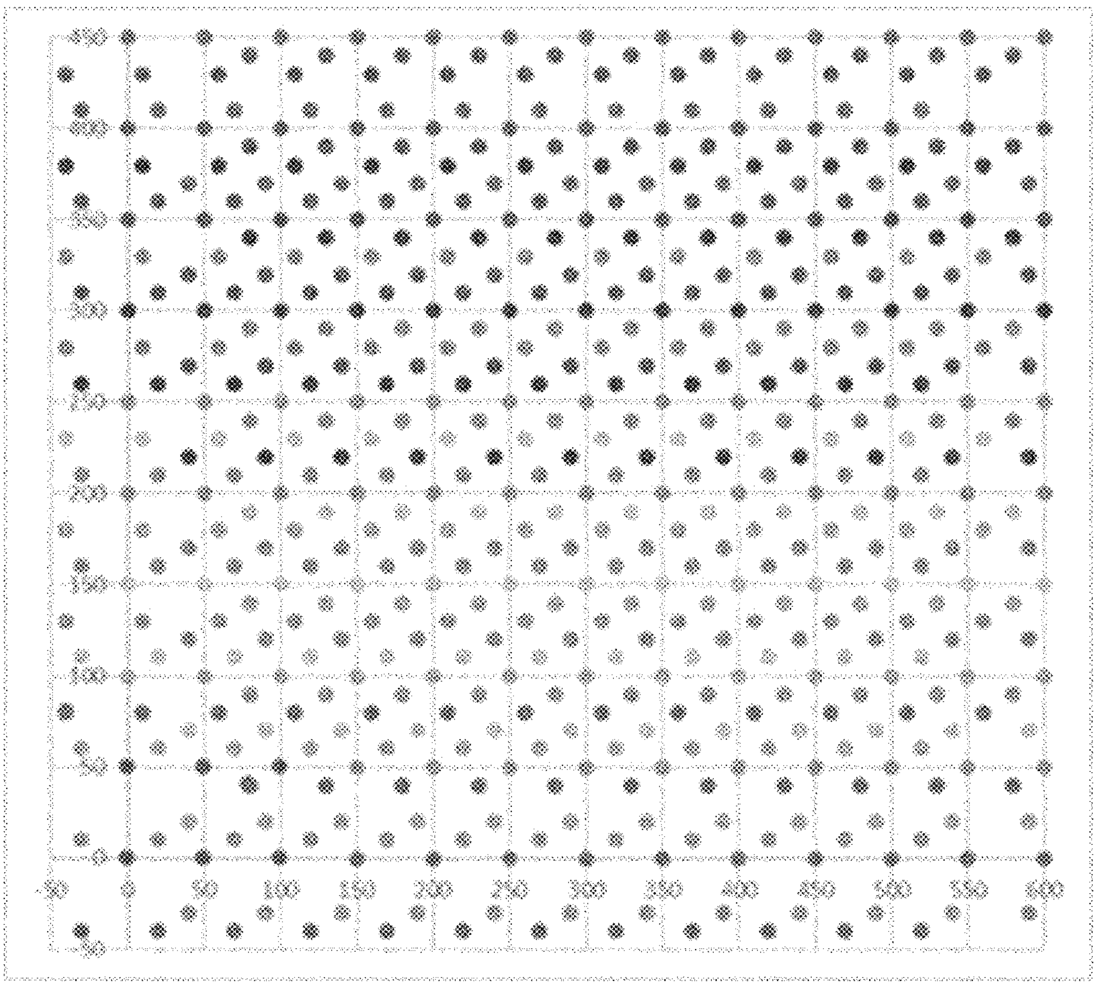
FIG. 25 is a diagram illustrating a specific example of a light irradiation spot pattern (m=8) according to the second embodiment of the present technology.

FIG. 22 to FIG. 25 are diagrams illustrating a specific example of a light irradiation spot pattern according to the second embodiment of the present technology. FIG. 22 illustrates an example of a case where the diffraction unit m is set to two. FIG. 23 illustrates an example of a case where the diffraction unit m is set to four. FIG. 24 illustrates an example of a case where the diffraction unit m is set to six. FIG. 25 illustrates an example of a case where the diffraction unit m is set to eight.

In this manner, since four diffracted lights are generated for one light emitting element 111, the number of spots increases fivefold by the zeroth order light, the positive first order diffracted lights, and the negative first order diffracted lights. Furthermore, the distances between the spots are kept regular. Therefore, the distance measurement resolution may be further improved.

Furthermore, as a value of the diffraction unit m increases, the number of spots in a peripheral portion decreases. Therefore, the value of the diffraction unit m is desirably smaller. The diffraction unit m=2 is especially desirable. On the other hand, in a case where the diffraction angle is small and it is difficult to control the diffraction angle and efficiency of the diffraction element 134, it is also possible to design the diffraction unit m to be larger.

Furthermore, an orientation of the diffraction element 134 may be reversed by 180 degrees. That is, the diffraction direction indicated in the present technology may be reversed by 180 degrees.

3. Third Embodiment

In the third embodiment, an example of dividing light into seven by the diffraction element 134 is described. Note that the configuration other than the diffraction element 134 is similar to that of the first embodiment described above, and thus detailed description thereof will be omitted.

[Diffracted Light]

Figure 26:
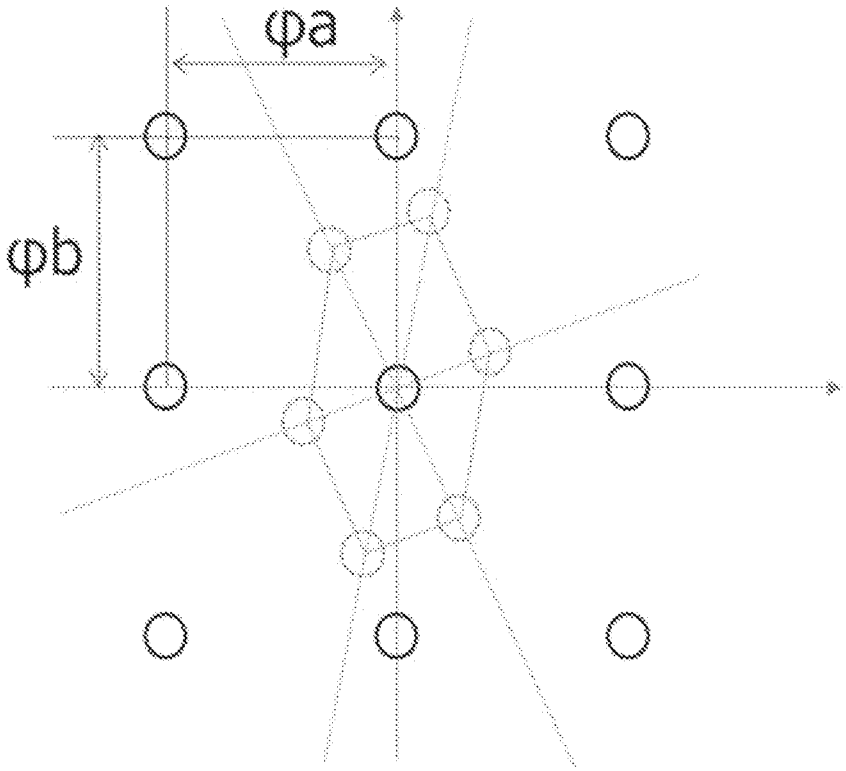
FIG. 26 is a diagram illustrating an example of diffracted light by one light emitting element according to a third embodiment of the present technology.
Figure 27:
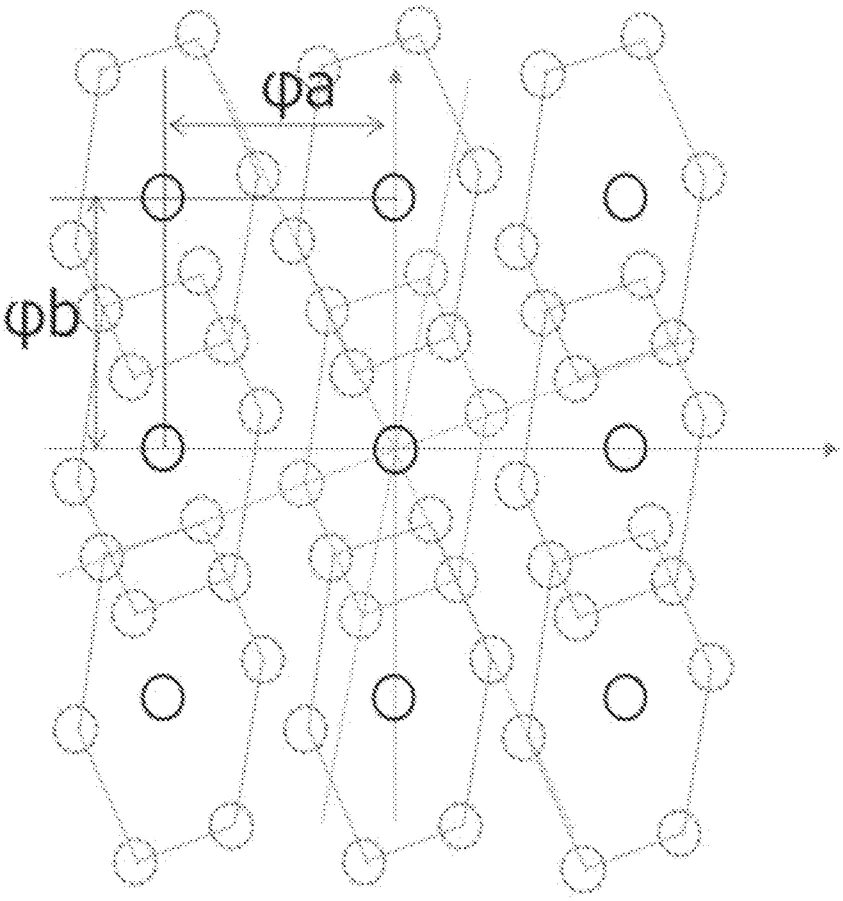
FIG. 27 is a diagram illustrating an example of diffracted lights by a plurality of light emitting elements according to the third embodiment of the present technology.

FIG. 26 is a diagram illustrating an example of the diffracted light by one light emitting element 111 according to the third embodiment of the present technology. FIG. 27 is a diagram illustrating an example of the diffracted lights by a plurality of the light emitting elements 111 according to the third embodiment of the present technology.

In the third embodiment, it is assumed that n=3, that is, the diffracted lights in three directions are generated. The diffraction element 134 generates positive first order diffracted lights and negative first order diffracted lights (indicated by a dotted circle in the drawing) in three directions, respectively, for the light emitted from one light emitting element 111 at the point C described above. Therefore, a total of six diffracted lights are generated for one light emitting element 111.

The angle θx formed between one diffraction direction and the side AB (CD) in one direction satisfies:

$$\theta x=\tan^{-1}(b/na).$$

When angle differences of two light beams generated by inter-light emission distances a and b after being collimated by the collimator lens 113 are set to φa and φb, respectively, a diffraction angle φx of the diffracted light satisfies:

$$\varphi x=m\times\mathrm{sqrt}\{\varphi a^2+(n\varphi b)^2\}/(2n+1).$$

The angle θx formed between another diffraction direction and the side AB (CD) in one direction satisfies:

$$\theta x=\tan^{-1}(5b/a).$$

When angle differences of two light beams generated by inter-light emission distances a and b after being collimated by the collimator lens 113 are set to φa and φb, respectively, a diffraction angle φx of the diffracted light satisfies:

$$\varphi x=m\times\mathrm{sqrt}\{\varphi a^2+(5\varphi b)^2\}/(2n+1).$$

An angle θx formed between still another diffraction direction and the side AB (CD) in one direction satisfies:

$$\theta x=\tan^{-1}(-4b/2a)$$

When angle differences of two light beams generated by inter-light emission distances a and b after being collimated by the collimator lens 113 are set to φa and φb, respectively, a diffraction angle φx of the diffracted light satisfies:

$$\varphi x=m\times\mathrm{sqrt}\{(2\varphi a)^2+(4\varphi b)^2\}/\{2(2n+1)\}.$$

Note that as described above, the diffraction unit m is a natural number excluding an integral multiple of (2n+1).

Figure 28:
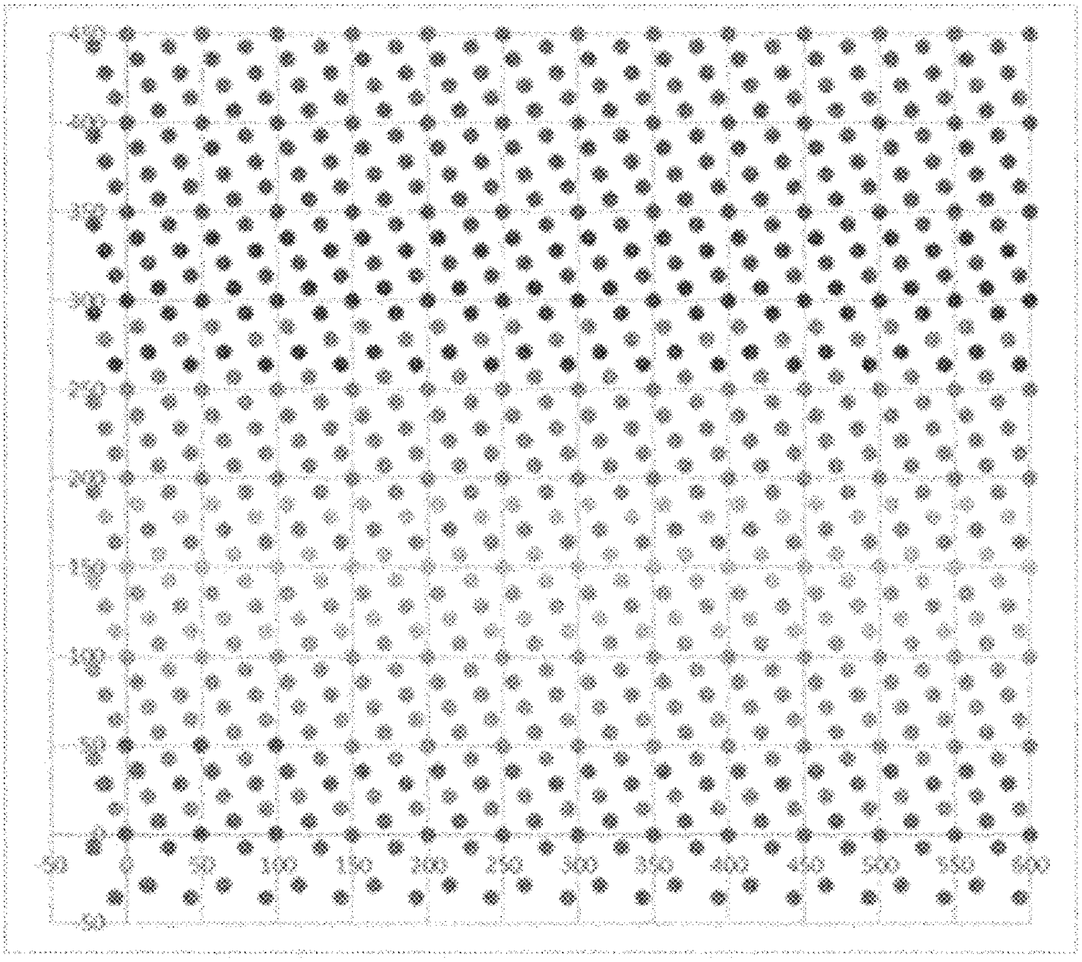
FIG. 28 is a diagram illustrating a specific example of a light irradiation spot pattern (m=2) according to the third embodiment of the present technology.
Figure 29:
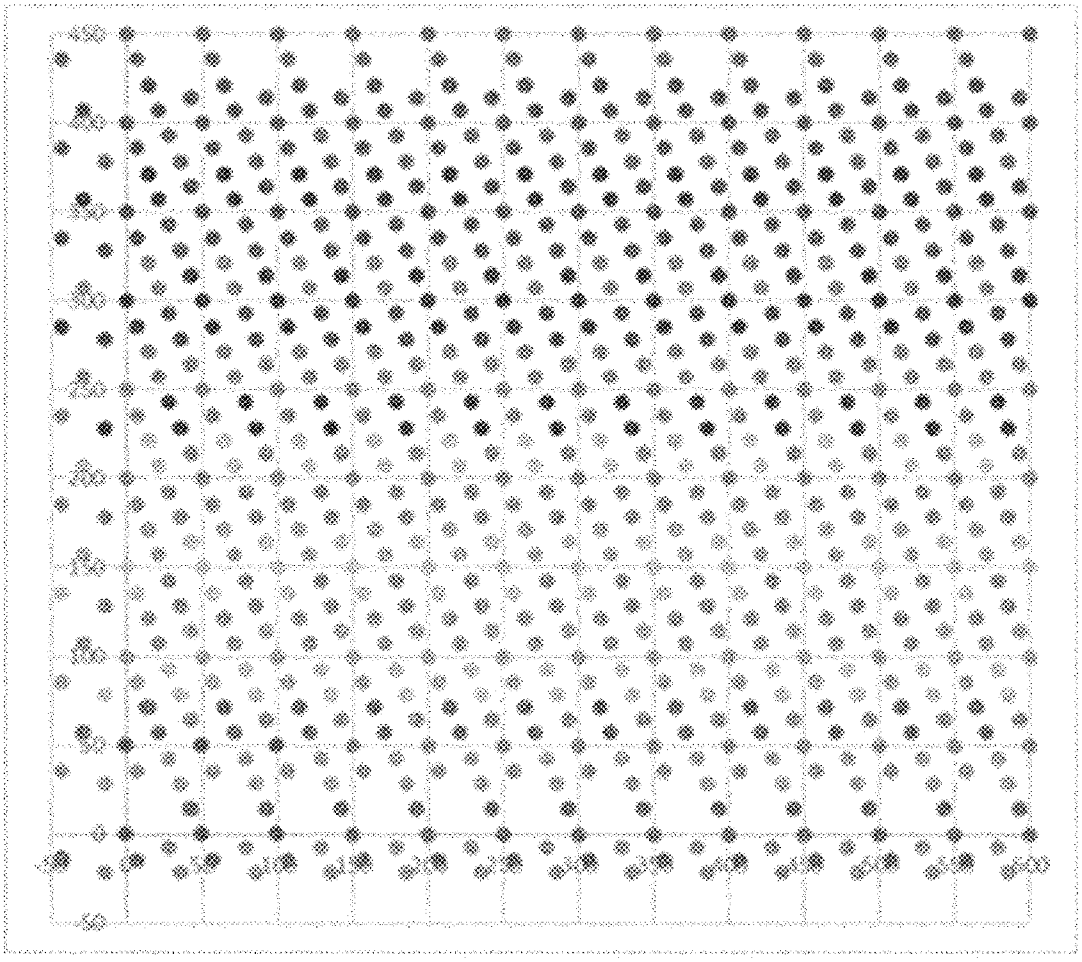
FIG. 29 is a diagram illustrating a specific example of a light irradiation spot pattern (m=4) according to the third embodiment of the present technology.
Figure 30:
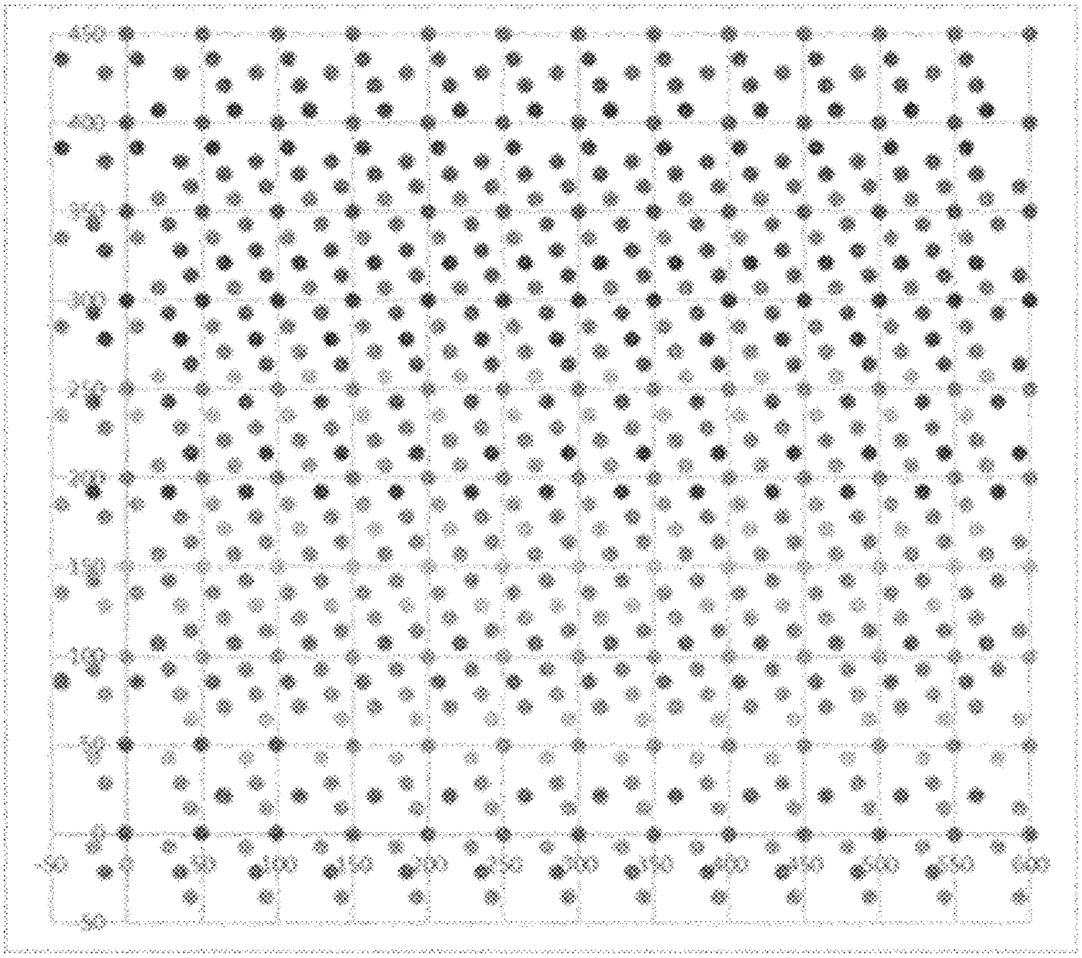
FIG. 30 is a diagram illustrating a specific example of a light irradiation spot pattern (m=6) according to the third embodiment of the present technology.
Figure 31:
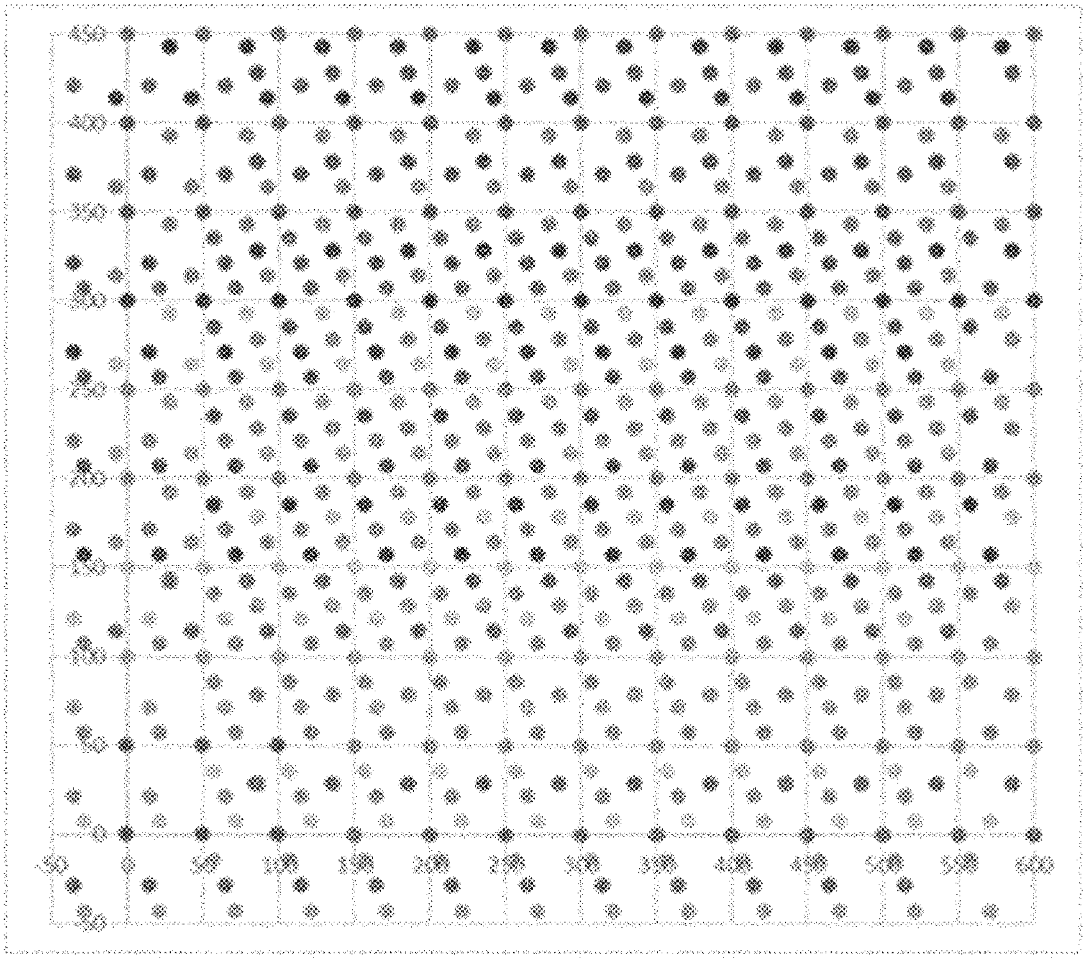
FIG. 31 is a diagram illustrating a specific example of a light irradiation spot pattern (m=8) according to the third embodiment of the present technology.

FIG. 28 to FIG. 31 are diagrams illustrating a specific example of a light irradiation spot pattern according to the third embodiment of the present technology. FIG. 28 illustrates an example of a case where the diffraction unit m is set to two. FIG. 29 illustrates an example of a case where the diffraction unit m is set to four. FIG. 30 illustrates an example of a case where the diffraction unit m is set to six. FIG. 31 illustrates an example of a case where the diffraction unit m is set to eight.

In this manner, since six diffracted lights are generated for one light emitting element 111, the number of spots increases sevenfold by the zeroth order light, the positive first order diffracted lights, and the negative first order diffracted lights. Furthermore, the distances between the spots are kept regular. Therefore, the distance measurement resolution may be further improved.

Furthermore, as a value of the diffraction unit m increases, the number of spots in a peripheral portion decreases. Therefore, the value of the diffraction unit m is desirably smaller. The diffraction unit m=2 is especially desirable. On the other hand, in a case where the diffraction angle is small and it is difficult to control the diffraction angle and efficiency of the diffraction element 134, it is also possible to design the diffraction unit m to be larger.

Furthermore, an orientation of the diffraction element 134 may be reversed by 180 degrees. That is, the diffraction direction indicated in the present technology may be reversed by 180 degrees.

4. Fourth Embodiment

In the fourth embodiment, an example of dividing light into nine by the diffraction element 134 is described. Note that the configuration other than the diffraction element 134 is similar to that of the first embodiment described above, and thus detailed description thereof will be omitted.

[Diffracted Light]

Figure 32:
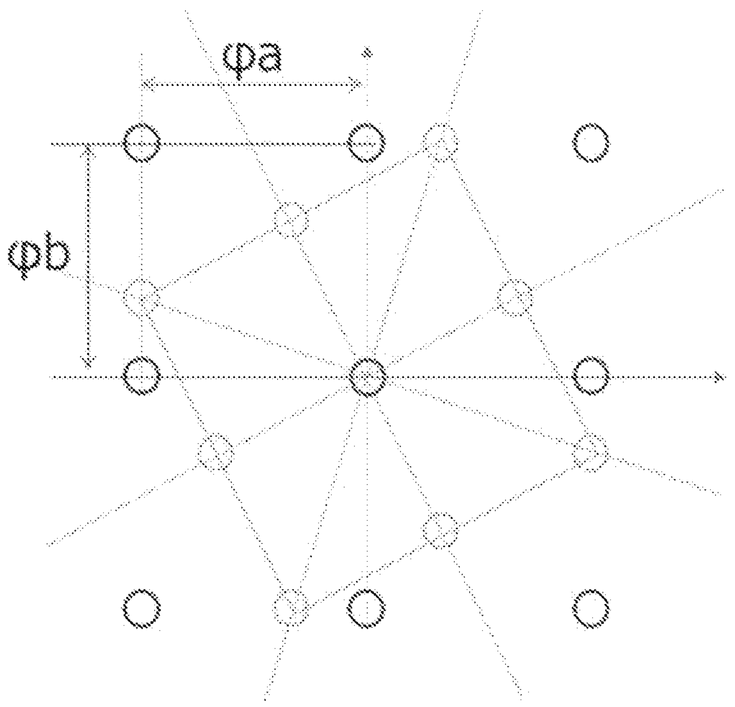
FIG. 32 is a diagram illustrating an example of diffracted light by one light emitting element according to a fourth embodiment of the present technology.
Figure 33:
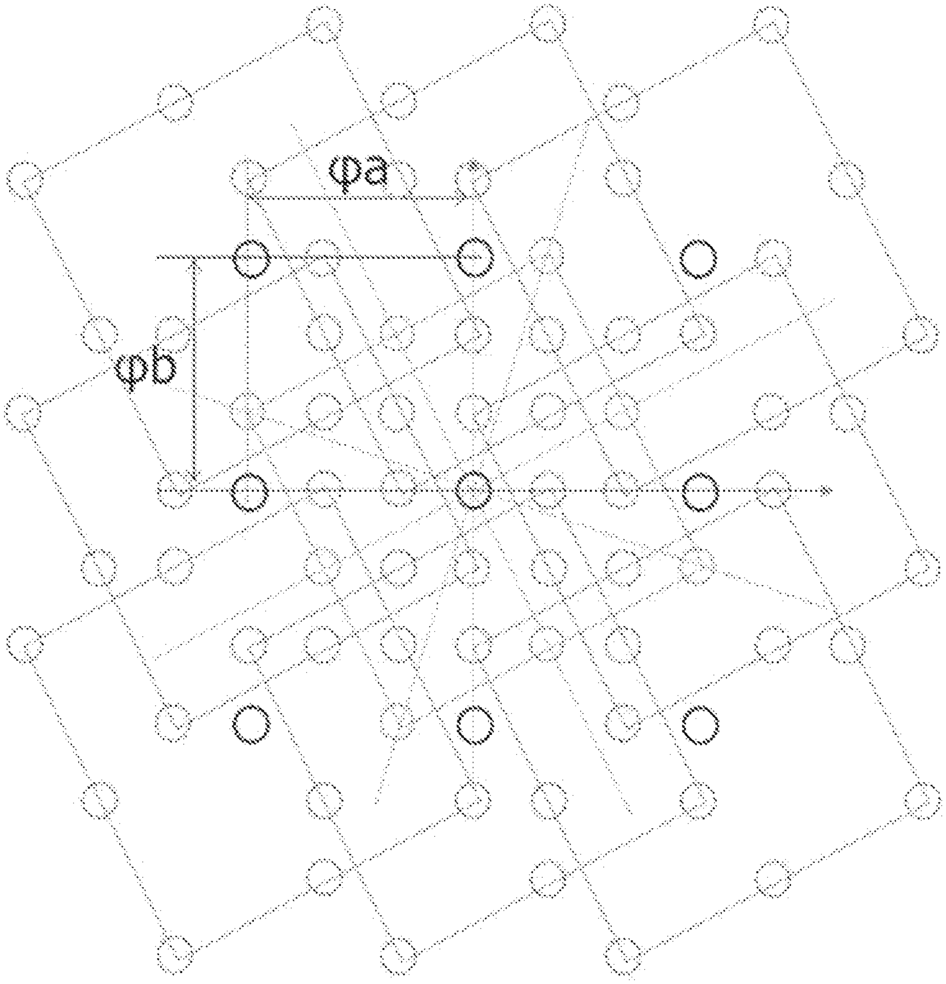
FIG. 33 is a diagram illustrating an example of diffracted lights by a plurality of light emitting elements according to the fourth embodiment of the present technology.

FIG. 32 is a diagram illustrating an example of the diffracted light by one light emitting element 111 according to the fourth embodiment of the present technology. FIG. 33 is a diagram illustrating an example of the diffracted lights by a plurality of the light emitting elements 111 according to the fourth embodiment of the present technology.

In the fourth embodiment, it is assumed that n=4, that is, the diffracted lights in four directions are generated. The diffraction element 134 generates positive first order diffracted lights and negative first order diffracted lights (indicated by a dotted circle in the drawing) in four directions, respectively, for the light emitted from one light emitting element 111 at the point C described above. Therefore, a total of eight diffracted lights are generated for one light emitting element 111.

The angle θx formed between one diffraction direction and the side AB (CD) in one direction satisfies:

$$\theta x=\tan^{-1}(b/2a)$$

When angle differences of two light beams generated by inter-light emission distances a and b after being collimated by the collimator lens 113 are set to φa and φb, respectively, a diffraction angle φx of the diffracted light satisfies:

$$\varphi x=m\times\mathrm{sqrt}\{(2\varphi a)^2+\varphi b^2\}/3.$$

The angle θx formed between another diffraction direction and the side AB (CD) in one direction satisfies:

$$\theta x=\tan^{-1}(-2b/a)$$

When angle differences of two light beams generated by inter-light emission distances a and b after being collimated by the collimator lens 113 are set to φa and φb, respectively, a diffraction angle φx of the diffracted light satisfies:

$$\varphi x=m\times\mathrm{sqrt}\{\varphi a^2+(2\varphi b)^2\}/3.$$

The angle θx formed between another diffraction direction and the side AB (CD) in one direction satisfies:

$$\theta x=\tan^{-1}(3b/a).$$

When angle differences of two light beams generated by inter-light emission distances a and b after being collimated by the collimator lens 113 are set to φa and φb, respectively, a diffraction angle φx of the diffracted light satisfies:

$$\varphi x=m\times \mathrm{sqrt}\{\varphi a^2+(3\varphi b)^2\}/3.$$

The angle θx formed between still another diffraction direction and the side AB (CD) in one direction satisfies:

$$\theta x=\tan^{-1}(-b/3a)$$

When angle differences of two light beams generated by inter-light emission distances a and b after being collimated by the collimator lens 113 are set to φa and φb, respectively, a diffraction angle φx of the diffracted light satisfies:

$$\varphi x=m\times \mathrm{sqrt}\{(3\varphi a)^2+\varphi b^2\}/3.$$

The diffraction unit m is a natural number being a multiple of six. This diffraction unit m desirably is:

$$m<2n+1.$$

Figure 34:
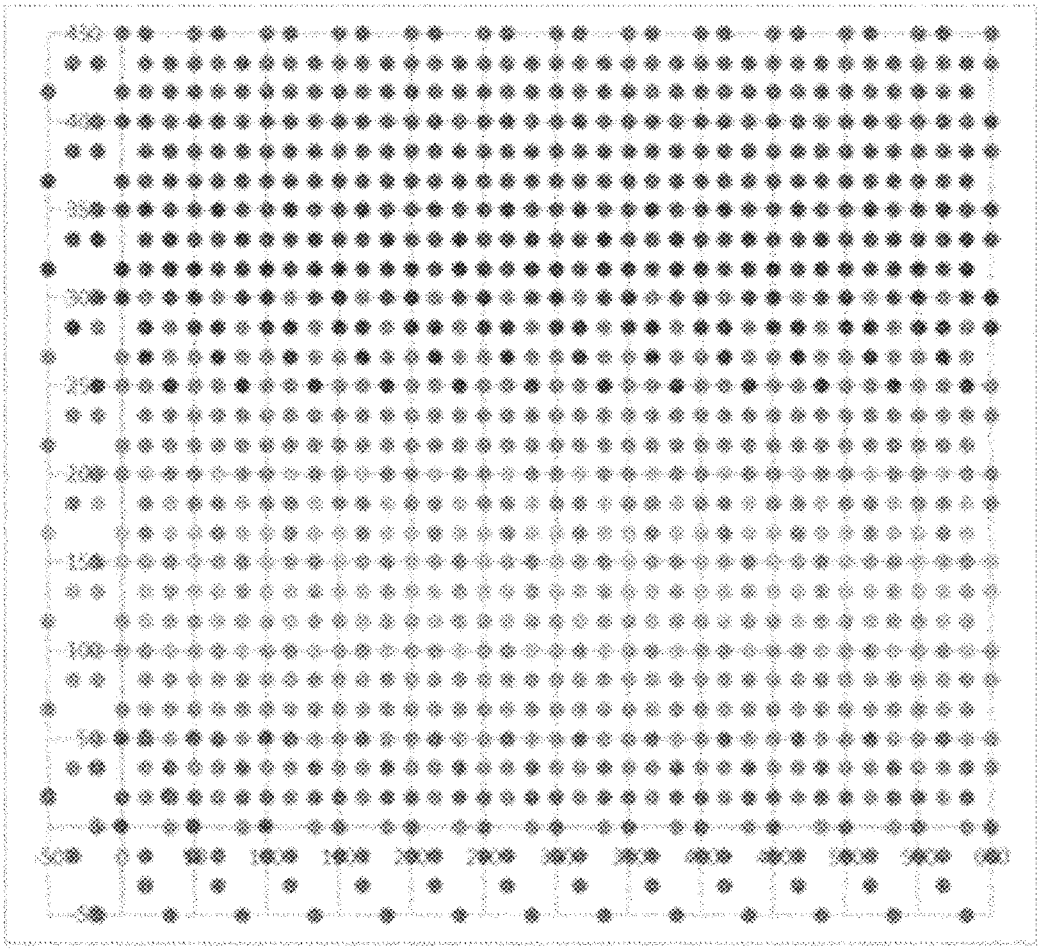
FIG. 34 is a diagram illustrating a specific example of a light irradiation spot pattern (m=6) according to the fourth embodiment of the present technology.
Figure 35:
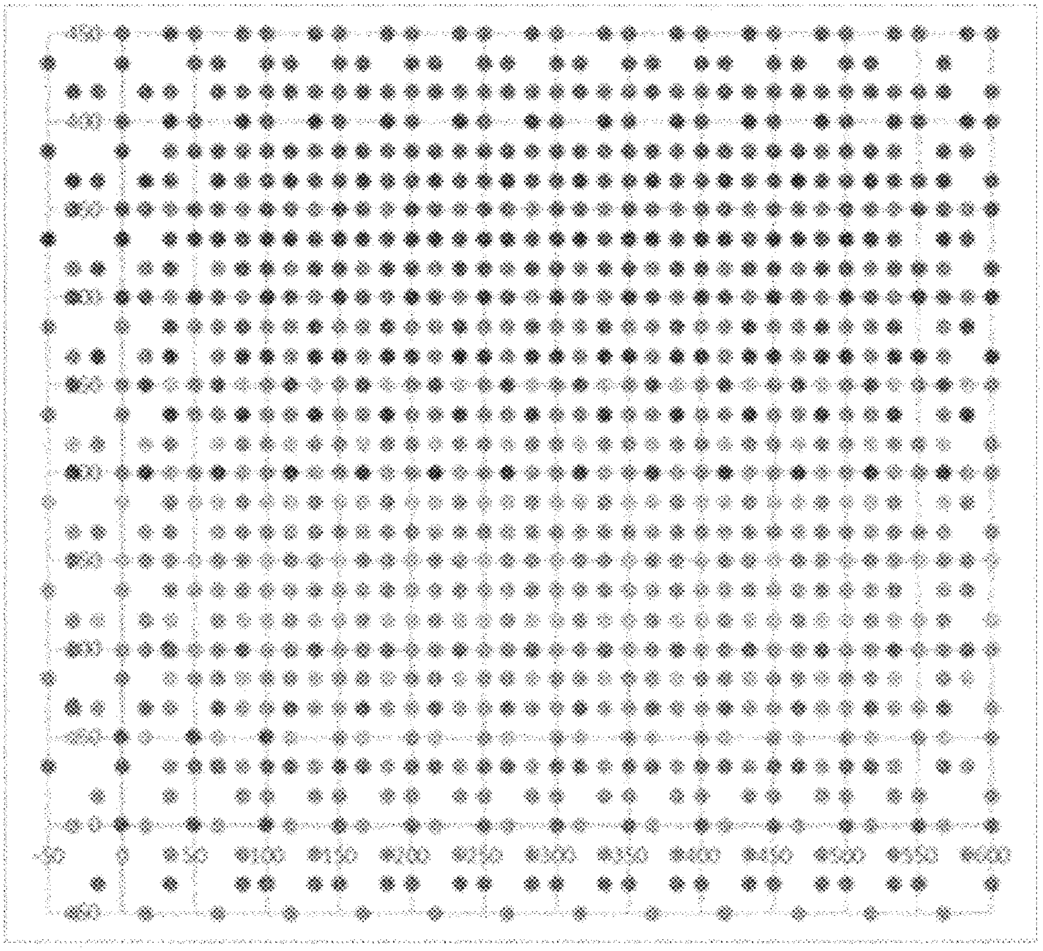
FIG. 35 is a diagram illustrating a specific example of a light irradiation spot pattern (m=12) according to the fourth embodiment of the present technology.

FIG. 34 and FIG. 35 are diagrams illustrating specific examples of a light irradiation spot pattern according to the fourth embodiment of the present technology. FIG. 34 illustrates an example of a case where the diffraction unit m is set to six. FIG. 35 illustrates an example of a case where the diffraction unit m is set to 12.

In this manner, since eight diffracted lights are generated for one light emitting element 111, the number of spots increases ninefold by the zeroth order light, the positive first order diffracted lights, and the negative first order diffracted lights. Furthermore, the distances between the spots are kept regular. Therefore, the distance measurement resolution may be further improved.

Furthermore, as a value of the diffraction unit m increases, the number of spots in a peripheral portion decreases. Therefore, the value of the diffraction unit m is desirably smaller. The diffraction unit m=1 is especially desirable. On the other hand, in a case where the diffraction angle is small and it is difficult to control the diffraction angle and efficiency of the diffraction element 134, it is also possible to design the diffraction unit m to be larger.

5. Fifth Embodiment

In the fifth embodiment, another example of dividing light into nine by the diffraction element 134 is described. Note that the configuration other than the diffraction element 134 is similar to that of the first embodiment described above, and thus detailed description thereof will be omitted.

[Diffracted Light]

Figure 36:
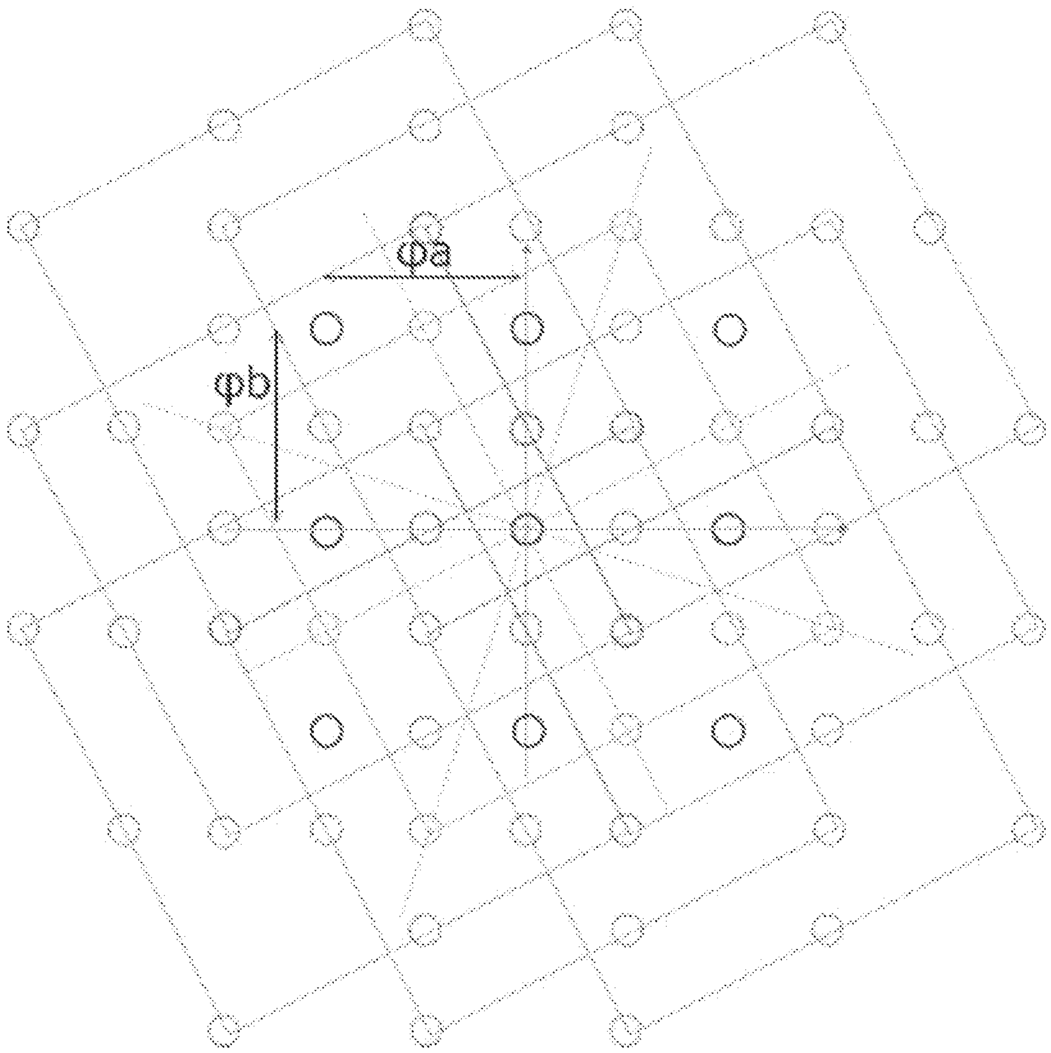
FIG. 36 is a diagram illustrating an example of diffracted lights by a plurality of light emitting elements according to a fifth embodiment of the present technology.

A diagram illustrating an example of the diffracted light by one light emitting element 111 according to the fifth embodiment of the present technology is similar to FIG. 32. FIG. 36 is a diagram illustrating an example of the diffracted lights by a plurality of the light emitting elements 111 according to the fifth embodiment of the present technology.

In the fifth embodiment, it is assumed that n=4, that is, the diffracted lights in four directions are generated. The diffraction element 134 generates positive first order diffracted lights and negative first order diffracted lights (indicated by a dotted circle in the drawing) in four directions, respectively, for the light emitted from one light emitting element 111 at the point C described above. Therefore, a total of eight diffracted lights are generated for one light emitting element 111.

The angle θx formed between one diffraction direction and the side AB (CD) in one direction satisfies:

$$\theta x=\tan^{-1}(b/2a).$$

When angle differences of two light beams generated by inter-light emission distances a and b after being collimated by the collimator lens 113 are set to φa and φb, respectively, a diffraction angle φx of the diffracted light satisfies:

$$\varphi x=3\times \mathrm{sqrt}\{(2\varphi a)^2+\varphi b^2\}/2.$$

Figure 37:
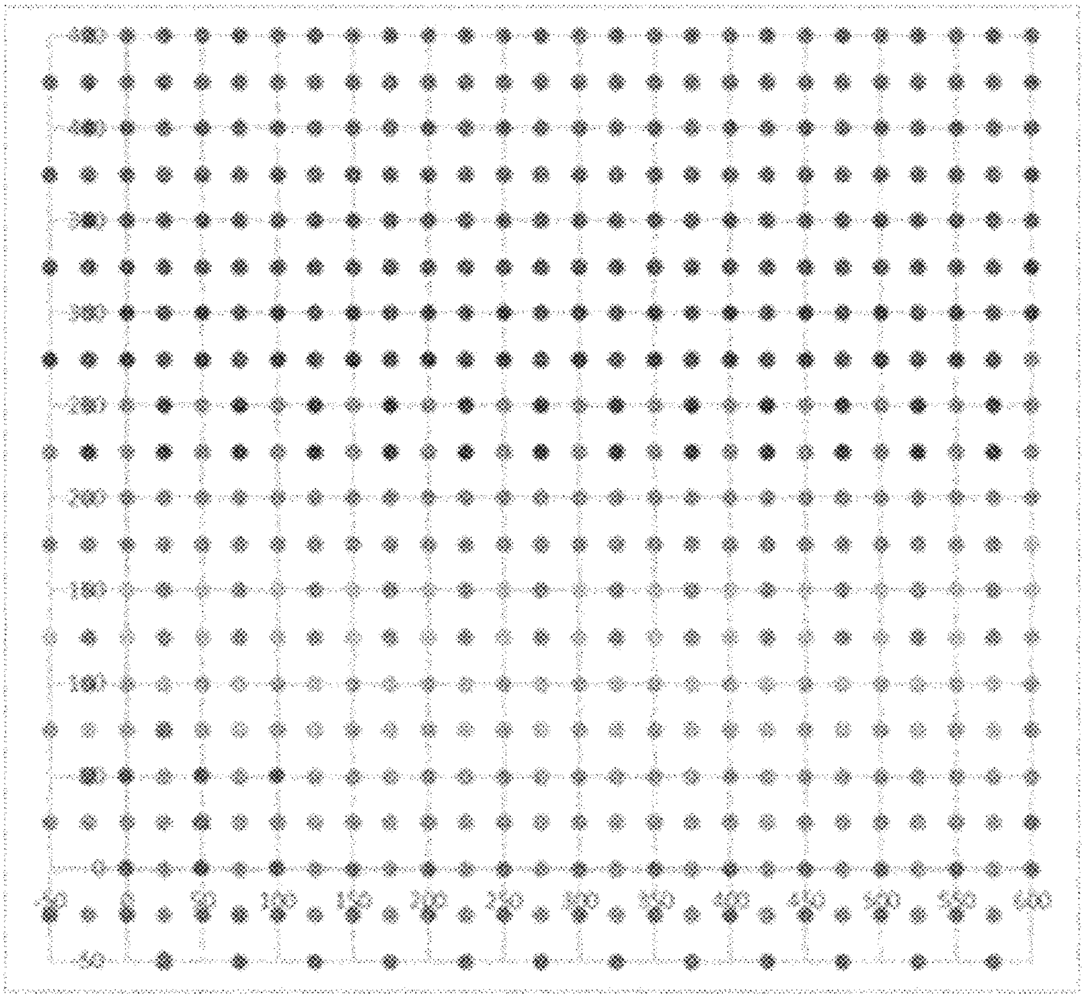
FIG. 37 is a diagram illustrating a specific example of a light irradiation spot pattern according to the fifth embodiment of the present technology.

FIG. 37 is a diagram illustrating a specific example of a light irradiation spot pattern according to the fifth embodiment of the present technology.

In this manner, since eight diffracted lights are generated for one light emitting element 111, the number of spots increases threefold by the zeroth order light, the positive first order diffracted lights, and the negative first order diffracted lights. Furthermore, the distances between the spots are kept regular. Therefore, the distance measurement resolution may be further improved.

6. Sixth Embodiment

In the sixth embodiment, an example of dividing light into three by the diffraction element 134 is described. Note that the configurations other than the diffracted light are similar to those of the first embodiment described above, and thus detailed description thereof will be omitted.

[Diffracted Light]

A diagram illustrating an example of the diffracted light by one light emitting element 111 according to the sixth embodiment of the present technology is similar to FIG. 14. A diagram illustrating an example of the diffracted lights by a plurality of the light emitting elements 111 according to the sixth embodiment of the present technology is similar to FIG. 15.

In the sixth embodiment, it is assumed that n=1, that is, the diffracted light in one direction is generated. The diffraction element 134 generates positive first order diffracted light and negative first order diffracted light for the light emitted from one light emitting element 111 at the point C described above. Therefore, a total of two diffracted lights are generated for one light emitting element 111.

The angle θx formed between one diffraction direction and the side AB (CD) in one direction satisfies:

$$\theta x=\tan^{-1}\{b/(n+1)a\}.$$

When angle differences of two light beams generated by inter-light emission distances a and b after being collimated by the collimator lens 113 are set to φa and φb, respectively, a diffraction angle φx of the diffracted light satisfies:

$$\varphi x=m\times \mathrm{sqrt}[\{(n+1)\varphi a\}^2+\varphi b^2]/(2n+1).$$

Note that a diffraction unit m is one unit that defines a diffraction angle, and is a natural number excluding an integral multiple of (2n+1). This diffraction unit m desirably is:

$$m<2n+1.$$

Figure 38:
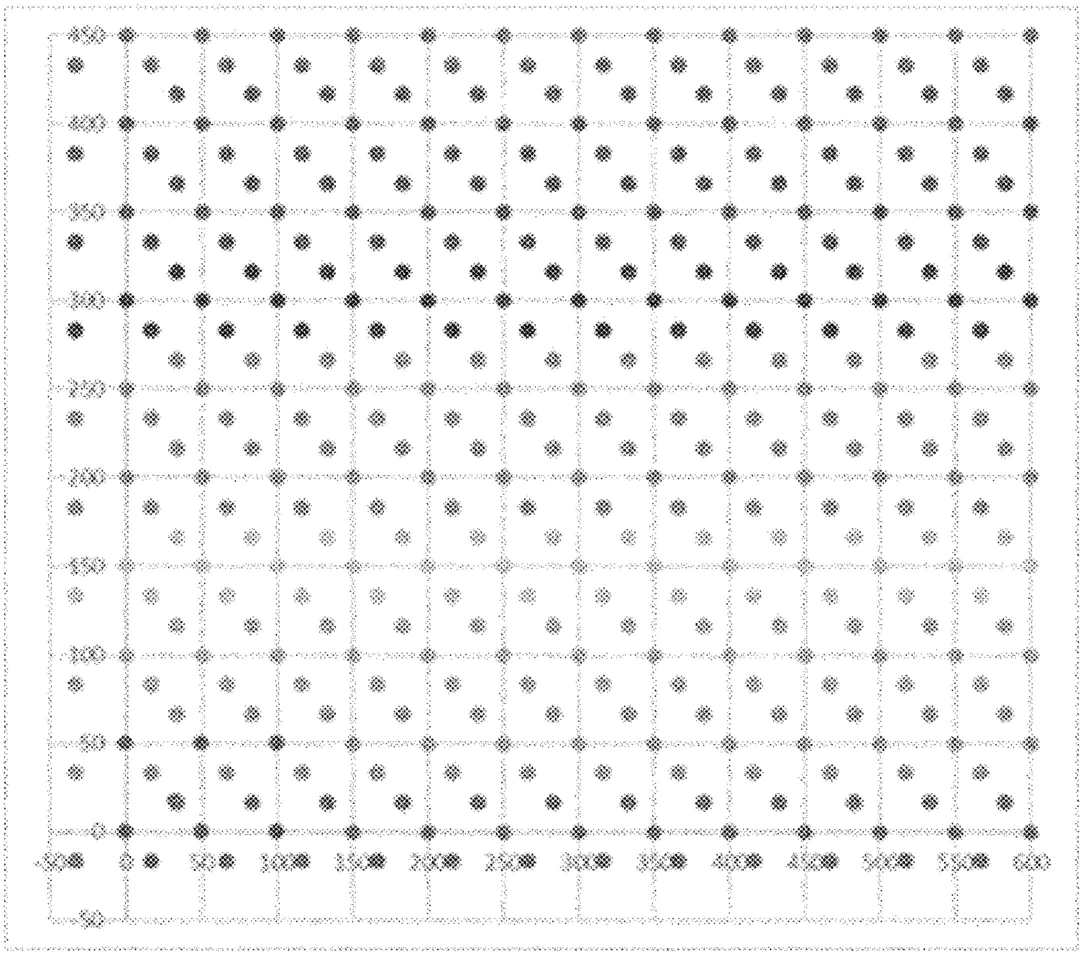
FIG. 38 is a diagram illustrating a specific example of a light irradiation spot pattern (m=2) according to a sixth embodiment of the present technology.
Figure 39:
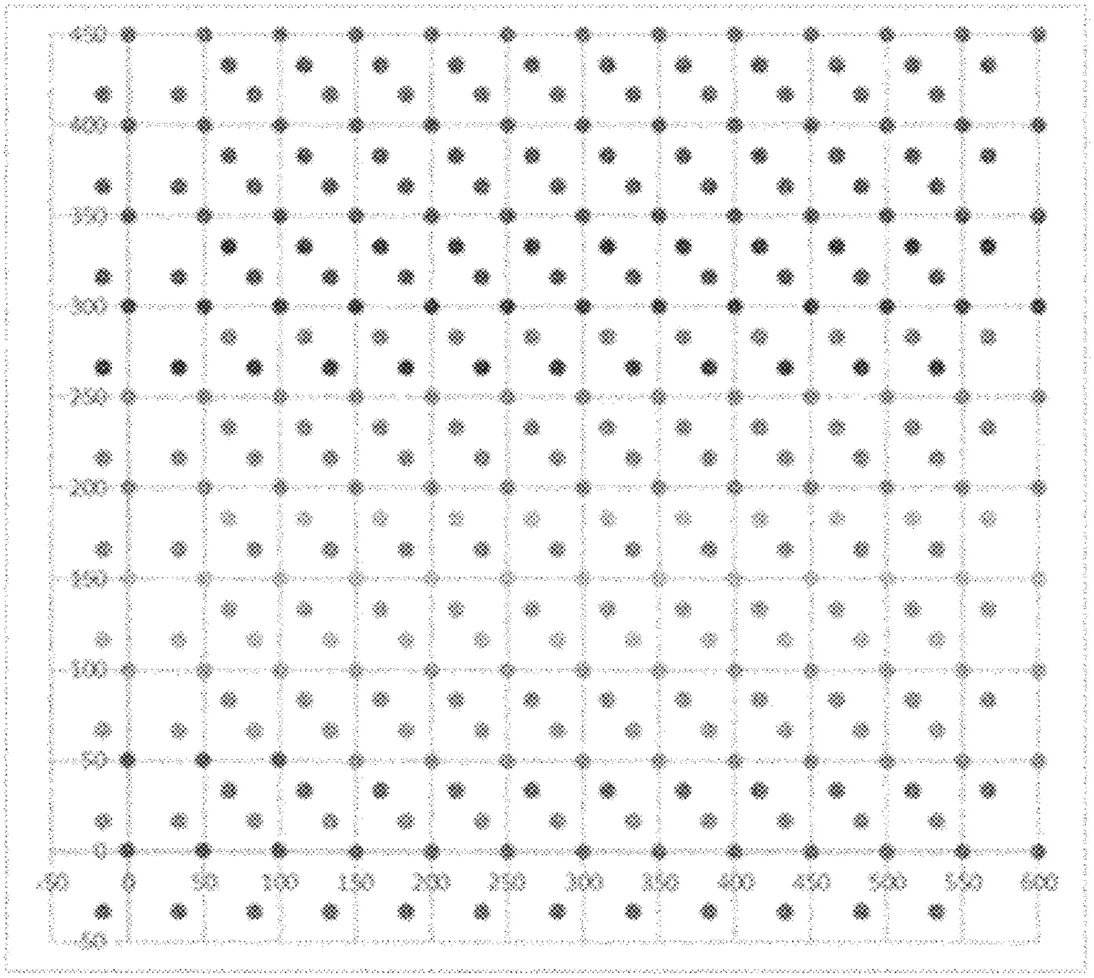
FIG. 39 is a diagram illustrating a specific example of a light irradiation spot pattern (m=4) according to the sixth embodiment of the present technology.

FIG. 38 and FIG. 39 are diagrams illustrating specific examples of a light irradiation spot pattern according to the fourth embodiment of the present technology. FIG. 38 illustrates an example of a case where the diffraction unit m is set to two. FIG. 39 illustrates an example of a case where the diffraction unit m is set to four.

In this manner, since two diffracted lights are generated for one light emitting element 111, the number of spots increases threefold by zeroth order light from the light emitting element 111 itself, and the positive first order diffracted light and negative first order diffracted light generated by the diffraction element 134. Furthermore, the distances between the spots are kept regular. Therefore, the distance measurement resolution can be improved.

Furthermore, as a value of the diffraction unit m increases, the number of spots in a peripheral portion decreases. Therefore, the value of the diffraction unit m is desirably smaller. The diffraction unit m=2 is especially desirable. On the other hand, in a case where the diffraction angle is small and it is difficult to control the diffraction angle and efficiency of the diffraction element 134, it is also possible to design the diffraction unit m to be larger.

Note that in a case where the diffraction element 134 is provided, not a little high order diffracted light is generated. However, in the first embodiment of the present technology, since the high order diffracted light overlaps with the zeroth order light or the positive first order diffracted light and the negative first order diffracted light from another light emitting element, this effectively functions as the spot light.

Furthermore, an orientation of the diffraction element 134 may be reversed by 180 degrees. That is, the diffraction direction indicated in the present technology may be reversed by 180 degrees.

7. Seventh Embodiment

In the seventh embodiment, an example of dividing light into five by the diffraction element 134 is described. Note that the configurations other than the diffracted light are similar to those of the second embodiment described above, and thus detailed description thereof will be omitted.

[Diffracted Light]

A diagram illustrating an example of the diffracted light by one light emitting element 111 according to the seventh embodiment of the present technology is similar to FIG. 20. A diagram illustrating an example of the diffracted lights by a plurality of the light emitting elements 111 according to the seventh embodiment of the present technology is similar to FIG. 21.

In the seventh embodiment, it is assumed that n=2, that is, the diffracted lights in two directions are generated. The diffraction element 134 generates positive first order diffracted light and negative first order diffracted light in each of the two directions, respectively, for the light emitted from one light emitting element 111 at the point C described above. Therefore, a total of four diffracted lights are generated for one light emitting element 111.

The angle θx formed between one diffraction direction and the side AB (CD) in one direction satisfies:

$$\theta x=\tan^{-1}\{b/(n+1)a\}.$$

When angle differences of two light beams generated by inter-light emission distances a and b after being collimated by the collimator lens 113 are set to φa and φb, respectively, a diffraction angle φx of the diffracted light satisfies:

$$\varphi x=m\times\mathrm{sqrt}[\{(n+1)\varphi a\}^2+\varphi b^2]/(2n+1).$$

Note that as described above, in the seventh embodiment, the diffraction unit m is a natural number excluding an integral multiple of (2n+1).

Moreover, an angle θx formed between another diffraction direction and the side AB (CD) in one direction satisfies:

$$\theta x=\tan^{-1}\{-(n+1)b/a\}.$$

When angle differences of two light beams generated by inter-light emission distances a and b after being collimated by the collimator lens 113 are set to φa and φb, respectively, a diffraction angle φx of the diffracted light satisfies:

$$\varphi x=m\times\mathrm{sqrt}[\varphi a^2+\{(n+1)\varphi b\}^2]/(2n+1).$$

Figure 40:
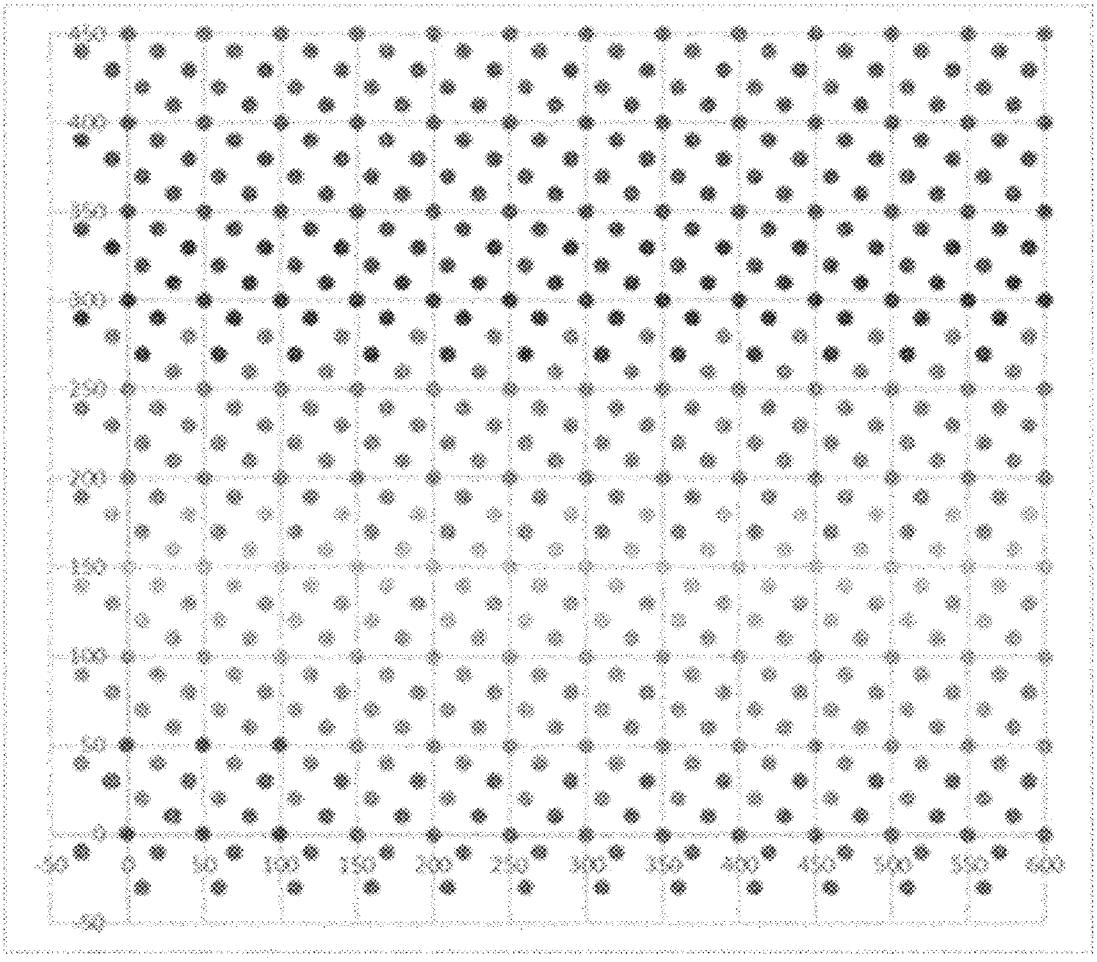
FIG. 40 is a diagram illustrating a specific example of a light irradiation spot pattern (m=2) according to a seventh embodiment of the present technology.
Figure 41:
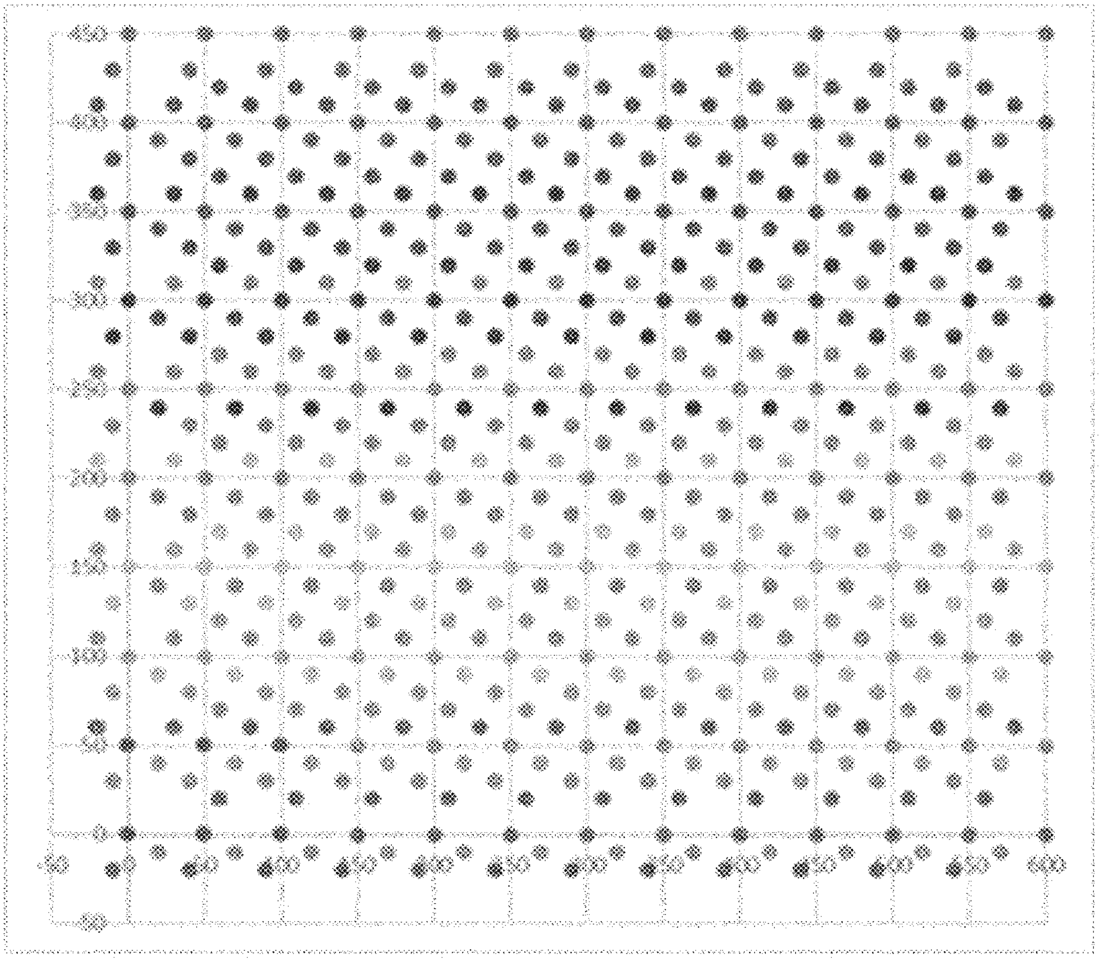
FIG. 41 is a diagram illustrating a specific example of a light irradiation spot pattern (m=4) according to the seventh embodiment of the present technology.
Figure 42:
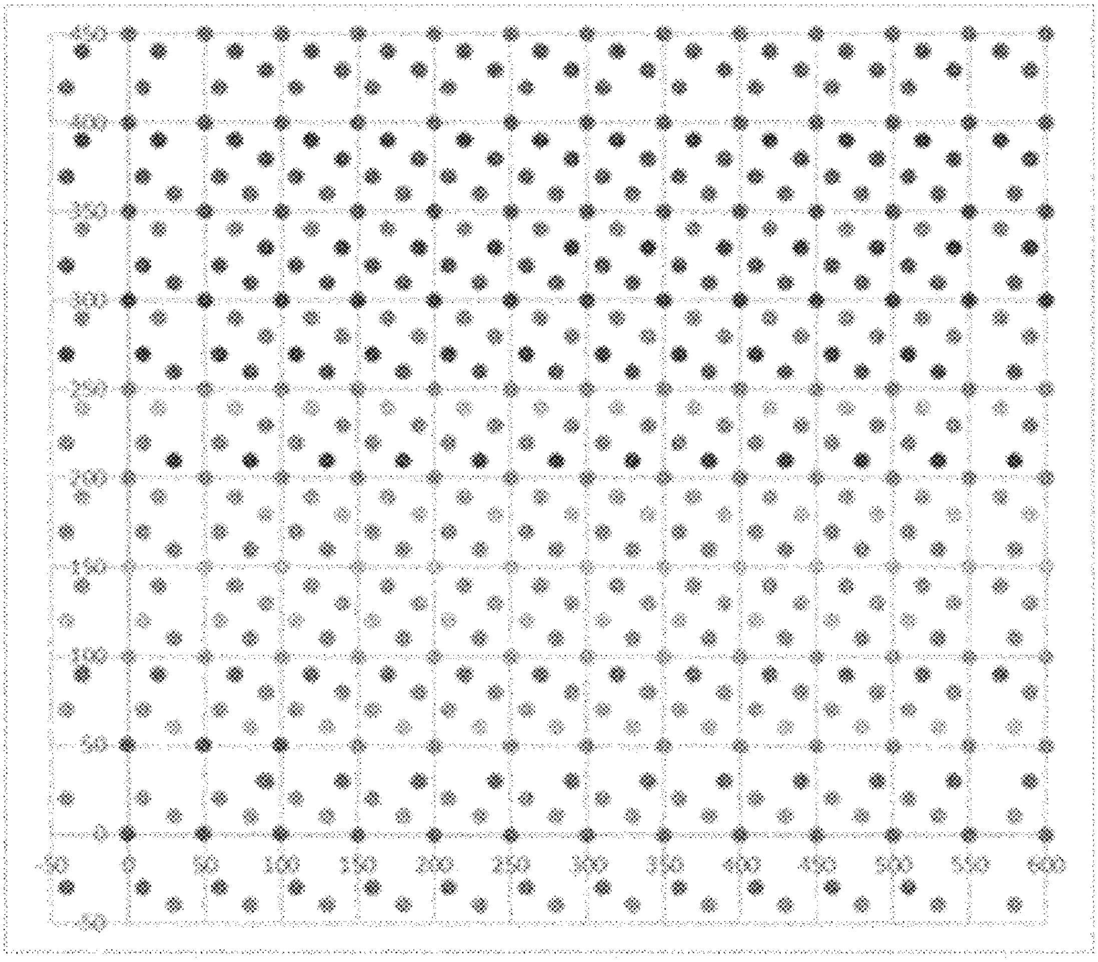
FIG. 42 is a diagram illustrating a specific example of a light irradiation spot pattern (m=6) according to a seventh embodiment of the present technology.
Figure 43:
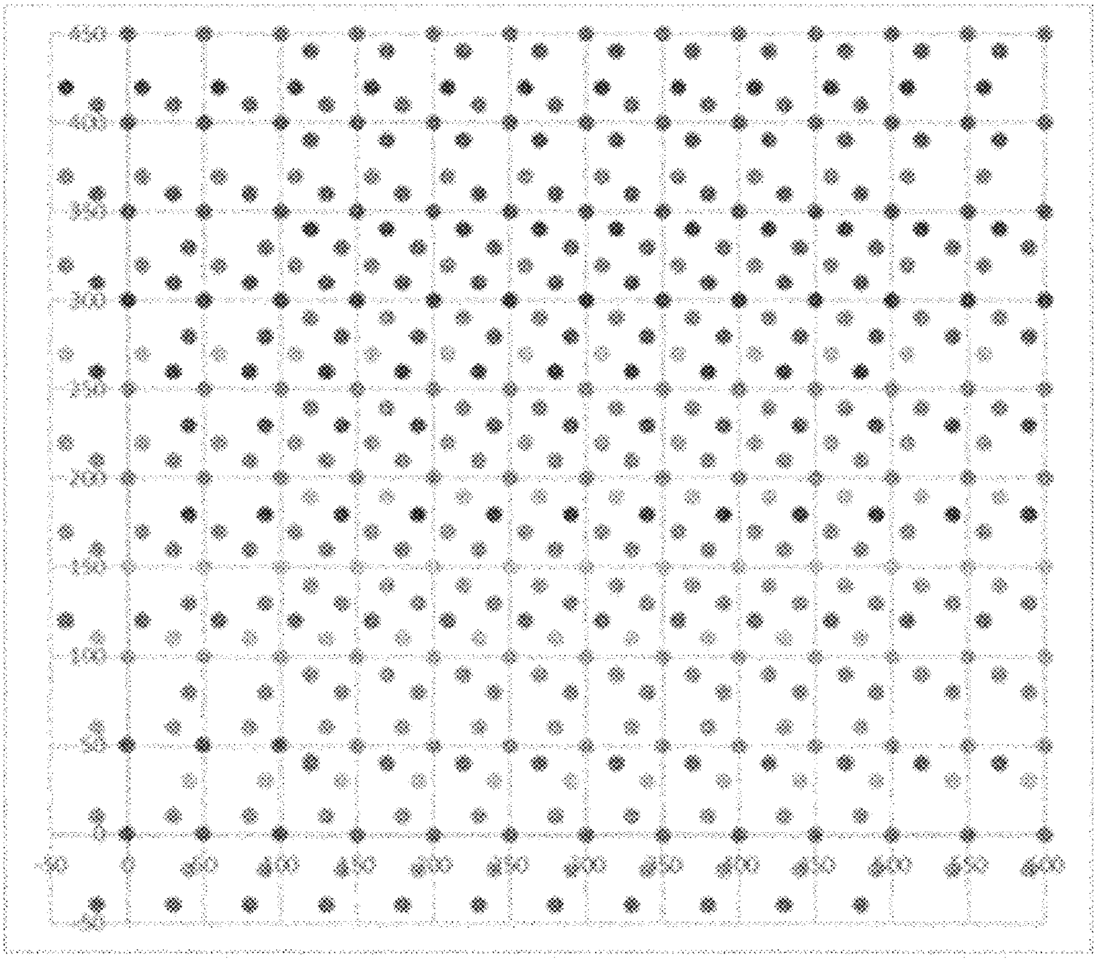
FIG. 43 is a diagram illustrating a specific example of a light irradiation spot pattern (m=8) according to the seventh embodiment of the present technology.

FIG. 40 to FIG. 43 are diagrams illustrating a specific example of a light irradiation spot pattern according to the seventh embodiment of the present technology. FIG. 40 illustrates an example of a case where the diffraction unit m is set to two. FIG. 41 illustrates an example of a case where the diffraction unit m is set to four. FIG. 42 illustrates an example of a case where the diffraction unit m is set to six. FIG. 43 illustrates an example of a case where the diffraction unit m is set to eight.

In this manner, since four diffracted lights are generated for one light emitting element 111, the number of spots increases fivefold by the zeroth order light, the positive first order diffracted lights, and the negative first order diffracted lights. Furthermore, the distances between the spots are kept regular. Therefore, the distance measurement resolution may be further improved.

Furthermore, as a value of the diffraction unit m increases, the number of spots in a peripheral portion decreases. Therefore, the value of the diffraction unit m is desirably smaller. The diffraction unit m=2 is especially desirable. On the other hand, in a case where the diffraction angle is small and it is difficult to control the diffraction angle and efficiency of the diffraction element 134, it is also possible to design the diffraction unit m to be larger.

Furthermore, an orientation of the diffraction element 134 may be reversed by 180 degrees. That is, the diffraction direction indicated in the present technology may be reversed by 180 degrees.

8. Eighth Embodiment

In the eighth embodiment, an example of dividing light into three by the diffraction element 134 is described. Note that the present embodiment is similar to the first embodiment described above except that n of θx is set to n=1 and (2n+1) of the denominator of φx is replaced with two, and thus a detailed description thereof will be omitted.

[Diffracted Light]

Figure 44:
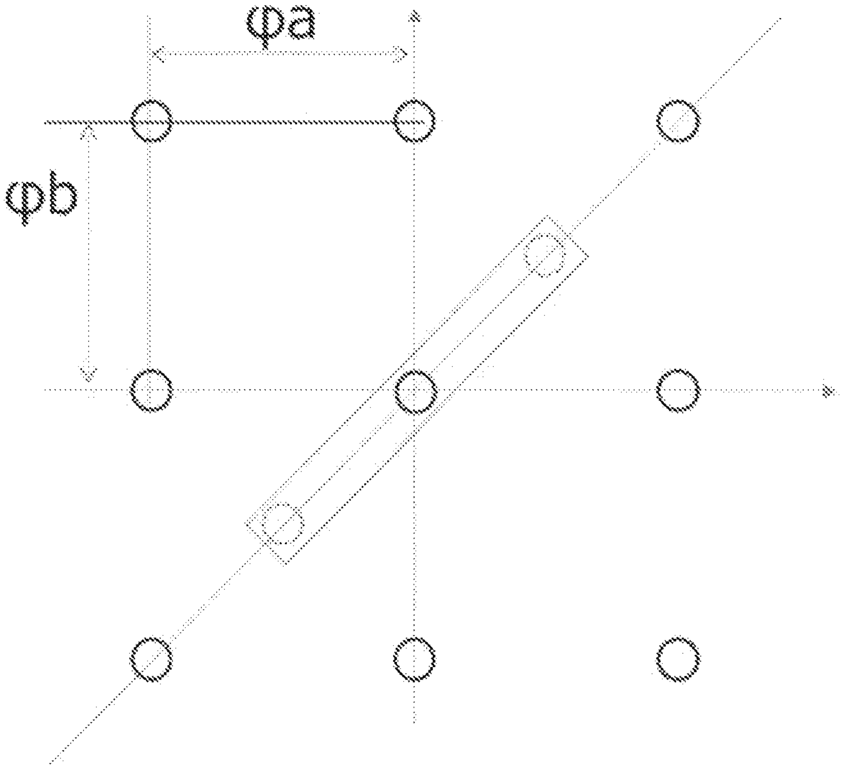
FIG. 44 is a diagram illustrating an example of diffracted light by one light emitting element according to an eighth embodiment of the present technology.
Figure 45:
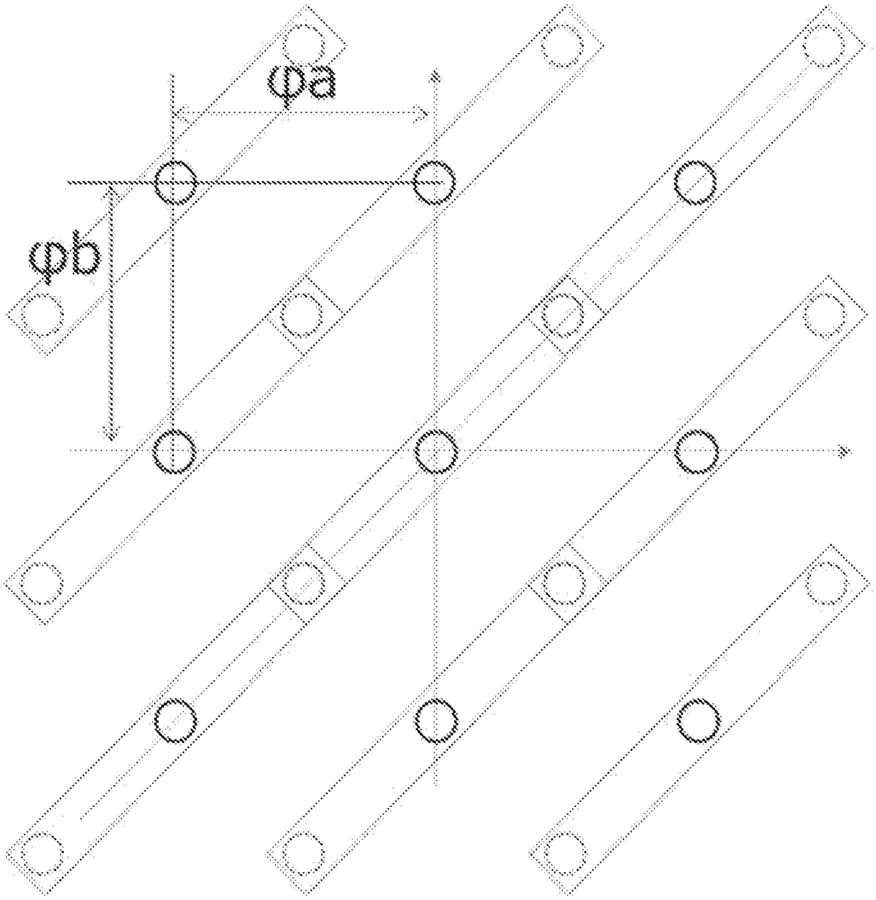
FIG. 45 is a diagram illustrating an example of diffracted lights by a plurality of light emitting elements according to the eighth embodiment of the present technology.

FIG. 44 is a diagram illustrating an example of the diffracted light by one light emitting element 111 according to the eighth embodiment of the present technology. FIG. 45 is a diagram illustrating an example of the diffracted lights by a plurality of the light emitting elements 111 according to the eighth embodiment of the present technology.

In the eighth embodiment, it is assumed that the diffracted light in one direction is generated. The diffraction element 134 generates positive first order diffracted light and negative first order diffracted light (indicated by a dotted circle in the drawing) for the light emitted from one light emitting element 111 at the point C described above. Therefore, a total of two diffracted lights are generated for one light emitting element 111. In the eighth embodiment, positive first order diffracted light of a certain spot light overlaps with negative first order diffracted light of an oblique spot light, or negative first order diffracted light of a certain spot light overlaps with positive first order diffracted light of an oblique spot light.

The angle θx formed between one diffraction direction and the side AB (CD) in one direction satisfies:

$$\theta x=\tan^{-1}(b/a).$$

When angle differences of two light beams generated by inter-light emission distances a and b after being collimated by the collimator lens 113 are set to φa and φb, respectively, a diffraction angle φx of the diffracted light satisfies:

$$\varphi x = m \times \mathrm{sqrt}(\varphi a^2 + \varphi b^2)/2.$$

However, a diffraction unit m is one unit that defines a diffraction angle, and is an integral multiple of (2n+1) excluding 2(2n+1).

Figure 46:
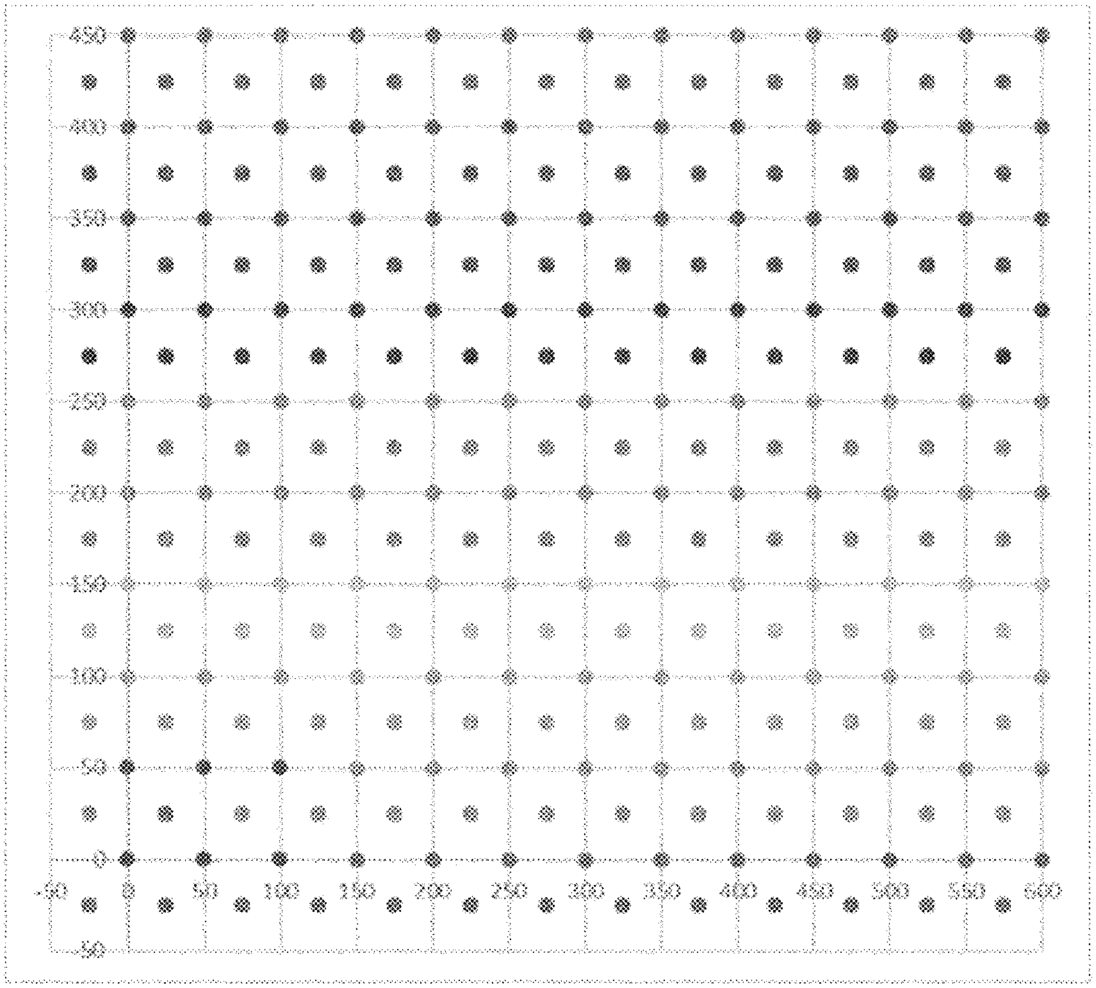
FIG. 46 is a diagram illustrating a specific example of a light irradiation spot pattern (m=3) according to the eighth embodiment of the present technology.
Figure 47:
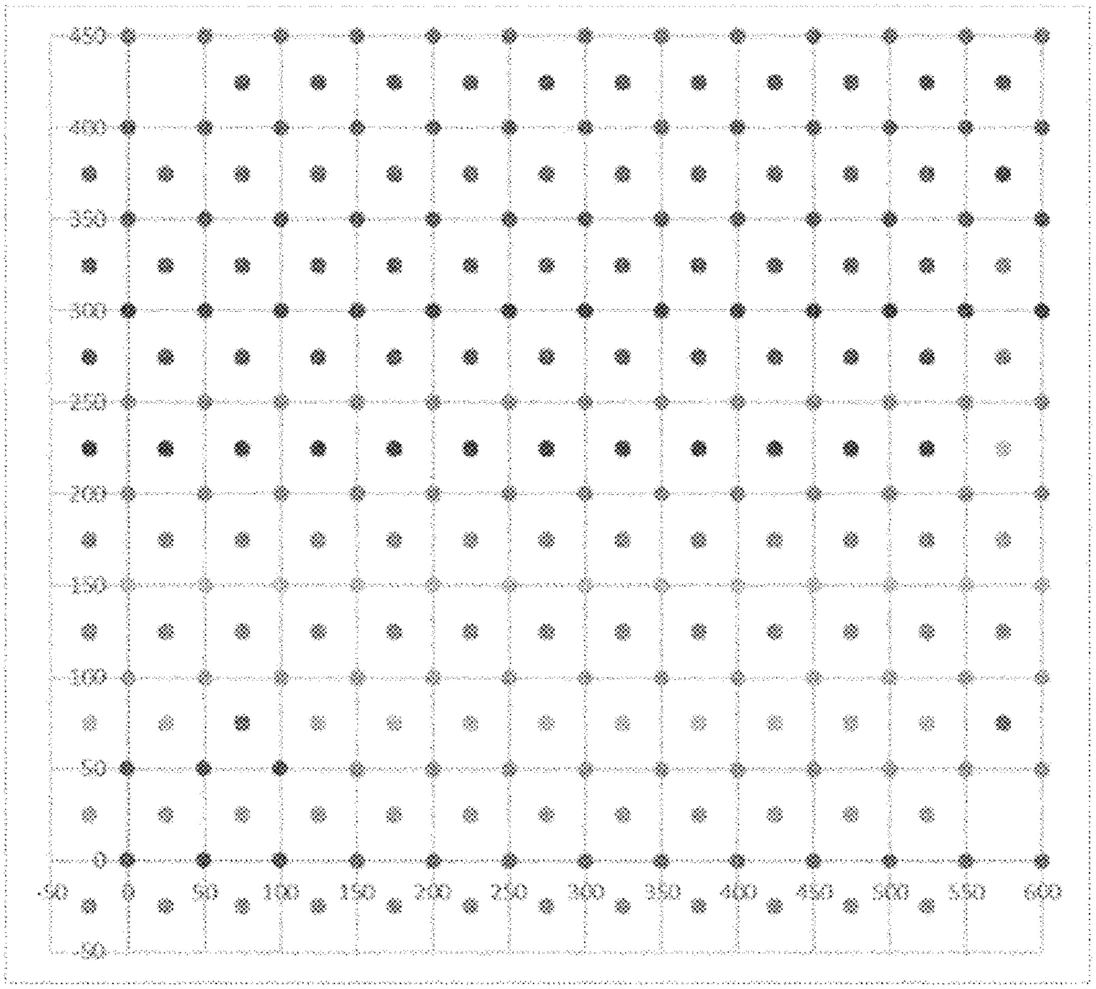
FIG. 47 is a diagram illustrating a specific example of a light irradiation spot pattern (m=9) according to the eighth embodiment of the present technology.

FIG. 46 to FIG. 47 are diagrams illustrating a specific example of a light irradiation spot pattern according to the eighth embodiment of the present technology. FIG. 46 illustrates an example of a case where the diffraction element 134 is provided and the diffraction unit m is set to three. FIG. 47 illustrates an example of a case where the diffraction element 134 is provided and the diffraction unit m is set to nine.

In this manner, since two diffracted lights are generated for one light emitting element 111, the number of spots increases twofold by the zeroth order light from the light emitting element 111 itself, and the positive first order diffracted light and negative first order diffracted light generated by the diffraction element 134. Furthermore, the distances between the spots are kept regular. Therefore, the distance measurement resolution can be improved.

Furthermore, as a value of the diffraction unit m increases, the number of spots in a peripheral portion decreases. Therefore, the value of the diffraction unit m is desirably smaller. The diffraction unit m=3 is especially desirable. On the other hand, in a case where the diffraction angle is small and it is difficult to control the diffraction angle and efficiency of the diffraction element 134, it is also possible to design the diffraction unit m to be larger.

Note that in a case where the diffraction element 134 is provided, not a little high order diffracted light is generated. However, in the eighth embodiment of the present technology, since the high order diffracted light overlaps with the zeroth order light or the positive first order diffracted light and the negative first order diffracted light from another light emitting element, this effectively functions as the spot light.

9. Ninth Embodiment

In the ninth embodiment, an example of dividing light into five by the diffraction element 134 is described. Note that the configurations are similar to those of the second embodiment described above except that n of θx is set to n=1, and thus detailed description thereof will be omitted.

[Diffracted Light]

Figure 48:
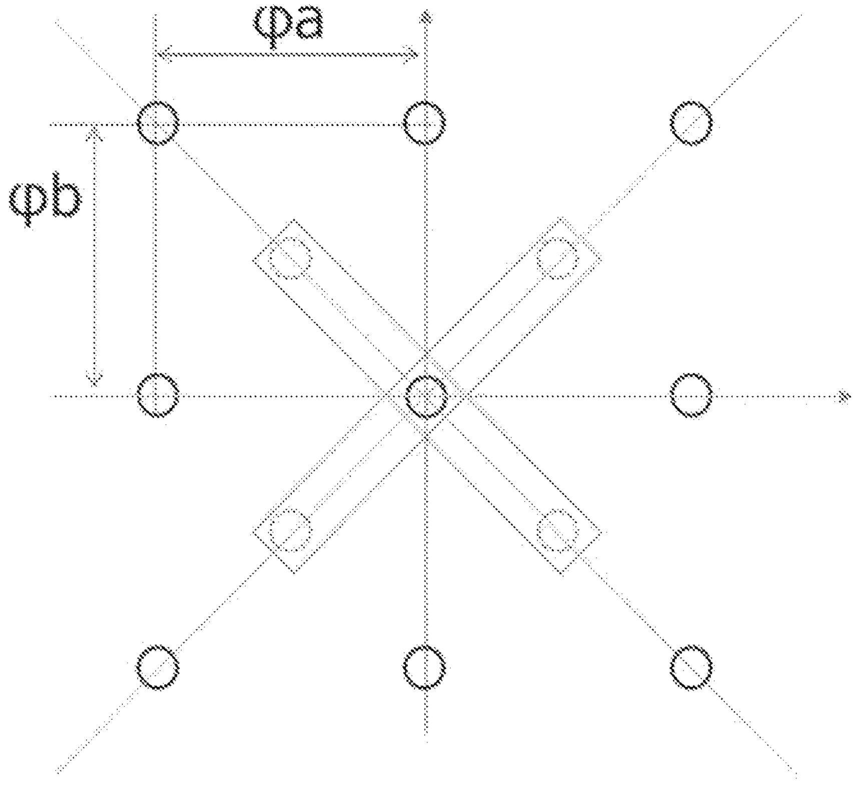
FIG. 48 is a diagram illustrating an example of diffracted light by one light emitting element according to a ninth embodiment of the present technology.
Figure 49:
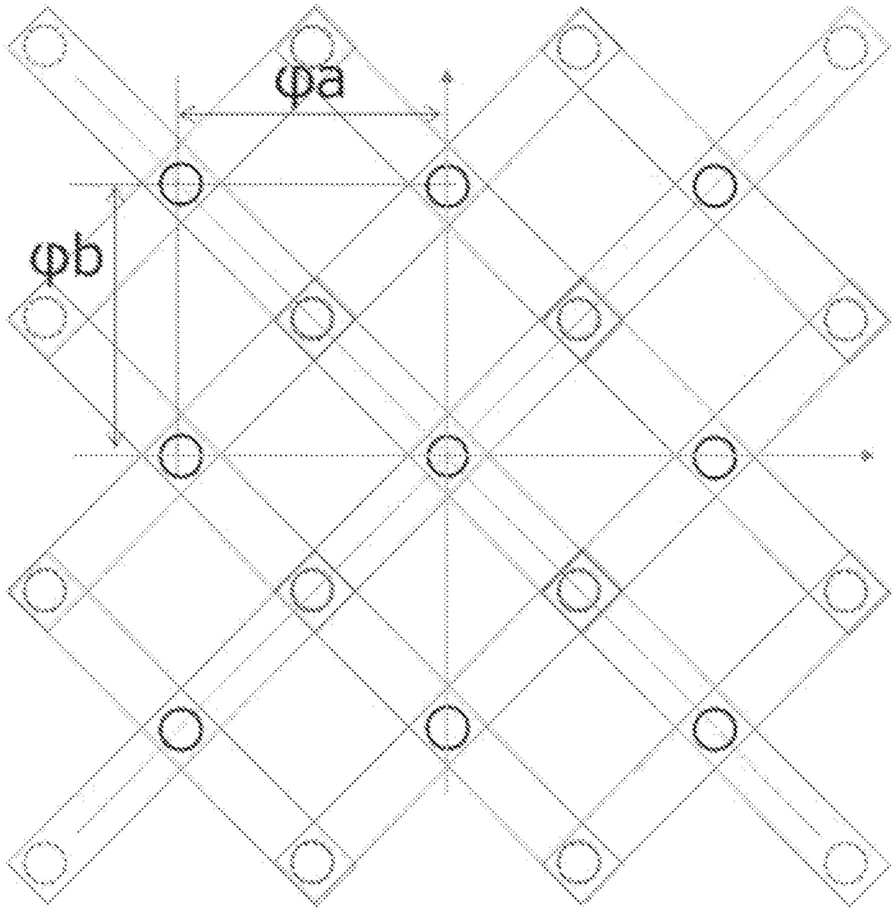
FIG. 49 is a diagram illustrating an example of diffracted lights by a plurality of light emitting elements according to the ninth embodiment of the present technology.

FIG. 48 is a diagram illustrating an example of the diffracted light by one light emitting element 111 according to the ninth embodiment of the present technology. FIG. 49 is a diagram illustrating an example of the diffracted lights by a plurality of the light emitting elements 111 according to the ninth embodiment of the present technology.

In the ninth embodiment, it is assumed that the diffracted lights in two directions are generated. The diffraction element 134 generates positive first order diffracted light and negative first order diffracted light (indicated by a dotted circle in the drawing) in two directions, respectively, for the light emitted from one light emitting element 111 at the point C described above. Therefore, a total of four diffracted lights are generated for one light emitting element 111. In the ninth embodiment, positive first order diffracted light of a certain spot light overlaps with negative first order diffracted light of an oblique spot light, or negative first order diffracted light of a certain spot light overlaps with positive first order diffracted light of an oblique spot light.

The angle θx formed between one diffraction direction and the side AB (CD) in one direction satisfies:

$$\theta x = \tan^{-1}(b/a).$$

When angle differences of two light beams generated by inter-light emission distances a and b after being collimated by the collimator lens 113 are set to φa and φb, respectively, a diffraction angle φx of the diffracted light satisfies:

$$\varphi x = m \times \mathrm{sqrt}(\varphi a^2 + \varphi b^2)/2.$$

Note that in the ninth embodiment, the diffraction unit m is a natural number of an integral multiple of (2n+1) excluding 2(2n+1).

Moreover, an angle θx formed between another diffraction direction and the side AB (CD) in one direction satisfies:

$$\theta x = \tan^{-1}(-b/a)$$

When angle differences of two light beams generated by inter-light emission distances a and b after being collimated by the collimator lens 113 are set to φa and φb, respectively, a diffraction angle φx of the diffracted light satisfies:

$$\varphi x = m \times \mathrm{sqrt}(\varphi a^2 + \varphi b^2)/2.$$

Figure 50:
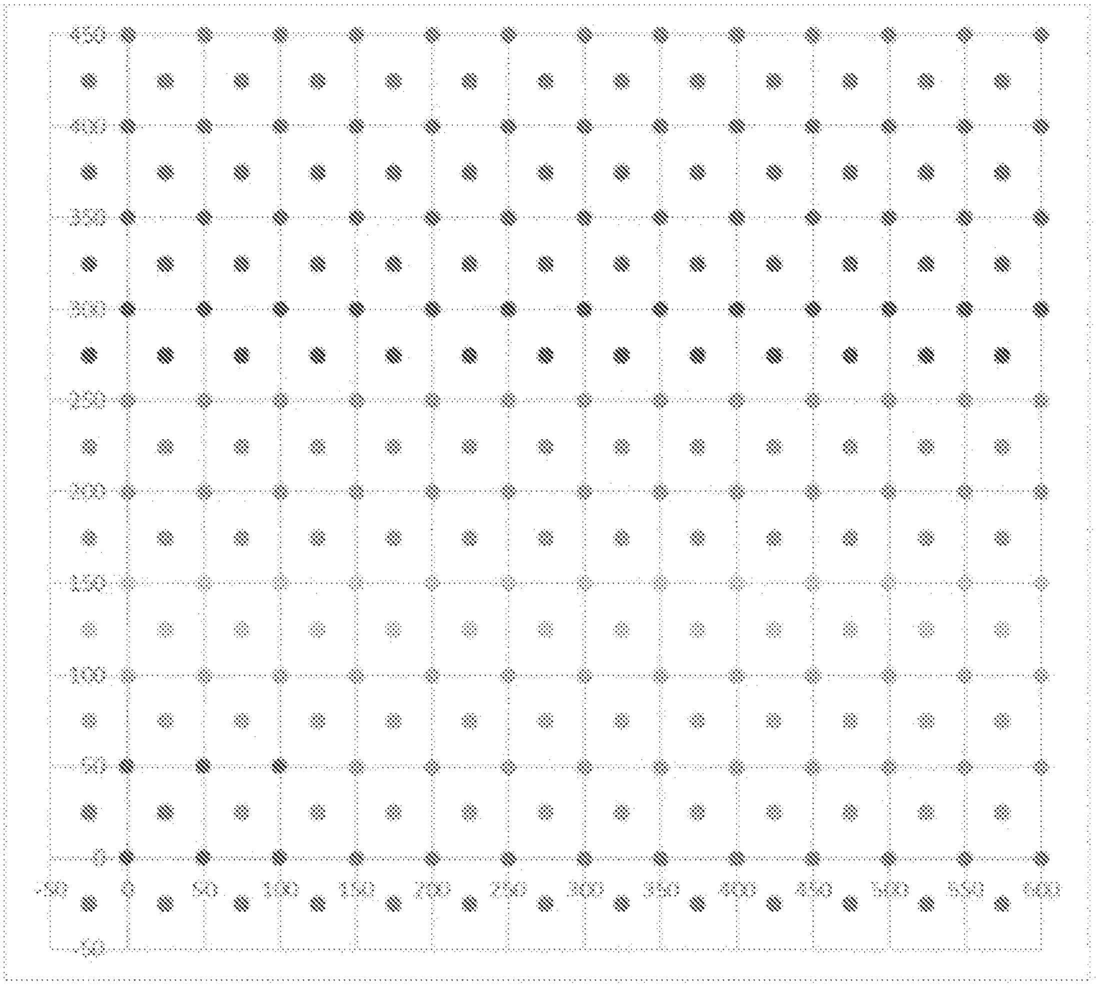
FIG. 50 is a diagram illustrating a specific example of a light irradiation spot pattern (m=5) according to the ninth embodiment of the present technology.
Figure 51:
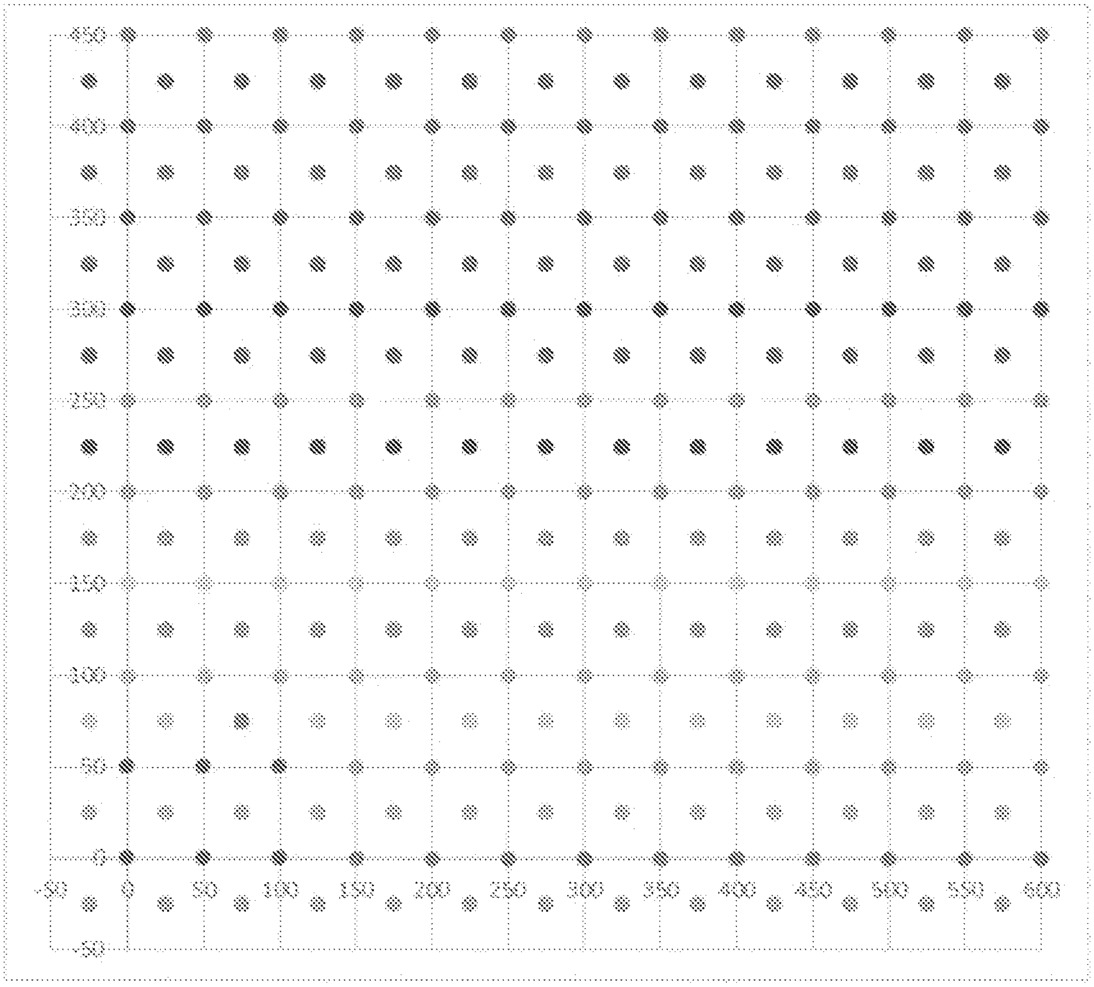
FIG. 51 is a diagram illustrating a specific example of a light irradiation spot pattern (m=15) according to the ninth embodiment of the present technology.

FIG. 50 to FIG. 51 are diagrams illustrating a specific example of a light irradiation spot pattern according to the ninth embodiment of the present technology. FIG. 50 illustrates an example of a case where the diffraction unit m is set to five. FIG. 51 illustrates an example of a case where the diffraction unit m is set to 15.

In this manner, since four diffracted lights are generated for one light emitting element 111, the number of spots increases twofold by the zeroth order light, the positive first order diffracted lights, and the negative first order diffracted lights. Furthermore, the distances between the spots are kept regular. Therefore, the distance measurement resolution may be further improved.

Furthermore, as a value of the diffraction unit m increases, the number of spots in a peripheral portion decreases. Therefore, the value of the diffraction unit m is desirably smaller. The diffraction unit m=5 is especially desirable. On the other hand, in a case where the diffraction angle is small and it is difficult to control the diffraction angle and efficiency of the diffraction element 134, it is also possible to design the diffraction unit m to be larger.

10. Tenth Embodiment

In the above-described embodiment, the number of spot lights is increased by dividing the spot light by the diffraction element 134. The present embodiment is an application example in which the light emitting elements 111 that emit light are divided into groups (sets), and the light emitting elements 111 that emit light are switched in a time division manner. Therefore, a light emission pattern may be changed as necessary.

[Configuration of Light Emission Unit]

Figure 52:
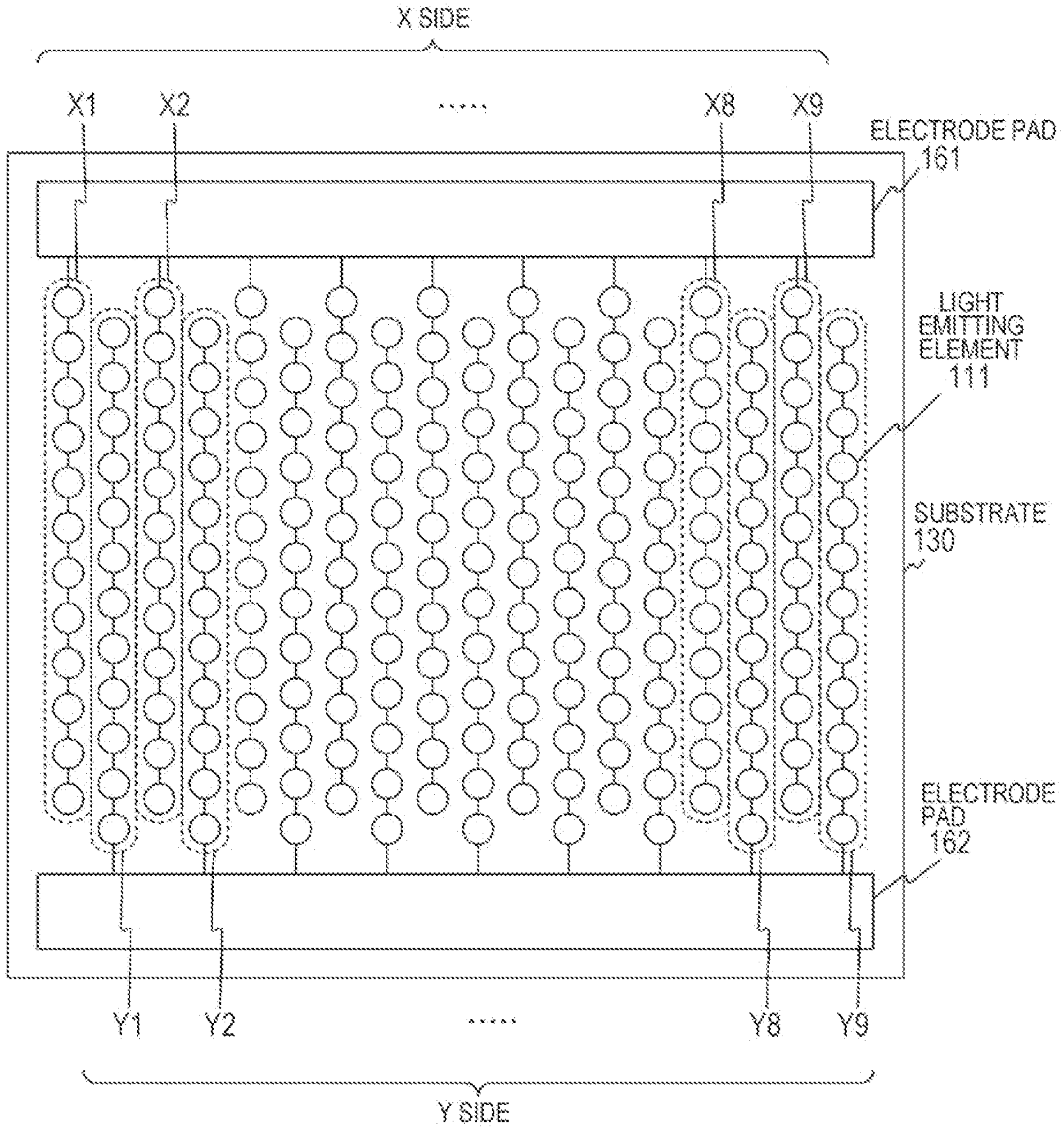
FIG. 52 is a diagram illustrating an example of a configuration of a light emission unit according to a tenth embodiment of the present technology.

FIG. 52 is a diagram illustrating a configuration example of the light emission unit 110 according to the application example of the present embodiment.

The light emission unit 110 according to the application example groups the arrayed light emitting elements 111 into an X side (light emitting element groups X1 to X9) and a Y side (light emitting element groups Y1 to Y9) in units of columns. Then, an X-side electrode pad 161 and a Y-side electrode pad 162 are separately provided. Therefore, the X side and the Y side of the light emitting elements 111 may be driven independently. For example, a plurality of light beams (first light beams) from a plurality of the light emitting elements 111 connected to the X-side electrode pad 161 is respectively radiated (spot-radiated) to the target as a point-like light beam, and a plurality of the light beams (second light beams) from a plurality of the light emitting elements 111 connected to the Y-side electrode pad 162 is radiated (uniformly radiated) to the target portion as a substantially uniform light beam.

Figure 53:
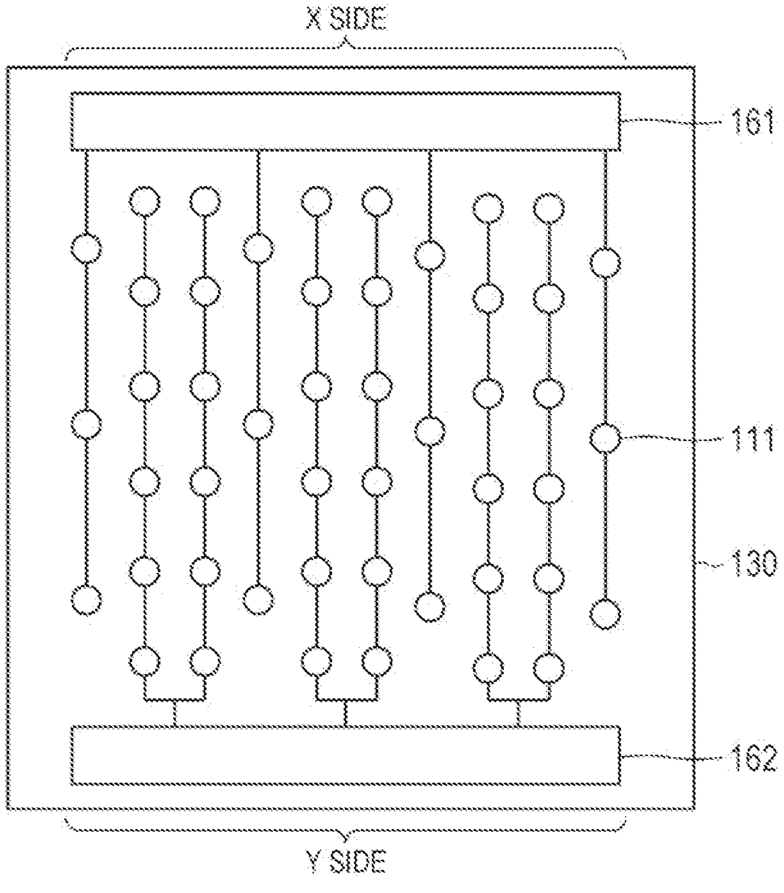
FIG. 53 is a diagram illustrating another example of a configuration of a light emission unit according to the tenth embodiment of the present technology.

In this example, the light emitting element groups X1 to X9 and the light emitting element groups Y1 to Y9 are alternately disposed on the substrate 130 having a rectangular shape. Note that an example in which the light emitting element groups X1 to X9 and the light emitting element groups Y1 to Y9 are alternately disposed is described herein, but the present technology is not limited to this. For example, the number of a plurality of the light emitting elements 111 may be optionally arrayed depending on the desired number and position of light emission points and a desired amount of light output. For example, FIG. 52 illustrates an example in which the number of the light emitting elements 111 connected to the X-side electrode pad 161 is the same as the number of the light emitting elements 111 connected to the Y-side electrode pad 162. However, as illustrated in FIG. 53, the number of the light emitting elements 111 connected to the X-side electrode pad 161 may be different from the number of the light emitting elements 111 connected to the Y-side electrode pad 162. In the example of FIG. 53, the number of light emitting elements on a spot irradiation side (X-side) is small, an interval between the spots with which the target is irradiated is widened, and a non-irradiation region between the spots for taking multipath countermeasures can be sufficiently secured. That is, when the same power is supplied to the light emission unit 110, the light output in each of the light emitting elements 111 can be increased, and the number of light emitting elements 111 on the uniform irradiation side (Y-side) is large, so that a more uniform light intensity distribution can be obtained.

Figure 54:
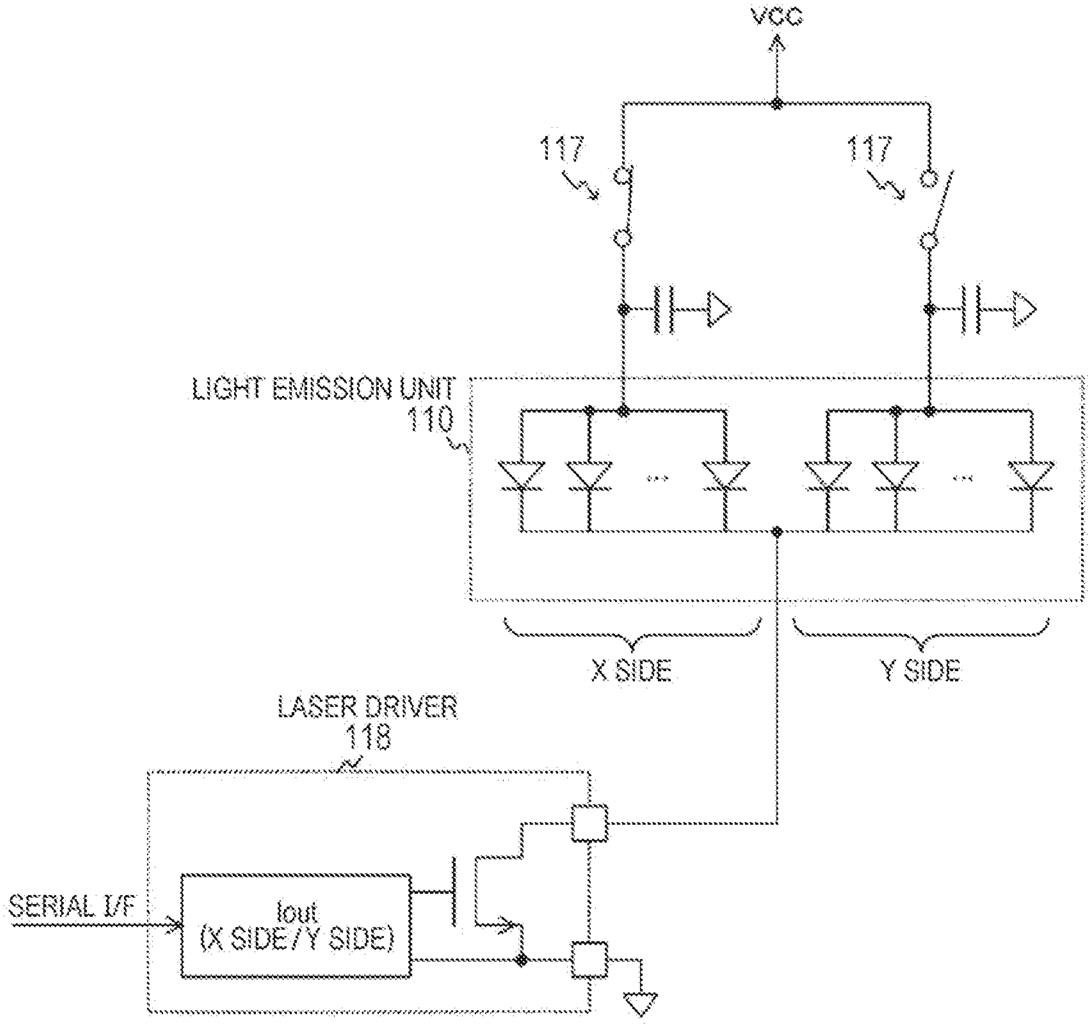
FIG. 54 is a diagram illustrating a first example of a laser driver for driving a light emission unit according to the tenth embodiment of the present technology.

FIG. 54 is a diagram illustrating a first example of the laser driver 118 for driving the light emission unit 110 according to the application example of the embodiment of the present technology.

In the first example, the laser driver 118 is provided in common on the X side and the Y side of the light emitting elements 111, and light emission in the light emitting element 111 is controlled by opening and closing a switch 117. That is, by turning on one of the two switches 117 and turning off the other switch 117, it is possible to switch between the X side and the Y side of the light emitting elements 111. Note that the switch 117 is an example of a switching unit recited in claims.

Figure 55:
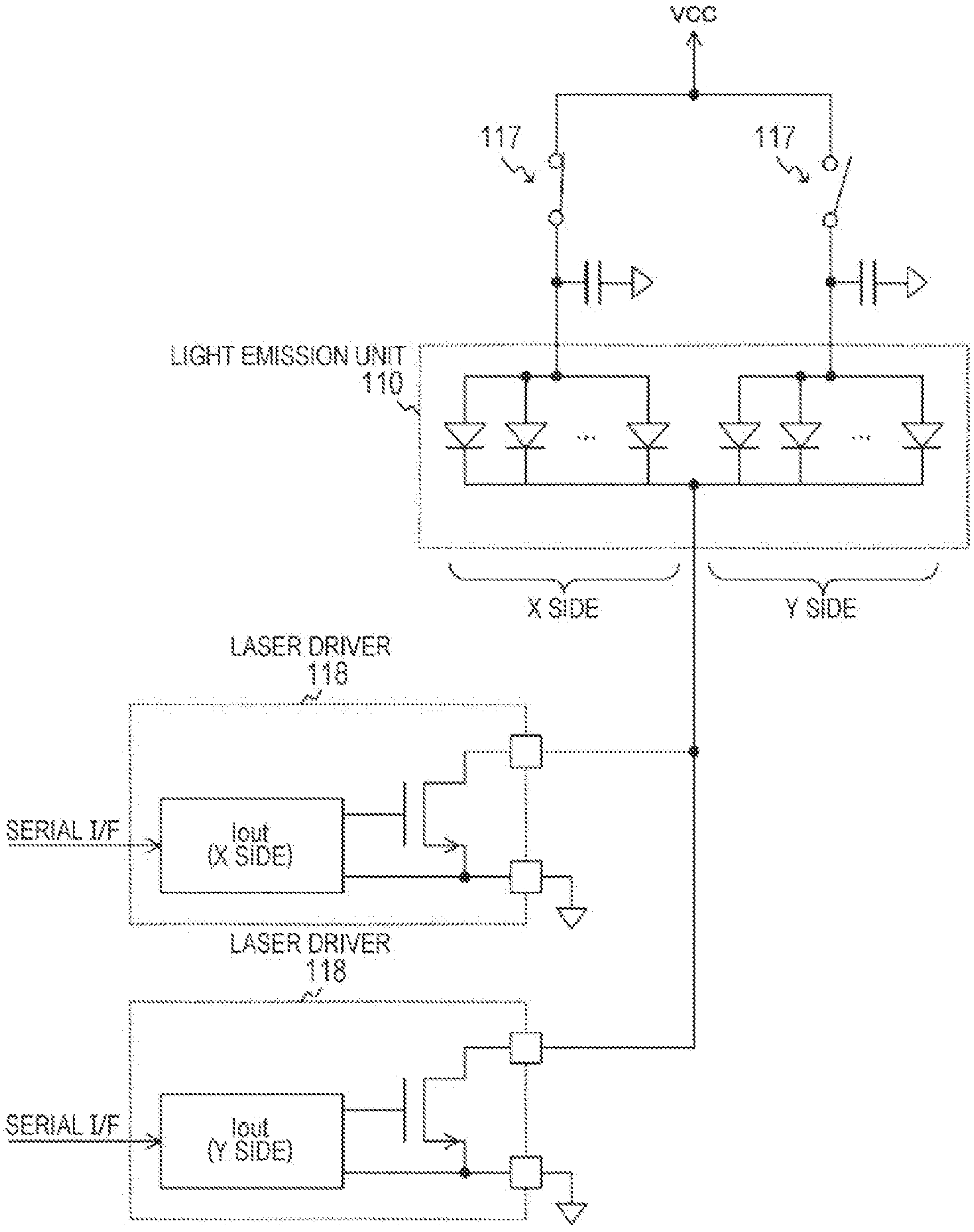
FIG. 55 is a diagram illustrating a second example of a laser driver for driving a light emission unit according to the tenth embodiment of the present technology.

FIG. 55 is a diagram illustrating a second example of the laser driver 118 for driving the light emission unit 110 according to the application example of the embodiment of the present technology.

In this second example, the laser driver 118 is separately provided for driving each of the X side and the Y side of the light emitting elements 111. That is, one of two laser drivers 118 is used for driving the light emitting elements 111 on the X side, and the other laser driver 118 is used for driving the light emitting elements 111 on the Y side. By separately providing the laser drivers 118 in this manner, driving conditions such as a current and a voltage may be individually controlled.

Note that the switching of the light emission between the X side and the Y side of the light emitting elements 111 can be performed by operation of the laser driver 118 which is individually provided, but may be performed by the switch 117 in this case.

[Operation]

Figure 56:
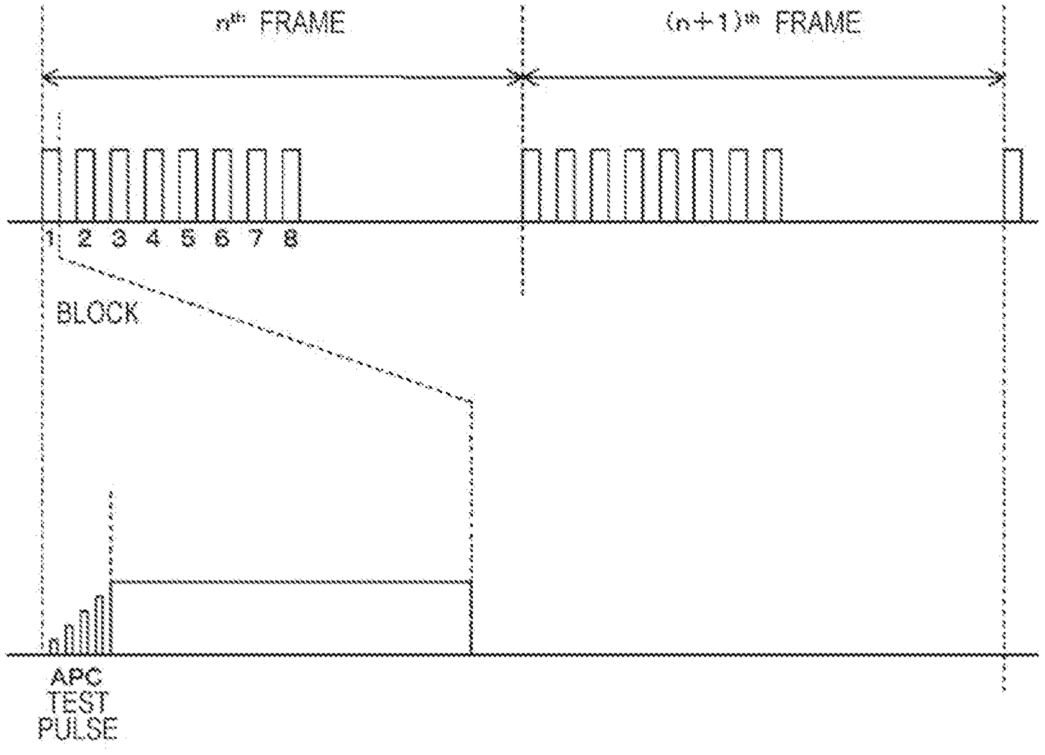
FIG. 56 is a diagram illustrating an operation timing example of light emission control of a light emission unit according to the tenth embodiment of the present technology.

FIG. 56 is a diagram illustrating an operation timing example of light emission control of the light emission unit 110 according to the application example of the embodiment of the present technology.

FIG. 56 illustrates an example of a light emission sequence of the illumination device 1. A section in which one distance measurement image is generated is referred to as a “frame”, and one frame is set to, for example, a time of 33.3 msec (frequency of 30 Hz). As a distance measurement pulse, for example, a rectangular continuous wave of 100 MHz/Duty=50% is used, and this causes continuous light emission between accumulation sections. A plurality of the accumulation sections with different conditions can be provided in the frame. Although eight accumulation sections are illustrated in FIG. 56, the number of accumulation sections is not limited to this number.

As illustrated in the drawing, in the illumination device 1, the X side (refer to FIG. 52) is caused to emit light in one frame, and the light reception unit 200 receives reflected light and generates a distance measurement image. In the next frame, the Y side (refer to FIG. 52) is caused to emit light, and the light reception unit 200 receives the reflected light and generates a distance measurement image. Note that in FIG. 56, the X side and the Y side are switched for one frame, but may be switched for every plurality of frames. Note that the switching between the light emission on the X side and the light emission on the Y side may be performed, for example, in units of one frame, in units of a block, or in units of a plurality of blocks. Therefore, for example, it is possible to switch between spot irradiation and uniform irradiation at a faster speed as compared with a method of mechanically switching focal positions of laser beams emitted from a plurality of the light emission units.

As another aspect of the light emission control of the light emitting element 111, for example, the following three methods may be provided. In a first method, light emission is alternately performed on the X side and the Y side for each frame. Therefore, it is possible to reduce power consumption per frame. Furthermore, it is possible to increase a light output in one frame to extend a distance measurement distance and to improve the distance measurement accuracy. In this manner, distance measurement with high resolution may be performed using two frames.

In a second method, light emission is alternately performed on the X side and the Y side for each block. Furthermore, in a third method, which is an intermediate method between the first method and the second method, light emission is alternately performed in a switching manner on the X side and the Y side for every plurality of blocks.

By such switching of light emission, in spot light irradiation on one side, light (multipath light) that is irregularly reflected and returns from an object other than a target is detected using a region not irradiated with the spot light. Then, it is also possible to correct a distance measurement error caused by a multipath by subtracting the detected multipath light as unnecessary light from the spot light irradiation.

In this example, it is assumed that the X side and the Y side are alternately switched, but the switching may be sequentially performed among only the X side, only the Y side, and both the X side and Y side, between only the X side and both the X side and Y side, or between only the Y side and both the X side and Y side. For example, in consideration of power consumption, it is conceivable that both the X side and the Y side emit light in a case where the light output per one light emitting element 111 may be low at a short distance, and only one of the X side and the Y side emits light in a case where the light output per one light emitting element 111 is desired to be high at a long distance. Therefore, it is possible to perform distance measurement with high resolution at a short distance and distance measurement with high distance accuracy at a long distance.

11. Modification Example

FIG. 57 to FIG. 60 are diagrams illustrating an example of grouping of the light emitting elements 111 according to the application example of the present technology.

Figure 57:
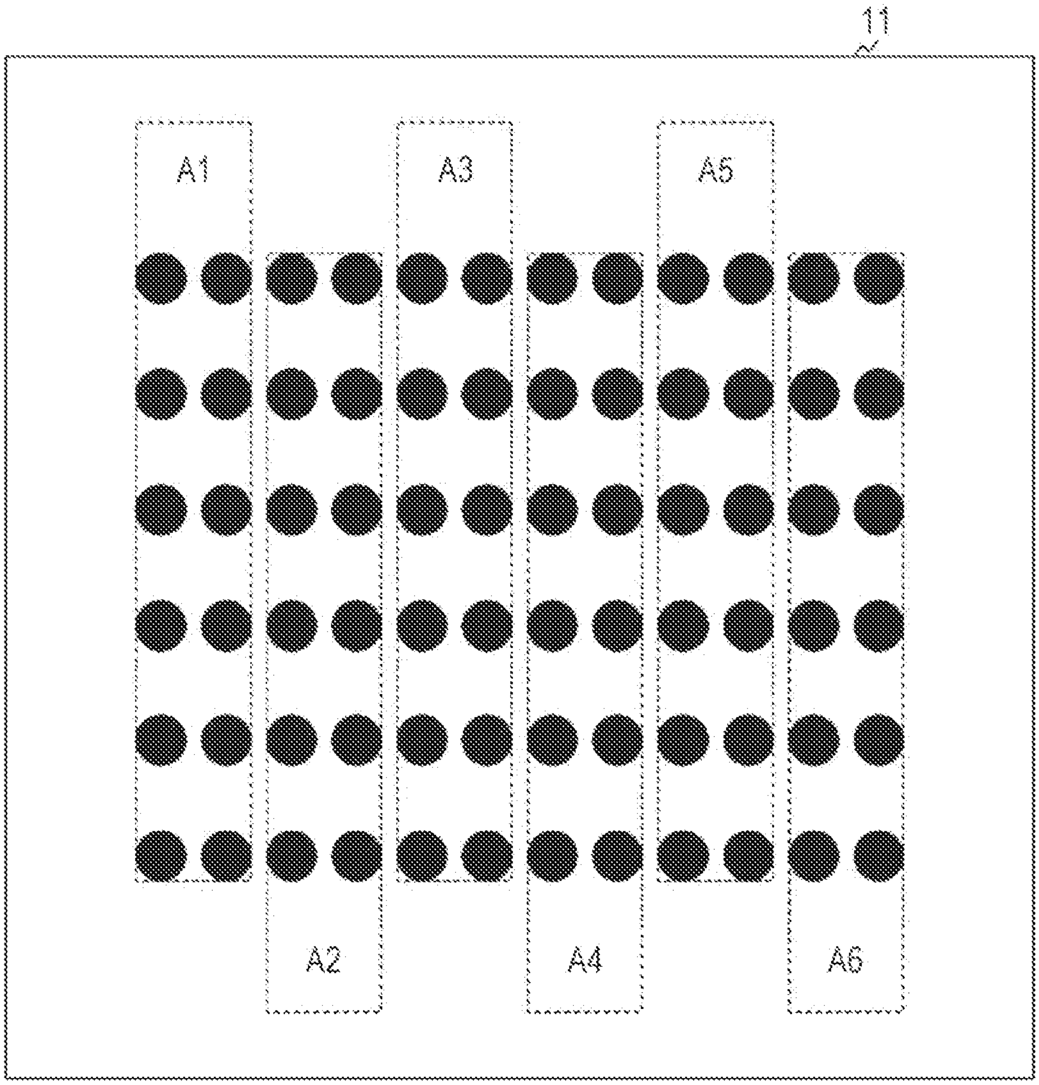
FIG. 57 is a diagram illustrating a first example of grouping of light emitting elements according to a modification example.
Figure 58:
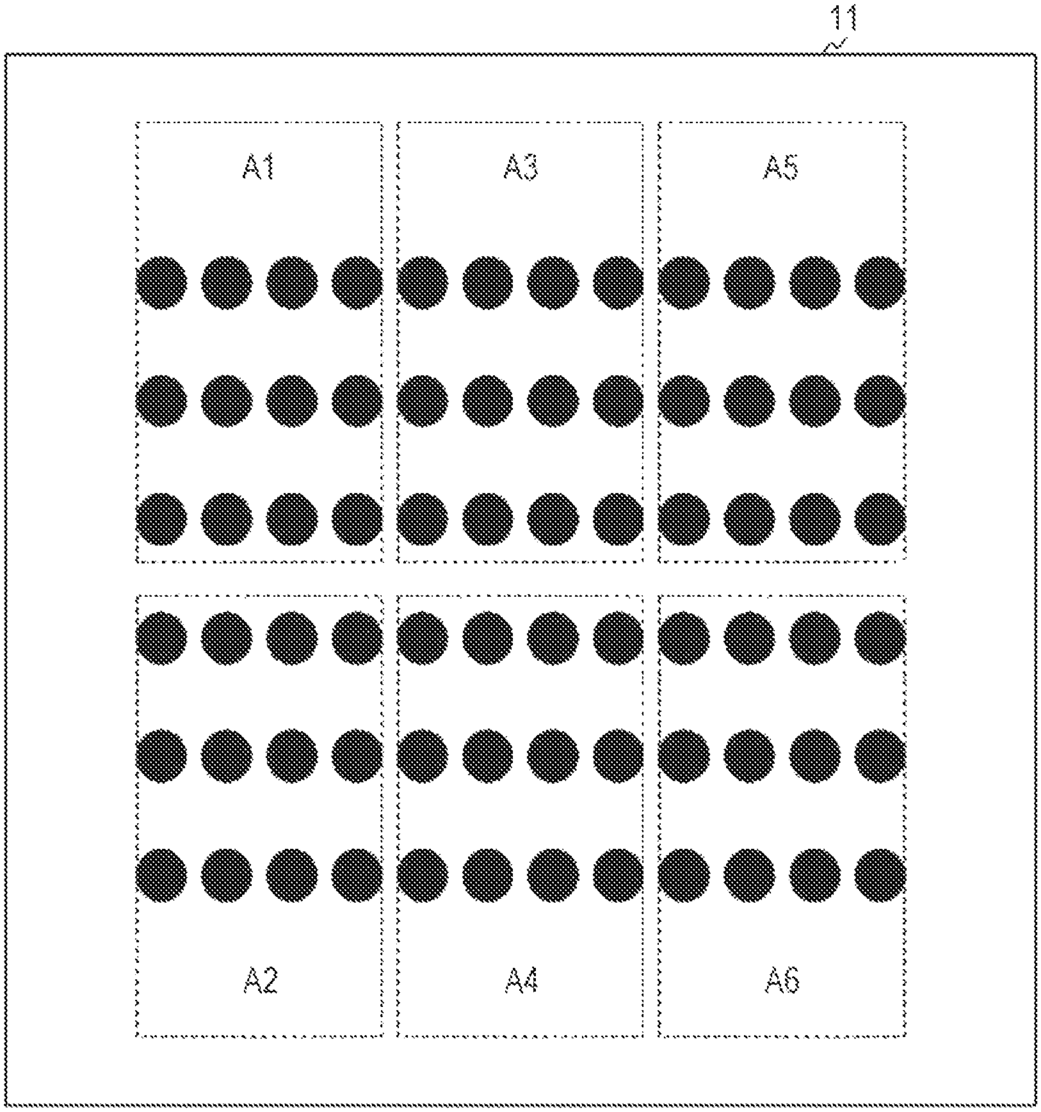
FIG. 58 is a diagram illustrating a second example of grouping of light emitting elements according to the modification example.
Figure 59:
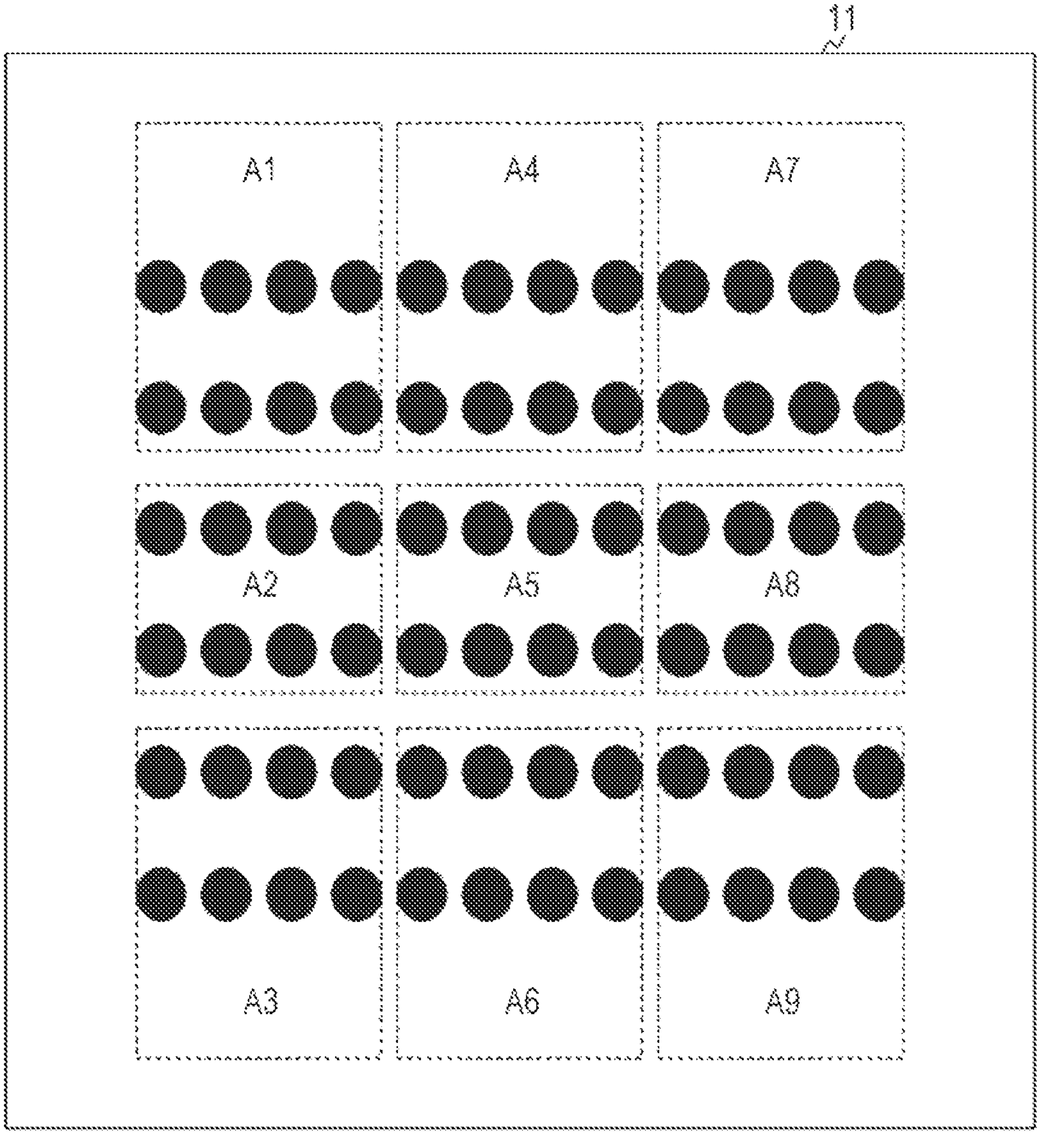
FIG. 59 is a diagram illustrating a third example of grouping of light emitting elements according to the modification example.

In the example in FIG. 57, a case is assumed where one region is formed for every plurality of columns (two columns in this example) and switching is performed for each region. In the example in FIG. 58, a case is assumed where one frame is further vertically divided into two to form quadrangle regions and switching is performed for each region. In the example in FIG. 59, a case is assumed where one frame is vertically divided into three and switching is performed for each region.

When the number of spots is increased and light intensity per spot is maintained, there is a possibility that power consumption increases to exceed safety standard for protecting eyes. In this respect, by switching the light emission in units of light emission regions, flexible adjustment can be performed. Switching of light emission may be performed for each frame, and may be performed for each block or the like in the frame. Furthermore, it is also possible to recognize a position of a target to be subjected to the distance measurement and allow the region to emit light.

Figure 60:
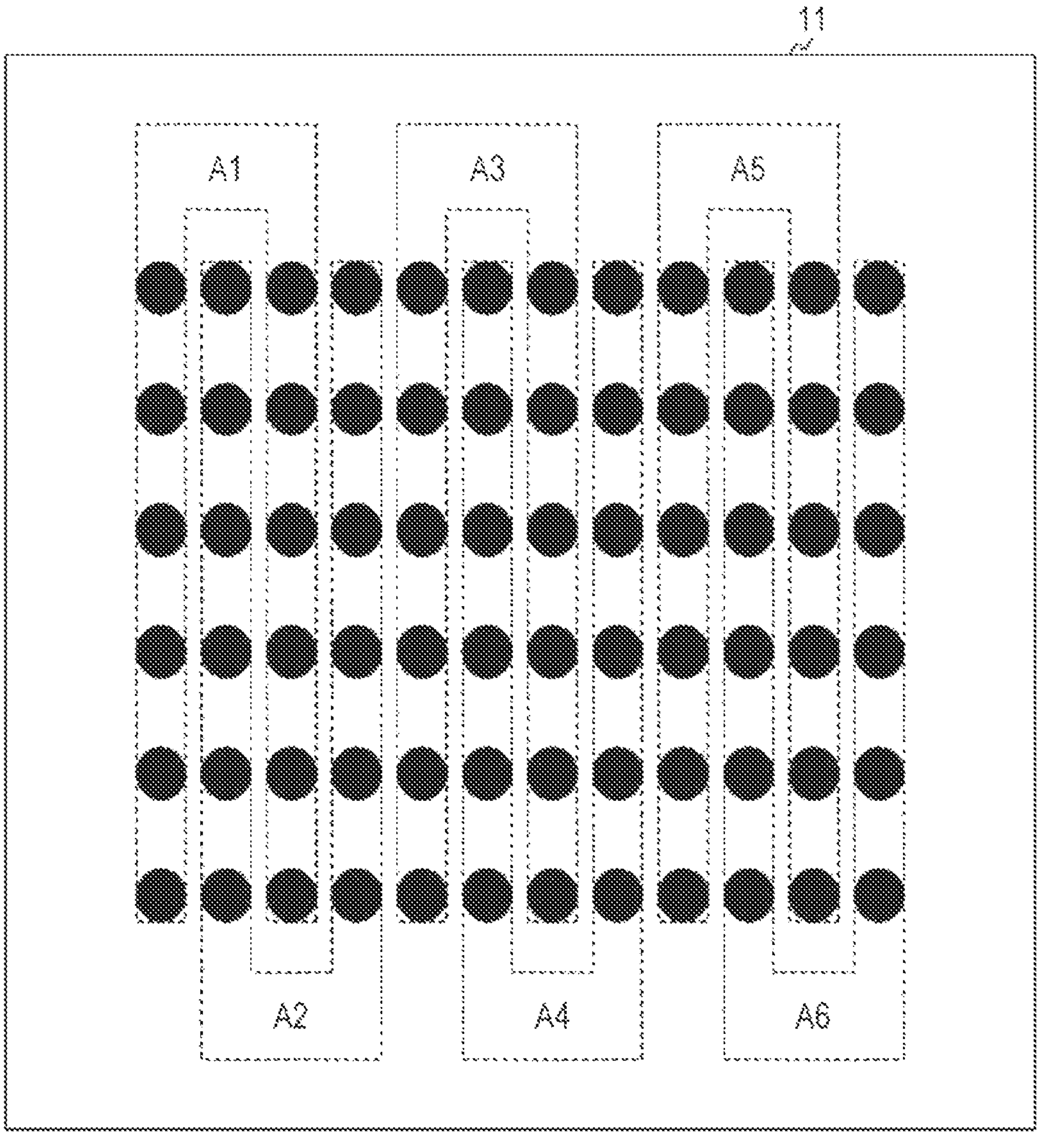
FIG. 60 is a diagram illustrating a fourth example of grouping of light emitting elements according to the modification example.

FIG. 60 is a diagram illustrating another example of grouping of the light emitting elements 111 according to the modification example of the present technology. In this example, an example is illustrated in which grouping is performed for every two columns so that the light emitting elements 111 are differently combined for every columns. For example, first and third columns form a region A1, second and fourth columns form a region A2, fifth and seventh columns form a region A3, sixth and eighth columns form a region A4, ninth and eleventh columns form a region A5, and tenth and twelfth columns form a region A6. Therefore, switching of light emission may be controlled for every two columns. Therefore, it is possible to reduce power consumption caused by region switching and increase light output within the laser safety standard while taking multipath countermeasures.

The diffraction element 134 may have a binary structure. At this time, the number of steps of the binary structure may be increased, and in this case, efficiency can be increased.

Although an example is provided in which the light emitting elements 111 are separated by a mesa structure having the columnar mesa 147, the present technology is not limited to this. The light emission unit 11 and the light emission unit 12 may be in one structure, and each light emission unit may be separated by the current constriction layer 148, or may be separated by a structure having no mesa structure.

In this manner, according to the embodiment of the present technology, by dividing the spot light by the diffraction element 134, it is possible to improve the resolution while suppressing the number of light emitting elements 111 disposed in an optical module. Furthermore, the intervals of the spot lights can be made uniform. Furthermore, it is possible to reduce the influence of high order diffracted light.

Note that the above-described embodiments describe an example of embodying the present technology, and there is a correspondence relationship between the matters in the embodiments and the matters specifying the invention in claims. Similarly, there is a correspondence relationship between the matters specifying the invention in claims and the matters in the embodiments of the present technology having the same names. However, the present technology is not limited to the embodiments and can be embodied by making various modifications to the embodiments without departing from the gist thereof.

Note that effects described in the present description are merely examples and are not limited, and other effects may be provided.

Note that the present technology can have configurations as follows.

(1)

An optical module including:

a light emission unit including light emitting elements arrayed two-dimensionally; and a diffraction element that diffracts a light beam radiated from each of the light emitting elements and separates the light beam into a plurality of light beams, in which the light emission unit has a multi-array structure based on a structure in which the light emitting elements are respectively disposed at vertexes forming a quadrangle of which sides facing each other are parallel to each other, a distance between the light emitting elements on a side in a first direction is set to a and a distance between the light emitting elements on a side in a second direction orthogonal to the side in the first direction is set to b, the diffraction element generates diffracted light in an n direction (n is a natural number) and an angle θx formed between one diffraction direction and the side in the first direction satisfies $$\theta x=\tan^{-1}(b/na), \text{ and}$$

when angle differences of two light beams generated by inter-light emission distances a and b are set to φa and φb, respectively, and m is set to a natural number excluding an integral multiple of (2n+1), a diffraction angle φx of the diffracted light satisfies $$\varphi x=m\times \mathrm{sqrt}\{(n\varphi a)^2+\varphi b^2\}/(2n+1).$$

(2)

An optical module including:

a light emission unit including light emitting elements arrayed two-dimensionally; and a diffraction element that diffracts a light beam radiated from each of the light emitting elements and separates the light beam into a plurality of light beams, in which the light emission unit has a multi-array structure based on a structure in which the light emitting elements are respectively disposed at vertexes forming a quadrangle of which sides facing each other are parallel to each other, a distance between the light emitting elements on a side in a first direction is set to a and a distance between the light emitting elements on a side in a second direction orthogonal to the side in the first direction is set to b, the diffraction element generates diffracted light in an n direction (n is a natural number) and an angle θx formed between one diffraction direction and the side in the first direction satisfies $$\theta x=\tan^{-1}\{b/(n+1)a\}, \text{ and}$$

when angle differences of two light beams generated by inter-light emission distances a and b are set to φa and φb, respectively, and m is set to a natural number excluding an integral multiple of (2n+1), a diffraction angle φx of the diffracted light satisfies $$\varphi x=m\times\text{sqrt}[\{(n+1)\varphi a\}2+\varphi b^2]/(2n+1).$$

(3)

An optical module including:

a light emission unit including light emitting elements arrayed two-dimensionally; and a diffraction element that diffracts a light beam radiated from each of the light emitting elements and separates the light beam into a plurality of light beams, in which the light emission unit has a multi-array structure based on a structure in which the light emitting elements are respectively disposed at vertexes forming a quadrangle of which sides facing each other are parallel to each other, a distance between the light emitting elements on a side in a first direction is set to a and a distance between the light emitting elements on a side in a second direction orthogonal to the side in the first direction is set to b, the diffraction element generates diffracted light in an n direction (n is a natural number) and an angle θx formed between one diffraction direction and the side in the first direction satisfies $$\theta x=\tan^{-1}(b/a), \text{ and}$$

when angle differences of two light beams generated by inter-light emission distances a and b are set to φa and φb, respectively, and m is set to a natural number of an integral multiple of (2n+1) excluding 2(2n+1), a diffraction angle φx of the diffracted light satisfies $$\varphi x=m\times\text{sqrt}(\varphi a^2+\varphi b^2)/2.$$

(4)

The optical module according to any one of (1) to (3), in which the light emission unit includes a switching unit configured to switch the light emitting elements to emit light for every at least two sets.

(5)

The optical module according to any one of (1) to (3), in which the light emission unit includes a switching unit configured to switch the light emitting elements to emit light for every at least two sets, irradiates a target with a plurality of first light beams as point-like light beams, and irradiates the target portion with a plurality of second light beams as substantially uniform light beams.

(6)

The optical module according to any one of (1) to (3), in which each of the light emitting elements includes at least two active layers in a vertical direction.

(7)

The optical module according to any one of (1) to (6), further including a light detection unit configured to receive reflected light from a target irradiated with the light beam, in which the light detection unit has a function of correcting a distance measurement error caused by a multipath.

(8)

A distance measuring device using the optical module according to any one of (1) to (7).

REFERENCE SIGNS LIST

10 Distance measuring device
20 Irradiation target
100 Illumination unit
110 Light emission unit
111 Light emitting element
113 Collimator lens
114 Diffraction element
117 Switch
118 Laser driver
119 Component incorporating substrate
121,122 Holding unit
123 Cathode electrode unit
124,125 Anode electrode unit
130 Substrate
134 Diffraction element
200 Light reception unit
300 Control unit
400 Distance measuring unit

The invention claimed is:

1. An optical module comprising:

a light emission unit including light emitting elements arrayed two-dimensionally; and a diffraction element that diffracts a light beam radiated from each of the light emitting elements and separates the light beam into a plurality of light beams, wherein the light emission unit has a multi-array structure based on a structure in which the light emitting elements are respectively disposed at vertexes forming a quadrangle of which sides facing each other are parallel to each other, a distance between the light emitting elements on a side in a first direction is set to a and a distance between the light emitting elements on a side in a second direction orthogonal to the side in the first direction is set to b, the diffraction element generates diffracted light in an n direction (n is a natural number) and an angle θx formed between one diffraction direction and the side in the first direction satisfies $\theta x=\tan^{-1}(b/na)$, and when angle differences of two light beams generated by inter-light emission distances a and b are set to φa and φb, respectively, and m is set to a natural number excluding an integral multiple of (2n+1), a diffraction angle φx of the diffracted light satisfies $$\varphi x=m\times\text{sqrt}\{(n\varphi a)^2+\varphi b^2\}/(2n+1).$$

2. An optical module comprising:

a light emission unit including light emitting elements arrayed two-dimensionally; and a diffraction element that diffracts a light beam radiated from each of the light emitting elements and separates the light beam into a plurality of light beams, wherein the light emission unit has a multi-array structure based on a structure in which the light emitting elements are respectively disposed at vertexes forming a quadrangle of which sides facing each other are parallel to each other, a distance between the light emitting elements on a side in a first direction is set to a and a distance between the light emitting elements on a side in a second direction orthogonal to the side in the first direction is set to b, the diffraction element generates diffracted light in an n direction (n is a natural number) and an angle θx formed between one diffraction direction and the side in the first direction satisfies $\theta x = \tan^{-1}\{b/(n+1)a\}$, and when angle differences of two light beams generated by inter-light emission distances a and b are set to φa and φb, respectively, and m is set to a natural number excluding an integral multiple of (2n+1), a diffraction angle φx of the diffracted light satisfies $$\varphi x = m \times \mathrm{sqrt}[\{(n+1)\varphi a\}^2 + \varphi b^2]/(2n+1).$$

3. An optical module comprising:

a light emission unit including light emitting elements arrayed two-dimensionally; and a diffraction element that diffracts a light beam radiated from each of the light emitting elements and separates the light beam into a plurality of light beams, wherein the light emission unit has a multi-array structure based on a structure in which the light emitting elements are respectively disposed at vertexes forming a quadrangle of which sides facing each other are parallel to each other, a distance between the light emitting elements on a side in a first direction is set to a and a distance between the light emitting elements on a side in a second direction orthogonal to the side in the first direction is set to b, the diffraction element generates diffracted light in an n direction (n is a natural number) and an angle θx formed between one diffraction direction and the side in the first direction satisfies $\theta x = \tan^{-1}(b/a)$, and when angle differences of two light beams generated by inter-light emission distances a and b are set to φa and φb, respectively, and m is set to a natural number of an integral multiple of (2n+1) excluding 2(2n+1), a diffraction angle φx of the diffracted light satisfies $$\varphi x = m \times \mathrm{sqrt}(\varphi a^2 + \varphi b^2)/2.$$

4. The optical module according to claim 1, wherein the light emission unit includes a switching unit configured to switch the light emitting elements to emit light for every at least two sets.

5. The optical module according to claim 1, wherein the light emission unit includes a switching unit configured to switch the light emitting elements to emit light for every at least two sets, irradiates a target with a plurality of first light beams as point-like light beams, and irradiates the target portion with a plurality of second light beams as substantially uniform light beams.

6. The optical module according to claim 1, wherein each of the light emitting elements includes at least two active layers in a vertical direction.

7. The optical module according to claim 1, further comprising a light detection unit configured to receive reflected light from a target irradiated with the light beam, wherein the light detection unit has a function of correcting a distance measurement error caused by a multipath.

8. A distance measuring device comprising the optical module according to claim 1.

* * * * *